(12) United States Patent
Willson, Jr.

(10) Patent No.: US 9,268,529 B2
(45) Date of Patent: Feb. 23, 2016

(54) EFFICIENT ANGLE ROTATOR CONFIGURED FOR DYNAMIC ADJUSTMENT

(71) Applicant: Alan N. Willson, Jr., Pasadena, CA (US)

(72) Inventor: Alan N. Willson, Jr., Pasadena, CA (US)

(73) Assignee: Pentomics, Inc., Pasadena, CA (US)

( * ) Notice: Subject to any disclaimer, the term of this patent is extended or adjusted under 35 U.S.C. 154(b) by 0 days.

(21) Appl. No.: 13/894,321

(22) Filed: May 14, 2013

(65) Prior Publication Data

US 2014/0195579 A1 Jul. 10, 2014

Related U.S. Application Data

(63) Continuation-in-part of application No. 13/205,525, filed on Aug. 8, 2011, which is a continuation-in-part of application No. 11/938,252, filed on Nov. 9, 2007, now Pat. No. 8,131,793.

(60) Provisional application No. 61/646,824, filed on May 14, 2012, provisional application No. 60/857,778, filed on Nov. 9, 2006.

(51) Int. Cl.
*G06F 7/548* (2006.01)
*G06F 7/48* (2006.01)

(52) U.S. Cl.
CPC .............. *G06F 7/548* (2013.01); *G06F 7/4818* (2013.01)

(58) Field of Classification Search
CPC ................................ G06F 1/03; G06F 7/4818
USPC .................................................. 708/271, 441
See application file for complete search history.

(56) References Cited

U.S. PATENT DOCUMENTS

| 4,896,287 | A | | 1/1990 | O'Donnell et al. | |
|---|---|---|---|---|---|
| 5,276,633 | A | * | 1/1994 | Fox et al. | 708/276 |
| 5,673,212 | A | * | 9/1997 | Hansen | 708/271 |
| 5,737,253 | A | | 4/1998 | Madisetti et al. | |
| RE36,388 | E | * | 11/1999 | Fox et al. | 708/276 |
| 5,991,788 | A | | 11/1999 | Mintzer | |
| 6,651,079 | B1 | * | 11/2003 | Nguyen et al. | 708/627 |

(Continued)

OTHER PUBLICATIONS

Ken Gentile, Direct Digital Synthesis Primer, Analog Devices, May 2003, pp. 1-50.*

(Continued)

*Primary Examiner* — Chuong D Ngo
(74) *Attorney, Agent, or Firm* — Sterne, Kessler, Goldstein & Fox P.L.L.C.

(57) ABSTRACT

An apparatus and method for angle rotation is disclosed to rotate a complex input by the angle θ to produce a rotated complex output signal. A memory storage device generates control information based on a coarse angle $\theta_M$. A coarse rotation butterfly circuit uses the control information to rotate the complex input signal by the coarse angle $\theta_M$ to produce an intermediate complex number. The control information controls one or more multiplexers and/or adders in the coarse rotation butterfly circuit to rotate the complex input signal. The fine rotation butterfly circuit uses the control information to rotate the intermediate complex number by a fine angle $\theta_L$ to produce the complex output signal. The control information controls one or more multiplexers and/or adders in the fine rotation butterfly circuit to rotate the intermediate complex number.

6 Claims, 43 Drawing Sheets

(56) References Cited

U.S. PATENT DOCUMENTS

| | | | |
|---|---|---|---|
| 7,203,718 B1 | 4/2007 | Fu et al. | |
| 7,228,325 B2 | 6/2007 | Willson et al. | |
| 7,440,987 B1 | 10/2008 | Song et al. | |
| 7,532,989 B1* | 5/2009 | Torosyan | 702/66 |
| 7,539,716 B2* | 5/2009 | Torosyan | 708/271 |
| 8,131,793 B2* | 3/2012 | Willson, Jr. | 708/440 |
| 2004/0161055 A1* | 8/2004 | Sinha | 375/322 |
| 2006/0167962 A1 | 7/2006 | Torosyan | |

OTHER PUBLICATIONS

Lionel Cordesses, Direct Digital Synthesis: A Tool for Periodic Wave Generation (Part 1), IEEE Signal Processing Magazine, Jul. 2004, pp. 50-54.*

Lionel Cordesses, Direct Digital Synthesis: A Tool for Periodic Wave Generation (Part 2), IEEE Signal Processing Magazine, Sep. 2004, pp. 110-112 and 117.*

Ahn, Y. et al., "VLSI design of a CORDIC-based derotator," in *Proc. IEEE Int. Symp. Circuits Syst.*, vol. 2, May 1998, pp. 449-452.

Dempster, A.G. and Macleod, M.D., "Constant integer multiplication using minimum adders," *IEE Circuits Devices Syst.*, vol. 141, pp. 407-413, Oct. 1994.

Dempster, A.G. and Macleod, M.D., "Use of minimum-adder multiplier blocks in FIR digital filters," *IEEE Trans. Circuits and Systems-II*, vol. 42, No. 9, pp. 569-577.

Fu, D. and Willson, Jr., A.N., "A high-speed processor for digital sine/cosine generation and angle rotation," in *Proc. 32nd Asilomar Conf. Signals, Syst. Comput.*, vol. 1, Nov. 1998, pp. 177-181.

Madisetti, A. et al., "A 100-MHz, 16-b, direct digital frequency synthesizer with a 100-dBc spurious-free dynamic range," *IEEE J. Solid-State Circuits*, vol. 34, No. 8, pp. 1034-1043, Aug. 1999.

Torosyan, A. et al., "A 300-MHz quadrature direct digital synthesizer/mixer in 0.25-mm CMOS," in *IEEE Int. Solid-State Circuits Conf Dig. Tech. Papers*, Feb. 2002, pp. 132-133.

Vankka, J., and Halonen, K., *Direct Digital Synthesizers: Theory, Design, Applications*, Boston: Kluwer Academic Publishers, 2001, 218 pages.

Vankka, J., and Halonen, K., "Direct Digital Synthesizers: Theory, Design, Applications," Boston: Kluwer Academic Publishers. 2001, 218 pages.

Ahn, Y. et al., "VLSI design of a CORDIC-based derotator," in Proc. IEEE Int. Symp. Circuits Syst., vol. 2. May 1998, pp. 449-452.

Analog Devices, CMOS 200 MHz Quadrature Digital Upconverter: AD9856, Rev. C, 2005, 36 pages.

Avizienis, A., "Signed-digit number representation for fast parallel arithmetic," IRE Trans. Electron. Comp., vol. EC-10, pp. 389-400, 1961.

Booth, A.D., "A signed binary multiplication technique," Quart. J. Mech. Appl. Math., vol. 4, 1951, pp. 236-240.

Bull, D.R. and Horrocks, D.H., "Primitive operator digital filters," Proc. Inst. Elect. Eng., vol. 138, pt. G, pp. 401-412, Jun. 1991.

Chen, C.L. and Willson, Jr., A.N., "A trellis search algorithm for the design of FIR filters with signed-powers-of-two coefficients," IEEE Trans. Circuits and Systems-II, vol. 46, No. 1, pp. 29-39, Jan. 1999.

Ching, A.Y., "A 12-bit direct digital frequency synthesizer/mixer in 0.8 μm CMOS," M.S. thesis, Univ. California, Los Angeles, 1999, 50 pages.

DeCaro, D. et al., "A 380 MHz direct digital synthesizer/mixer with hybrid CORDIC architecture in 0.25-mm CMOS" IEEE J. Solid-State Circuits, vol. 42, No. 1, pp. 151-160, Jan. 2007.

DeCaro, D. et al., "A 380MHz, 150mW direct digital synthesizer/mixer," in 0.25mm CMOS, in IEEE Int. Solid-State Circuits Conf. Dig. Tech. Papers, Feb. 2006, 10 pages.

Dempster, A.G. and Macleod, M.D, "Constant integer multiplication using minimum adders," IEE Circuits Devices Syst., vol. 141, pp. 407-413, Oct. 1994.

Dempster, A.G. and Macleod, M.D., "Multiplication by two integers using the minimum number of adders," in Proc. IEEE Int. Symp. Circuits Syst., May 23-26, 2005, pp. 1814-1818.

Dempster, A.G. and Macleod, M.D., "Use of minimum-adder multiplier blocks in FIR digital filters," IEEE Trans. Circuits and Systems-II, vol. 42, No. 9, pp. 569-577, Sep. 1995.

Fu, D. and Willson, Jr., A.N., "A high-speed processor for digital sine/cosine generation and angle rotation," in Proc. 32nd Asilomar Conf. Signals, Syst. Comput., vol. 1, Nov. 1998, pp. 177-181.

Fu, D. and Willson, Jr., A.N., "A two-stage angle-rotation architecture and its error analysis for efficient digital mixer implementation," IEEE Trans. Circuits and Systems-I, vol. 53, No. 3, pp. 604-614, Mar. 2006.

Fu, D., "Efficient synchronization architectures for multimedia communications," Ph.D. dissertation, Univ. California, Los Angeles, 2000, 176 pages.

Gentile, K., "Digital upconverter IC tames complex modulation," Microwaves & RF Magazine, Aug. 2000, 6 pages.

Golub, et al., "Matrix Computations," Baltimore: Johns Hopkins Press, 1996.

Gustafsson, O. et al., "Multiplier blocks using carry-save adders," in Proc. IEEE Int. Symp. Circuits Syst., vol. 2, May 23-26, 2004, pp. 473-476.

Hartley, R., "Subexpression sharing in filters using canonic signed digit multipliers," IEEE Trans. Circuits and Systems-II, vol. 43, No. 10, pp. 677-688, Oct. 1996.

Koren, I., "Computer Arithmetic Algorithms," 2nd ed., Natick, MA: A.K. Peters, 2002.

Macleod, M.D. and Dempster, A.G., "A common subexpression elimination algorithm for low-cost multiplierless implementation of matrix multipliers," Electron. Lett., vol. 40, No. 11, pp. 651-652, May 2004.

Madisetti, A. et al., "A100-MHz, 16-b, direct digital frequency synthesizer with a 100-dBc spurious-free dynamic range," IEEE J. Solid-State Circuits, vol. 34, No. 8, pp. 1034-1043, Aug. 1999.

Madisetti, A., "VLSI architectures and IC implementations for bandwidth efficient communications," Ph.D. dissertation, Univ. California, Los Angeles, 1996, 151 pages.

Samueli, H., "An improved search algorithm for the design of multiplierless FIR filters with powers-of-two coefficients," IEEE Trans. Circuits and Systems, vol. 36, No. 7, pp. 1044-1047, Jul. 1989.

Song, et al., "A Quadrature Digital Synthesizer/Mixer Architecture Using Fine/Coarse Coordinate Rotation to Achieve 14-b Input, 15-b Output, and 100-dBc SFDR," IEEE J. Solid-State Circuits, vol. 39, No. 11, Nov. 2004, pp. 1853-1861.

Tan, L. and Samueli, H., "A 200-MHz quadrature frequency synthesizer/mixer in 0.8-mm CMOS," IEEE J. Solid-State Circuits, vol. 30, No. 3, pp. 193-200, Mar. 1995.

Torosyan, A. et al., "A 300-MHz quadrature direct digital synthesizer/mixer in 0.25-mm CMOS," IEEE J. Solid-State Circuits, vol. 38, No. 6, pp. 875-887, Jun. 2003.

Torosyan, A. et al., "A 300-MHz quadrature direct digital synthesizer/mixer in 0.25-mm CMOS," in IEEE Int. Solid-State Circuits Conf. Dig. Tech. Papers, Feb. 2002, pp. 132-133.

Volder, J., "The CORDIC trigonometric computing technique," IEEE Trans. Computers, vol. EC-8, pp. 330-334, Sep. 1959.

Wang, S. et al., "Hybrid CORDIC algorithms," IEEE Trans. Computers, vol. 46, pp. 1202-1207, Nov. 1997.

Willson, et al., "A Direct Digital Frequency Synthesizer with Minimized Tuning Latency of 12ns," IEEE ISSCC Dig. Tech. Papers, Feb. 2011, pp. 138-139.

Wu, Y. et al., "A 415 MHz. direct digital quadrature modulator in 0.25-mm CMOS," in Proc. IEEE Custom Integrated Circ. Conf., May 21-24, 2003, pp. 287-290.

Xu, F. et al., "Efficient algorithms for common subexpression elimination in digital filter design," in Proc. IEEE Int. Conf. Acoust. Speech, Signal Processing, vol. 5, May 17-21, 2004, pp. 137-140.

Xu, F., "On designing high-performance signal processing algorithms for a ring-structured multiprocessor," Ph.D. dissertation, Univ. California, Los Angeles, 2001.

Lu, et al., "A 700-MHz 24-b pipelined accumulator in 1.2-μm CMOS for application as a numerically controlled oscillator," IEEE J. Solid-State Circuits, vol. 28, 878-886, Aug. 1993.

Betowski, et al., "Considerations for phase accumulator design for direct digital frequency synthesizers," IEEE Int. Conf. Neural Networks & Signal Proc., Nanjing, China, Dec. 14-17, 2003.

(56) References Cited

OTHER PUBLICATIONS

"1 GSPS Direct Digital Synthesizer with 14-bit DAC," AD9912 Data Sheet, Analog Devices, Inc., 2007-2010.
"2.7 GHz DDS-Based AgileRFTM Synthesizer," AD9956 Data Sheet, Analog Devices, Inc., 2004.
Torosyan, A., "Direct Digital Frequency Synthesizers: Complete Analysis and Design Guidelines," University of California, Los Angeles, 2003.
U.S. Appl. No. 13/205,525, "Excess-Fours Processing in Direct Digital Synthesizer Implementations," to Alan N. Willson, filed Aug. 8, 2011.

* cited by examiner

FIG. 31A

| Sector # | Coarse Stage Control Bits | | | | | | | | | | Coarse Stage Scaling Circuit Control Bits | | | | | | | | | | | | | | | | | | | | |
|---|---|---|---|---|---|---|---|---|---|---|---|---|---|---|---|---|---|---|---|---|---|---|---|---|---|---|---|---|---|---|---|
| | $s_1$ | $s_2$ | $z$ | $\delta_2$ | $\delta_1$ | $\delta_4$ | $\delta_3$ | $\delta_6$ | $\delta_5$ | $\delta_7$ | $\delta_1$ | $\delta_3$ | $\delta_2$ | $\delta_4$ | $\delta_6$ | $\delta_5$ | $\delta_7$ | $\delta_9$ | $\delta_8$ | $\delta_{10}$ | $\delta_{12}$ | $\delta_{11}$ | $\delta_{13}$ | $B_1$ | $a_2$ | $B_3$ | $a_4$ | $z_2$ | $z_3$ |
| 0 | 1 | 1 | 0 | 0 | 0 | 0 | 1 | 0 | 0 | 0 | 0 | 0 | 0 | 0 | 0 | 0 | 0 | 1 | 0 | 0 | 0 | 1 | 1 | 0 | 0 | 0 | 1 | 0 | 0 |
| 1 | 0 | 1 | 1 | 0 | 0 | 1 | 0 | 1 | 0 | 0 | 0 | 0 | 0 | 0 | 0 | 1 | 1 | 1 | 0 | 0 | 1 | 1 | 1 | 0 | 0 | 0 | 1 | 0 | 1 |
| 2 | 1 | 1 | 1 | 0 | 0 | 0 | 1 | 1 | 0 | 0 | 0 | 1 | 0 | 1 | 1 | 0 | 1 | 1 | 0 | 0 | 0 | 1 | 1 | 1 | 0 | 0 | 1 | 0 | 1 |
| 3 | 1 | 0 | 1 | 0 | 0 | 1 | 0 | 0 | 1 | 0 | 0 | 1 | 0 | 1 | 1 | 1 | 0 | 1 | 0 | 1 | 0 | 1 | 1 | 1 | 0 | 1 | 0 | 1 | 1 |
| 4 | 1 | 1 | 0 | 0 | 1 | 0 | 1 | 0 | 0 | 0 | 0 | 1 | 0 | 1 | 0 | 0 | 1 | 0 | 0 | 1 | 1 | 0 | 1 | 1 | 1 | 1 | 0 | 1 | 1 |
| 5 | 1 | 1 | 0 | 0 | 1 | 1 | 0 | 1 | 0 | 0 | 0 | 1 | 0 | 1 | 1 | 1 | 0 | 0 | 0 | 1 | 1 | 0 | 1 | 0 | 1 | 1 | 1 | 1 | 1 |
| 6 | 1 | 1 | 1 | 0 | 1 | 1 | 0 | 0 | 0 | 0 | 0 | 0 | 0 | 1 | 0 | 0 | 1 | 1 | 0 | 1 | 0 | 1 | 0 | 0 | 0 | 0 | 1 | 1 | 1 |
| 7 | 0 | 1 | 1 | 1 | 0 | 1 | 1 | 1 | 1 | 0 | 0 | 0 | 1 | 1 | 1 | 0 | 0 | 0 | 0 | 0 | 0 | 1 | 1 | 0 | 0 | 0 | 1 | 1 | 1 |
| 8 | 1 | 1 | 1 | 1 | 0 | 0 | 1 | 0 | 1 | 0 | 1 | 0 | 1 | 1 | 0 | 0 | 1 | 0 | 0 | 0 | 0 | 1 | 1 | 1 | 0 | 0 | 1 | 1 | 1 |
| 9 | 0 | 1 | 1 | 1 | 0 | 1 | 1 | 0 | 0 | 0 | 1 | 0 | 1 | 1 | 0 | 1 | 0 | 1 | 0 | 1 | 0 | 1 | 1 | 0 | 0 | 0 | 1 | 0 | 1 |
| 10 | 1 | 1 | 1 | 1 | 1 | 0 | 1 | 0 | 1 | 0 | 1 | 0 | 0 | 1 | 0 | 0 | 0 | 0 | 0 | 0 | 0 | 1 | 1 | 1 | 0 | 1 | 1 | 1 | 0 |
| 11 | 1 | 1 | 1 | 1 | 1 | 1 | 0 | 0 | 1 | 0 | 0 | 1 | 0 | 1 | 1 | 0 | 1 | 0 | 0 | 1 | 0 | 1 | 1 | 0 | 0 | 0 | 1 | 1 | 0 |
| 12 | 0 | 1 | 1 | 1 | 1 | 0 | 1 | 1 | 0 | 0 | 0 | 0 | 0 | 0 | 1 | 0 | 0 | 0 | 0 | 0 | 0 | 1 | 0 | 1 | 0 | 1 | 1 | 1 | 0 |
| 13 | 1 | 1 | 1 | 0 | 1 | 0 | 0 | 1 | 0 | 0 | 0 | 1 | 0 | 1 | 0 | 0 | 0 | 1 | 0 | 0 | 0 | 1 | 0 | 1 | 0 | 0 | 1 | 1 | 0 |
| 14 | 0 | 1 | 1 | 0 | 1 | 0 | 0 | 1 | 0 | 0 | 0 | 1 | 0 | 0 | 0 | 0 | 1 | 1 | 0 | 0 | 0 | 1 | 0 | 0 | 1 | 1 | 0 | 1 | 0 |
| 15 | 0 | 0 | 1 | 1 | 0 | 1 | 0 | 1 | 0 | 1 | 1 | 1 | 0 | 1 | 1 | 0 | 1 | 0 | 1 | 0 | 0 | 1 | 0 | 0 | 1 | 1 | 1 | 1 | 1 |

FIG. 31B

| | FIG. 32A-2 | FIG. 32A-3 |
|---|---|---|

| X2 | -1 | -2 | -3 | -4 | -5 | -6 | -7 | -8 | -9 | -10 | -11 | -12 | -13 | -14 | -15 | Sector # 1 ROM |
|---|---|---|---|---|---|---|---|---|---|---|---|---|---|---|---|---|
| 1 | | | | | | | | | | | -1 | | | | | 0 |
| 1 | | | | | | | -1 | | | | | | | | | 1 |
| 1 | | | | | | | | -1 | | | | | 1 | | -1 | 2 |
| 1 | | | | | | -1 | | | | 1 | | 1 | | -1 | | 3 |
| 1 | | | | | -1 | | 1 | | | | | | 1 | | | 4 |
| 1 | | | | | -1 | | | -1 | | | | | | | | 5 |
| 1 | | | | | | -1 | | | | | | | | | -1 | 6 |
| | | | | | | | | | | | | | | 1 | | 7 |
| | | | | | | | | | | | | | 1 | | 1 | 8 |
| | | | | | | 1 | | 1 | | | | | | | | 9 |
| | | | | | | | | | | | | | | | | 10 |
| | | | | | | | | | | | | | 1 | | | 11 |
| | | | | | | | | 1 | | | | | | -1 | -1 | 12 |
| 1 | | | 1 | | | | | | | | | | -1 | | | 13 |
| 1 | | -1 | | | | | | | | | | | | | | 14 |
| 1 | | -1 | | | | | | | | | | | | | 1 | 15 |
| X2 | -1 | -2 | -3 | -4 | -5 | -6 | -7 | -8 | -9 | -10 | -11 | -12 | -13 | -14 | -15 | Sector # 1 ROM |
| 1 | | | | | | | | | | | | | | | | 0 |
| 1 | | | | | | | | | -1 | | | | | | | 1 |
| 1 | | | | | | | | -1 | | | -1 | | | | 1 | 2 |
| 1 | | | | | | | -1 | | 1 | | -1 | | | | | 3 |
| 1 | | | | | | | -1 | -1 | | | -1 | | | | | 4 |
| 1 | | | | | -1 | | | | 1 | | -1 | | | | -1 | 5 |
| 1 | | | | | -1 | | 1 | | | | 1 | | | | | 6 |
| 1 | | | | | -1 | | | | | | | | | 1 | 1 | 7 |
| | | | | | | | -1 | | | | | 1 | | | | 8 |
| | | | | | | 1 | | | | | -1 | | 1 | 1 | | 9 |
| | | | | | | | | 1 | | | | | 1 | 1 | | 10 |
| | | | | | | | -1 | | | | | 1 | | | | 11 |
| 1 | | | | | | | | | | | | | 1 | | | 12 |
| 1 | | -1 | | | | | | | | | | | | | 1 | 13 |
| 1 | | | | | | | | | | | | | | | | 14 |
| | 1 | | | | | | | | -1 | | | | | | | 15 |

FIG. 32A-2 Output Scaling 3204 (continued)

| Sector # 1 ROM | svn-3 | svn-4 | svn-5 | svn-6 | svn-7 | svn-8 | svn-9 | svn-10 | svn-11 | svn-12 | svn-13 | svn-14 | svn-15 | svn-16 | # row entries |
|---|---|---|---|---|---|---|---|---|---|---|---|---|---|---|---|
| 0 |  |  |  |  |  |  |  |  |  |  |  |  |  |  | 2 |
| 1 |  |  |  |  |  |  |  |  |  |  | 1 |  |  |  | 3 |
| 2 |  |  |  |  |  |  |  |  |  |  |  |  |  |  | 4 |
| 3 |  |  |  |  |  |  |  |  |  |  |  |  |  |  | 5 |
| 4 |  |  |  |  |  |  |  |  |  |  |  |  | 1 |  | 5 |
| 5 |  |  |  |  |  |  |  |  |  | 1 |  |  |  |  | 4 |
| 6 |  |  |  |  |  | -1 |  | -1 |  |  |  |  |  |  | 5 |
| 7 | 1 |  |  |  | 1 |  |  |  |  | 1 |  |  |  |  | 4 |
| 8 | 1 |  |  |  |  | 1 | 1 |  |  |  |  |  |  |  | 5 |
| 9 | 1 |  |  |  |  |  |  |  |  |  |  |  |  | -1 | 4 |
| 10 | 1 |  |  |  |  |  |  |  | -1 |  |  |  |  |  | 2 |
| 11 | 1 |  |  |  |  |  | -1 |  |  |  |  |  | 1 |  | 4 |
| 12 | 1 |  |  |  | -1 |  |  |  |  |  |  |  |  |  | 5 |
| 13 |  | 1 |  |  |  |  | 1 |  |  |  |  |  |  |  | 5 |
| 14 |  |  |  |  |  |  |  |  |  | 1 |  | -1 |  |  | 4 |
| 15 |  |  |  |  |  |  | -1 | -1 |  |  |  |  |  |  | 5 |
| Sector # 1 ROM | svn-3 | svn-4 | svn-5 | svn-6 | svn-7 | svn-8 | svn-9 | svn-10 | svn-11 | svn-12 | svn-13 | svn-14 | svn-15 | svn-16 | # row entries |
| 0 |  |  |  |  |  |  |  |  |  |  |  |  |  |  | 1 |
| 1 |  |  |  |  |  |  |  |  |  |  | 1 |  |  |  | 3 |
| 2 |  |  |  |  |  |  |  |  |  |  |  |  |  |  | 4 |
| 3 |  |  |  |  |  |  |  |  |  |  |  |  | 1 |  | 5 |
| 4 |  |  |  |  |  |  |  |  |  |  |  |  |  |  | 4 |
| 5 |  |  |  |  |  |  |  |  |  |  |  |  |  |  | 5 |
| 6 |  |  |  |  |  |  |  |  |  |  |  | 1 |  |  | 5 |
| 7 |  |  |  |  |  |  |  |  |  | 1 |  |  |  |  | 5 |
| 8 | 1 |  |  |  | 1 |  |  |  |  |  |  | 1 |  |  | 5 |
| 9 | 1 |  |  |  |  |  |  |  |  |  |  |  |  |  | 5 |
| 10 | 1 |  |  |  |  |  |  |  |  |  |  |  |  |  | 4 |
| 11 | 1 |  |  |  |  |  |  |  |  |  |  |  |  |  | 3 |
| 12 |  |  | -1 |  | 1 |  |  |  |  |  |  |  |  |  | 4 |
| 13 |  |  |  |  | 1 |  |  |  |  |  | -1 |  |  |  | 5 |
| 14 |  |  | -1 |  |  |  |  |  | -1 | -1 |  |  |  |  | 4 |
| 15 | 1 |  |  | 1 |  |  |  |  |  |  |  | -1 |  |  | 5 |

FIG. 32A-3   Output Scaling

3208

| Y0 | -1 | -2 | -3 | -4 | -5 | -6 | -7 | Sector # 1 ROM | X0 | X0-1 | # row entries | | |
|---|---|---|---|---|---|---|---|---|---|---|---|---|---|
|  |  |  |  |  | -1 |  |  | 0 | 1 |  | 2 | -0.03125 | 1 |
|  |  |  | -1 |  | -1 |  |  | 1 | 1 |  | 3 | -0.078125 | 1 |
|  |  | -1 |  |  |  |  |  | 2 | 1 |  | 2 | -0.125 | 1 |
|  |  | -1 | 1 | 1 |  |  |  | 3 | 1 |  | 4 | -0.171875 | 1 |
|  |  | -1 |  | 1 |  |  |  | 4 | 1 |  | 3 | -0.21875 | 1 |
|  |  | -1 |  | -1 |  |  |  | 5 | 1 |  | 3 | -0.28125 | 1 |
|  |  | -1 |  | -1 | -1 |  |  | 6 | 1 |  | 4 | -0.328125 | 1 |
|  | -1 |  | 1 |  | -1 |  |  | 7 | 1 |  | 4 | -0.390625 | 1 |
|  | -1 |  | 1 |  |  |  |  | 8 | 1 |  | 3 | -0.4375 | 1 |
|  | -1 |  |  |  |  |  |  | 9 | 1 |  | 2 | -0.5 | 1 |
|  | -1 |  |  | -1 |  |  |  | 10 | 1 |  | 3 | -0.5625 | 1 |
|  | -1 | -1 |  |  |  |  |  | 11 | 1 |  | 3 | -0.625 | 1 |
| -1 |  | 1 |  | 1 |  |  |  | 12 | 1 |  | 4 | -0.6875 | 1 |
|  | -1 |  | 1 |  |  | -1 |  | 13 |  | 1 | 4 | -0.390625 | 0.5 |
| -1 |  |  | 1 |  |  |  |  | 14 | 1 |  | 3 | -0.875 | 1 |
| -1 |  |  |  | 1 |  |  |  | 15 | 1 |  | 3 | -0.9375 | 1 |
| Y0 | -1 | -2 | -3 | -4 | -5 | -6 | -7 | Sector # 1 ROM | X0 | X0-1 | # row entries | | |
|  |  |  |  |  |  |  |  | 0 | 1 |  | 1 | 0 | 1 |
|  |  |  |  | -1 |  | 1 |  | 1 | 1 |  | 3 | -0.046875 | 1 |
|  |  |  |  | -1 | -1 |  |  | 2 | 1 |  | 3 | -0.09375 | 1 |
|  |  |  | -1 | -1 |  |  |  | 3 | 1 |  | 3 | -0.15625 | 1 |
|  |  | -1 |  | 1 |  | -1 |  | 4 | 1 |  | 4 | -0.203125 | 1 |
|  |  | -1 |  |  |  |  |  | 5 | 1 |  | 2 | -0.25 | 1 |
|  |  | -1 |  | -1 |  |  |  | 6 | 1 |  | 3 | -0.3125 | 1 |
|  |  | -1 | -1 |  | 1 |  |  | 7 | 1 |  | 4 | -0.359375 | 1 |
|  |  | -1 | -1 | -1 |  |  |  | 8 | 1 |  | 4 | -0.40625 | 1 |
|  | -1 |  |  |  | 1 |  |  | 9 | 1 |  | 3 | -0.46875 | 1 |
|  | -1 |  |  |  | -1 |  |  | 10 | 1 |  | 3 | -0.53125 | 1 |
|  | -1 |  | -1 |  | 1 |  |  | 11 | 1 |  | 4 | -0.59375 | 1 |
|  | -1 |  | -1 | -1 |  |  |  | 12 | 1 |  | 4 | -0.65625 | 1 |
| -1 |  | 1 |  |  |  |  | 1 | 13 | 1 |  | 4 | -0.7421875 | 1 |
| -1 |  | 1 |  | -1 |  |  |  | 14 | 1 |  | 4 | -0.8125 | 1 |
|  |  | -1 |  |  | 1 |  | -1 | 15 |  | 1 | 4 | -0.453125 | 1 |

FIG. 32B    Coarse Stage

EFFICIENT ANGLE ROTATOR CONFIGURED FOR DYNAMIC ADJUSTMENT

CROSS-REFERENCE TO RELATED APPLICATIONS

This patent application claims the benefit of Provisional Patent Application No. 61/646,824, filed on May 14, 2012 and is a continuation-in-part of U.S. patent application Ser. No. 13/205,525, filed on Aug. 8, 2011, titled "Excess-Fours Processing in Direct Digital Synthesizer Implementations" which is a continuation-in-part of U.S. patent application Ser. No. 11/938,252 (now U.S. Pat. No. 8,131,793) filed on Nov. 9, 2007 which claims the benefit of Provisional Patent Application No. 60/857,778, filed Nov. 9, 2006, entitled "Improved Angle Rotator," each of which is incorporated herein by reference in its entirety.

BACKGROUND OF THE INVENTION

1. Field of the Invention

The invention relates to digital devices for performing rotation of an arbitrary input. In particular, the invention relates to circuit and methods for reducing the complexity and power dissipation in physical circuits that perform angle rotation.

2. Related Art

An angle rotator performs the conceptually straightforward operation of rotating an arbitrary point $(X_0, Y_0)$ in the X-Y plane, counter-clockwise, about the origin in the plane, through a given angle $\theta$. A digital angle rotator performs such rotations on data points whose coordinate values are specified by digital data words. It can also be insightful to view the rotation operation as a rotation of a complex number $X_0+jY_0$ in the complex plane. The digital angle rotator may be used to implement a digital modulator or a digital mixer in a communication system, as well as for implementing angle-rotation operations for other popular signal-processing systems, such as, but not limited to, discrete Fourier transformers and/or trigonometric interpolators to provide some examples.

The digital angle rotator differs significantly from a traditional digital mixer that employs an interconnection of two subsystems: a direct digital frequency synthesizer (DDFS) and a complex multiplier. Crucial insight into the digital angle rotator derives from the observation that the multiplication of an input complex number by a special complex number, one having the form $\cos\theta + j\sin\theta$, is a more special operation than simply the multiplication of two arbitrary complex numbers. Namely this is the multiplication of an arbitrary complex-number by a complex number having magnitude one, making the complex multiplication become a counter-clockwise rotation of an input complex number, about the origin in the complex plane, through the angle $\theta$. The complexity of a conventional angle rotator is approximately the same as that of the multiplier block alone in the traditional digital mixer implementation. Therefore, what is needed is an angle rotator that is reduced in complexity and power dissipation as compared to the conventional prior-art angle rotator.

BRIEF DESCRIPTION OF THE DRAWINGS/FIGURES

Figure 15A:
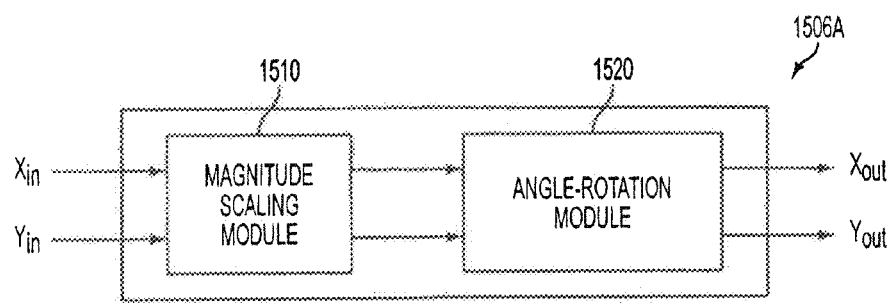
Figure 15B:
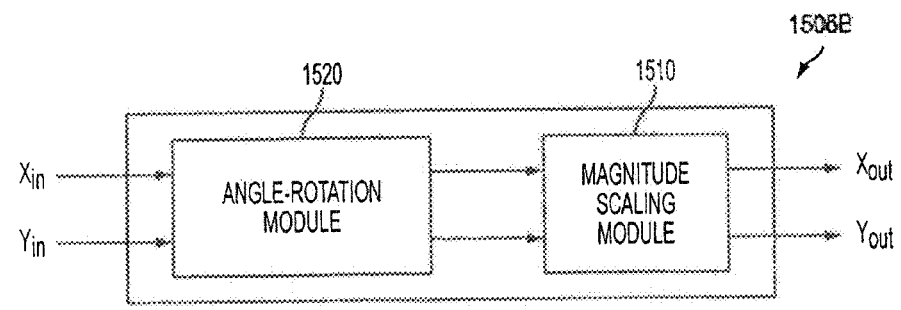

FIGS. 15-A and 15-B depict a high-level block diagram of an exemplary fine stage, according to embodiments of the present invention.

Figure 16:
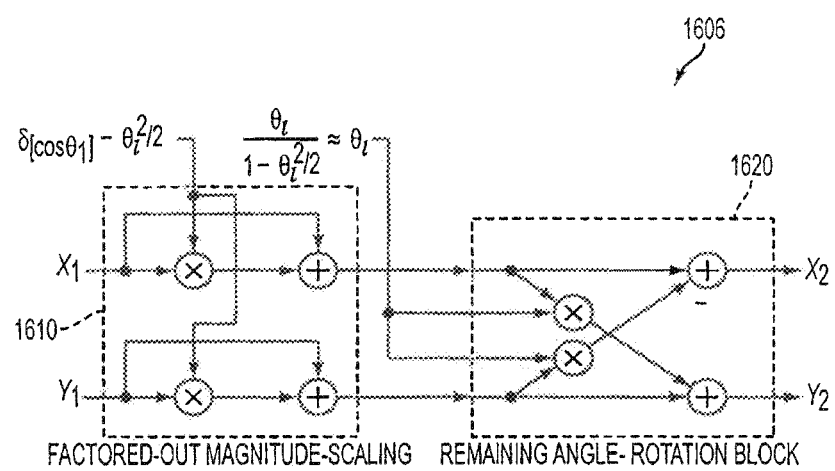

FIG. 16 is an exemplary embodiment of a fine stage, according to embodiments of the present invention.

Figure 17:
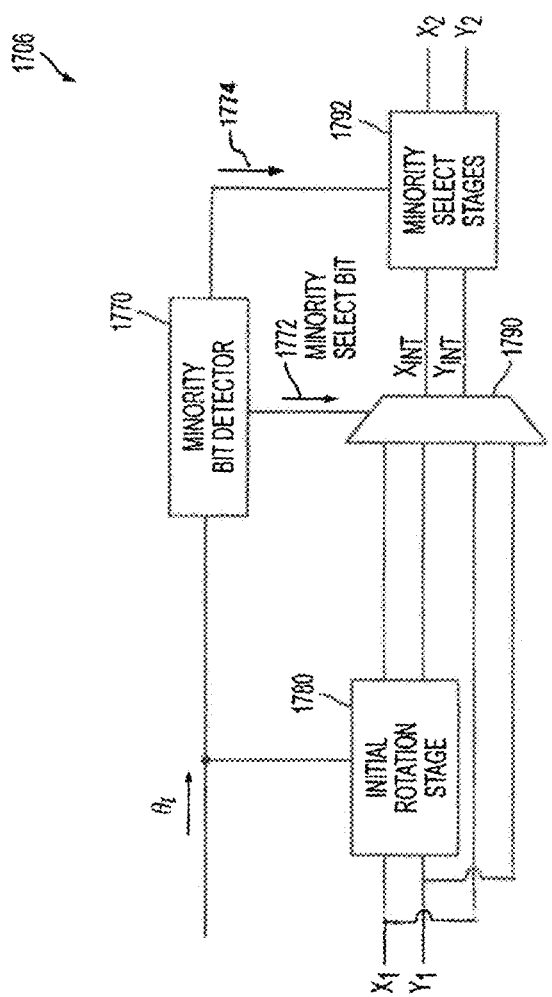

FIG. 17 is a block diagram of an exemplary fine stage using conditional rotation to facilitate the use of minority-select angle rotation in the fine stage, according to embodiments of the present invention.

Figure 18:
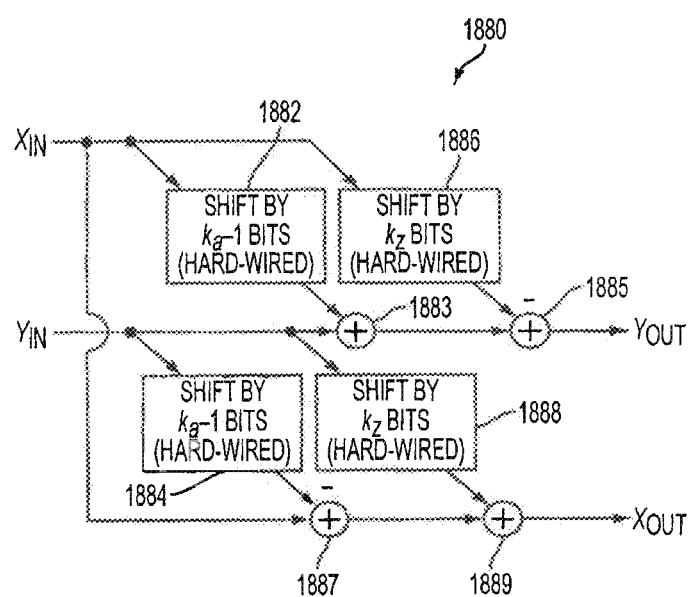

FIG. 18 is a block diagram of an exemplary initial conditional rotation stage 1780, according to embodiments of the present invention.

Figure 19:
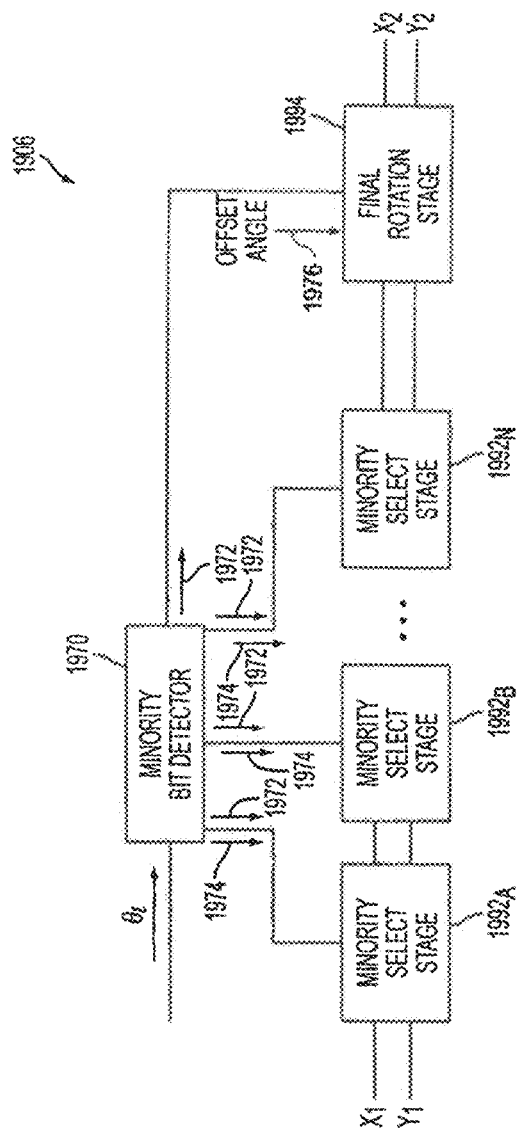

FIG. 19 illustrates an exemplary embodiment of a fine stage using minority selection with offset rotation, according to embodiments of the present invention.

Figure 20:
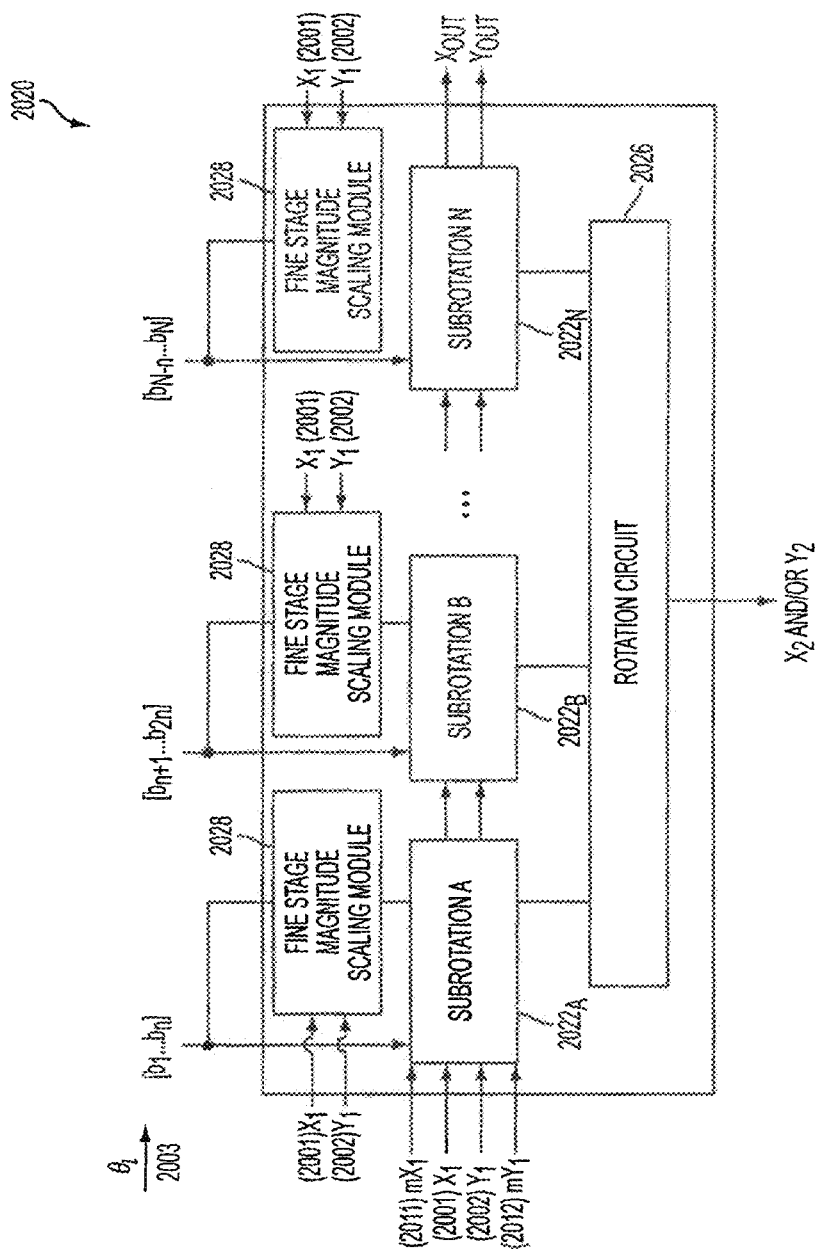

FIG. 20 is a high level block diagram of an exemplary angle rotation module, according to embodiments of the present invention.

Figure 21A:
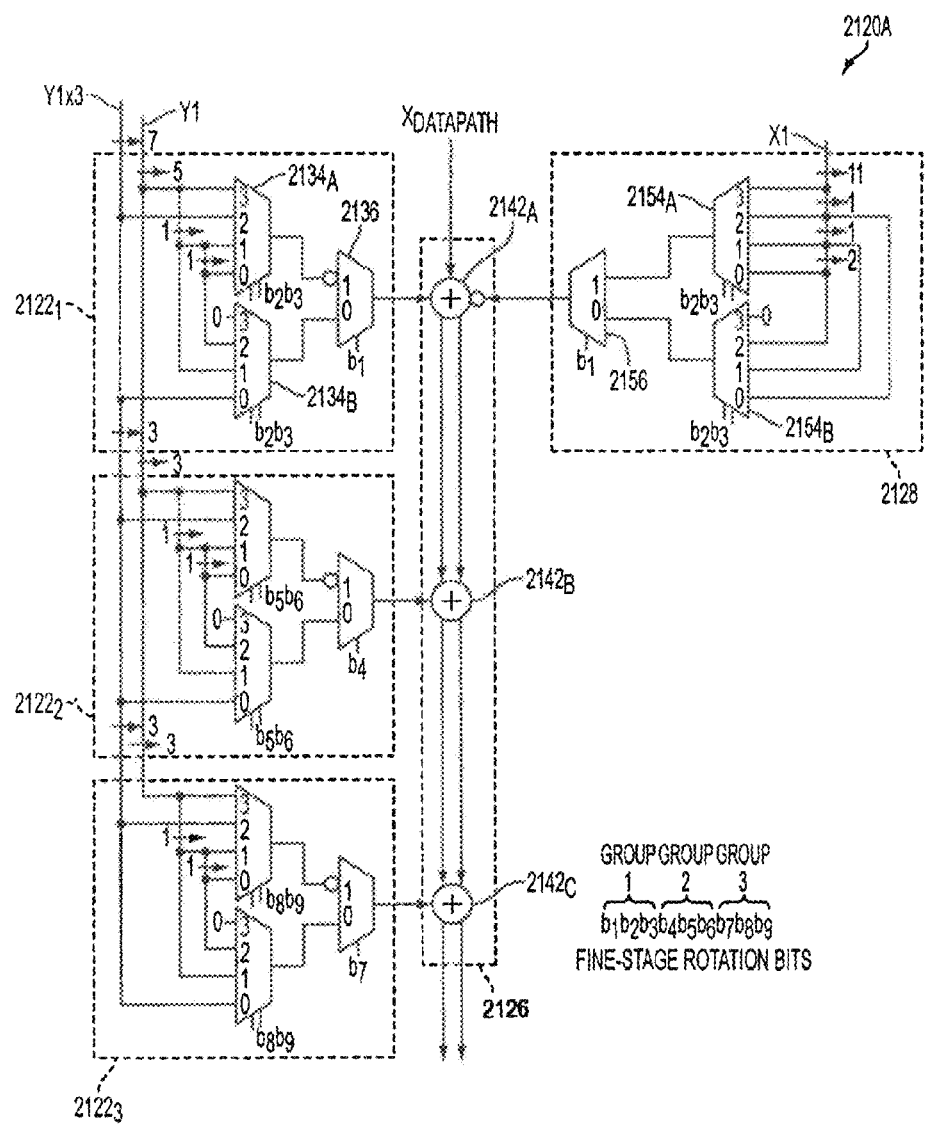
Figure 21B:
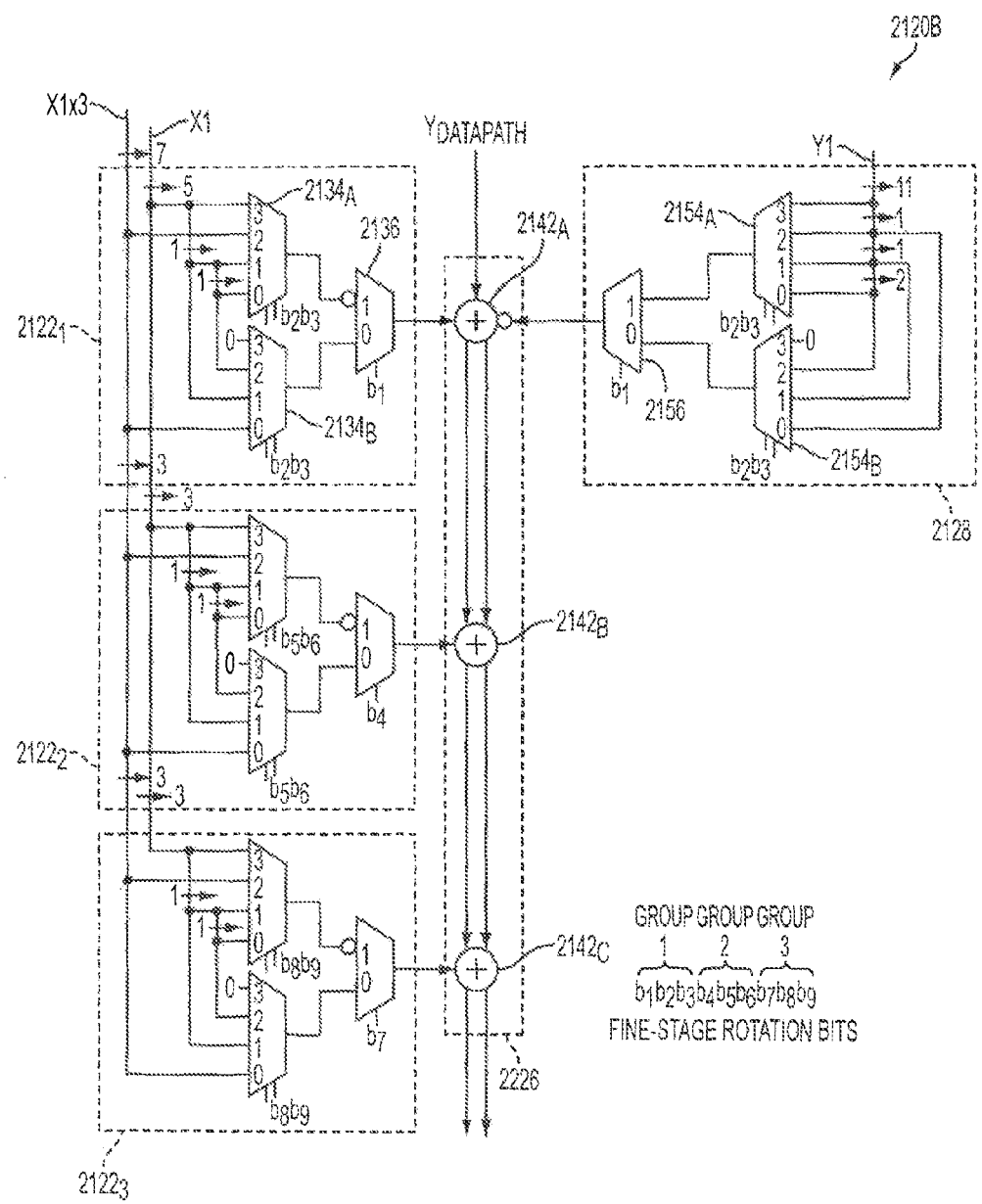

FIGS. 21-A and 21-B depict an exemplary angle rotation module using the excess-three technique, according to embodiments of the present invention.

Figure 22:
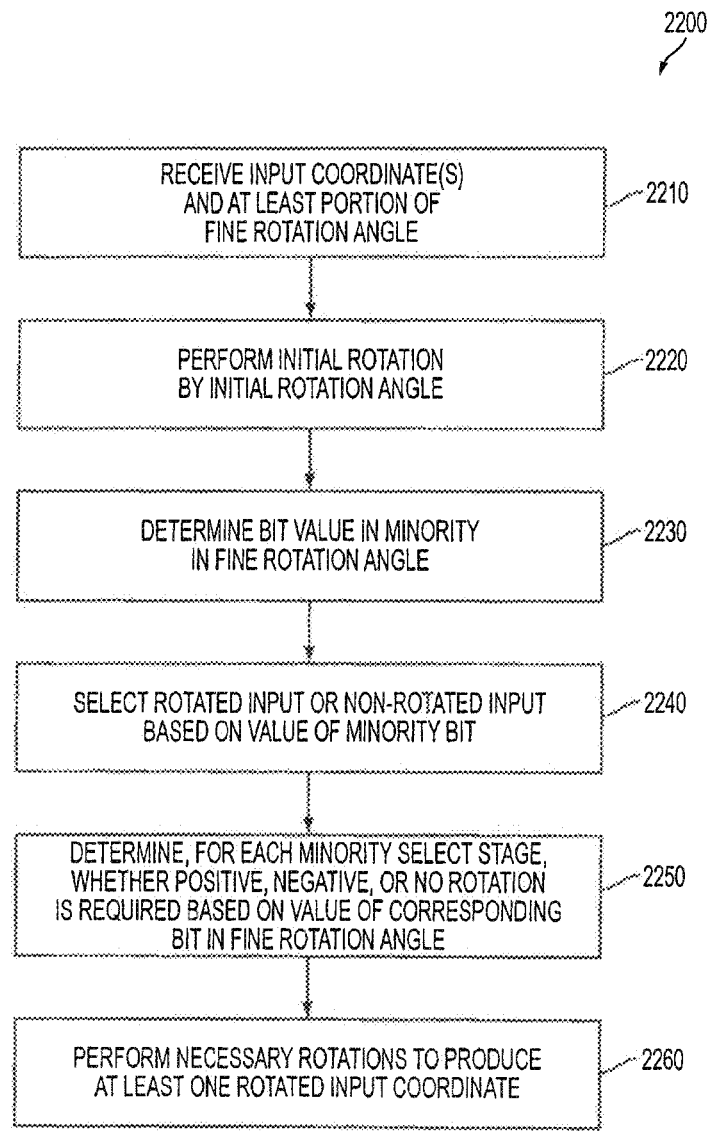

FIG. 22 is a flowchart of a method for rotation of one or more coordinates of an input complex number using minority select, according to embodiments of the present invention.

Figure 23:
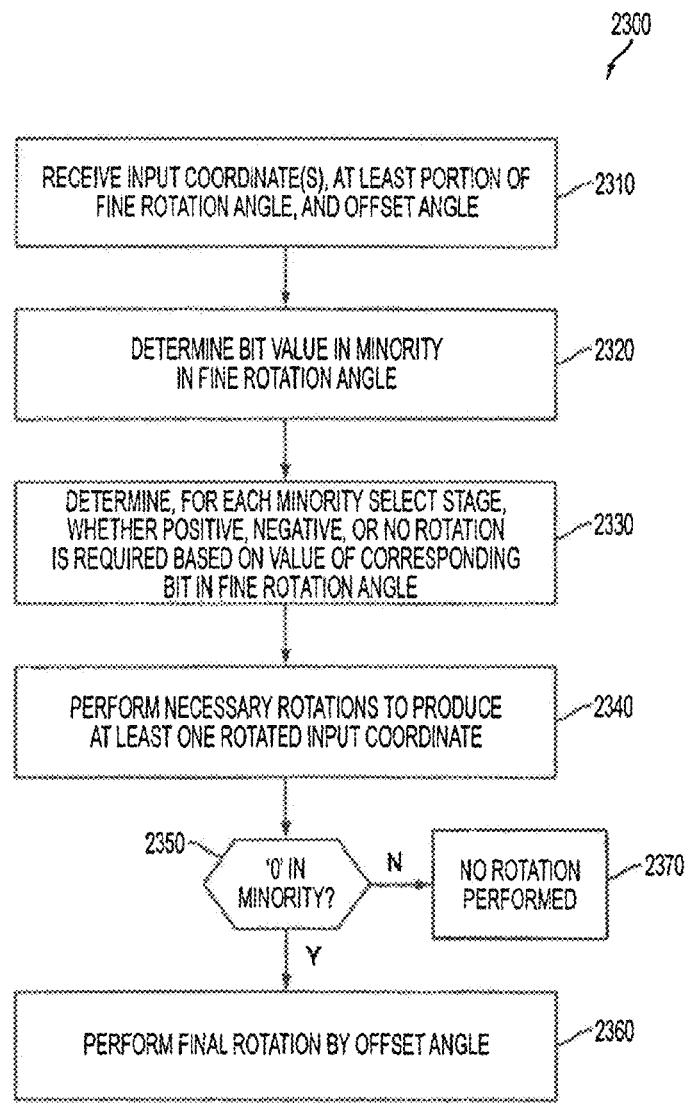

FIG. 23 is a flowchart of an alternate method for rotation of one or more coordinates of an input complex number using minority select, according to embodiments of the present invention.

Figure 24:
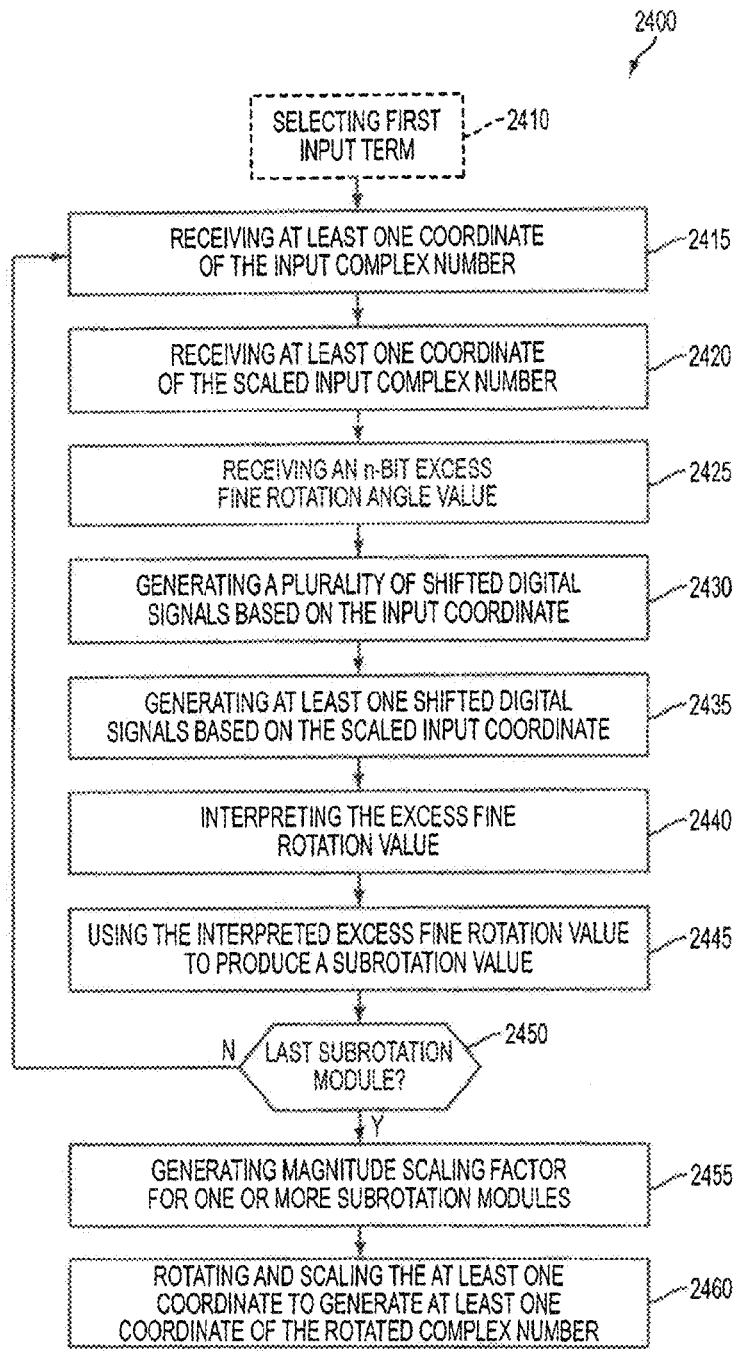

FIG. 24 is a flowchart of a method for rotating one or more components of an input complex number, according to an embodiment of the present invention.

Figure 25:
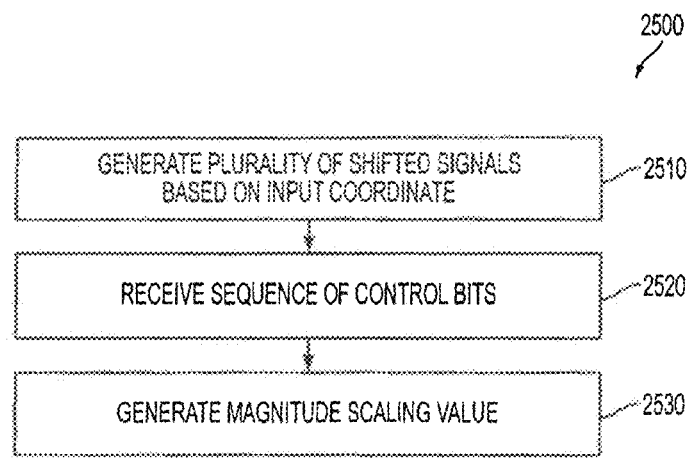

FIG. 25 is a flowchart of a method for performing fine-stage magnitude scaling, according to an embodiment of the present invention.

Figure 26:
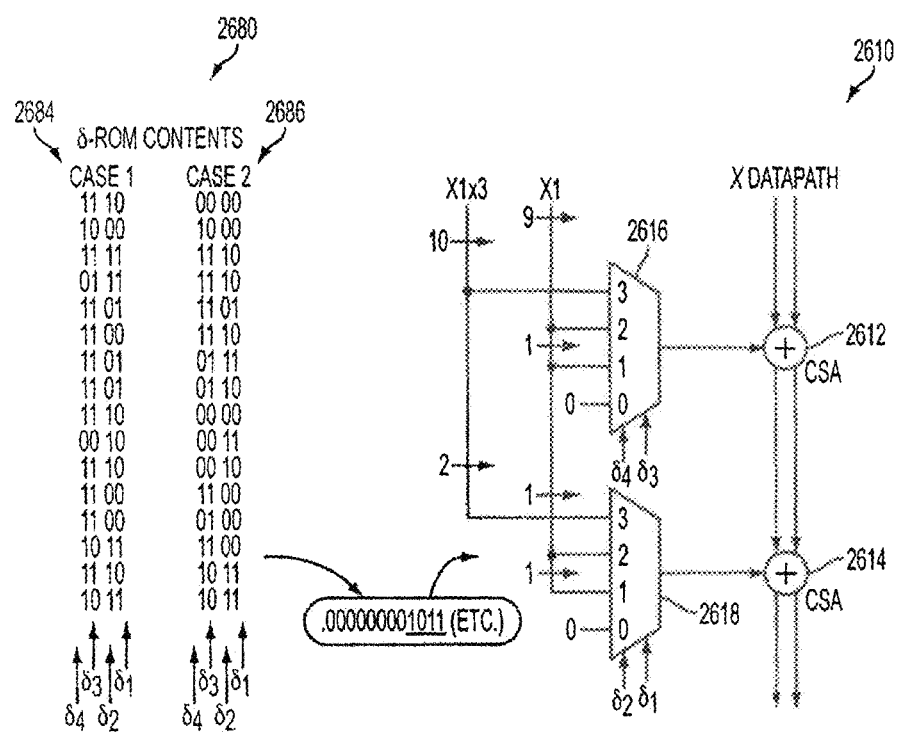

FIG. 26 illustrates a portion of an exemplary magnitude scaling module incorporating the simplifications described above, according to embodiments of the present invention.

Figure 27:
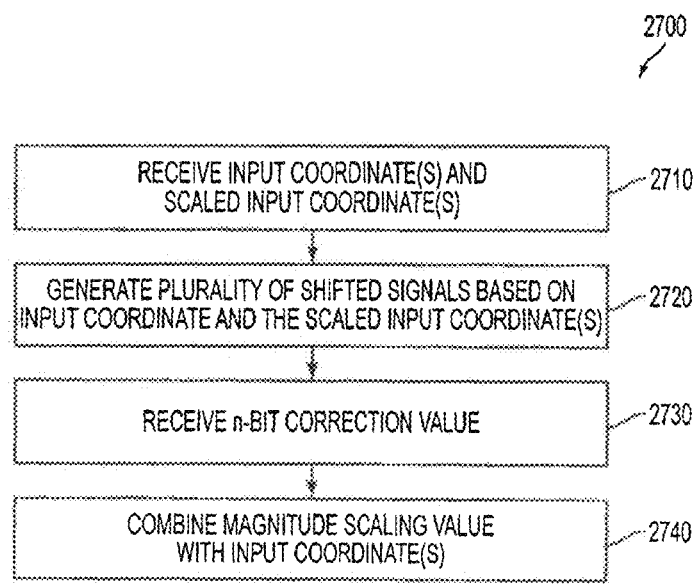

FIG. 27 is a flowchart of a method for performing fine-stage magnitude scaling, according to an embodiment of the present invention.

Figure 28:
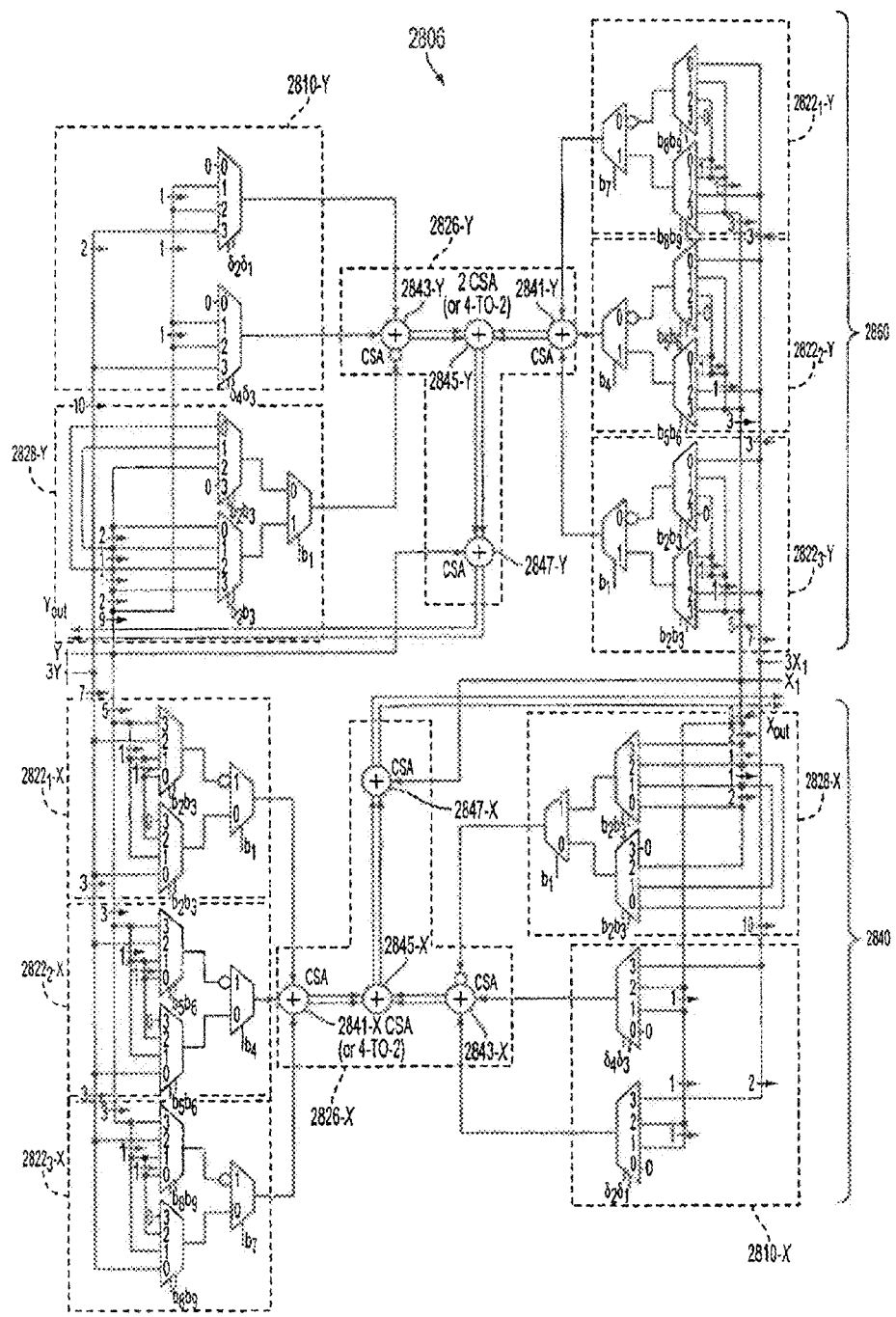

FIG. 28 depicts an exemplary fine stage incorporating an architectural efficiency wherein, a four CSA processing delay is shown, according to embodiments of the present invention.

Figure 29:
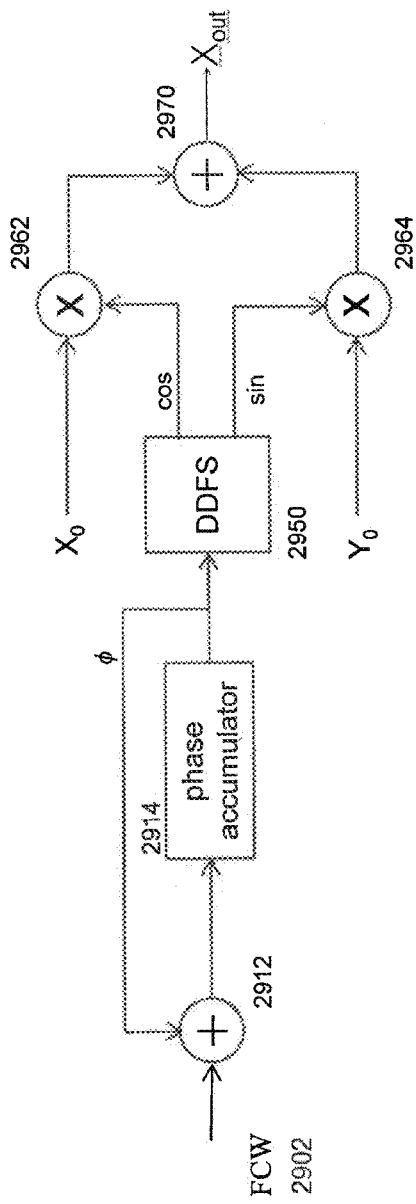

FIG. 29 depicts a conventional quadrature modulator.

Figure 30:
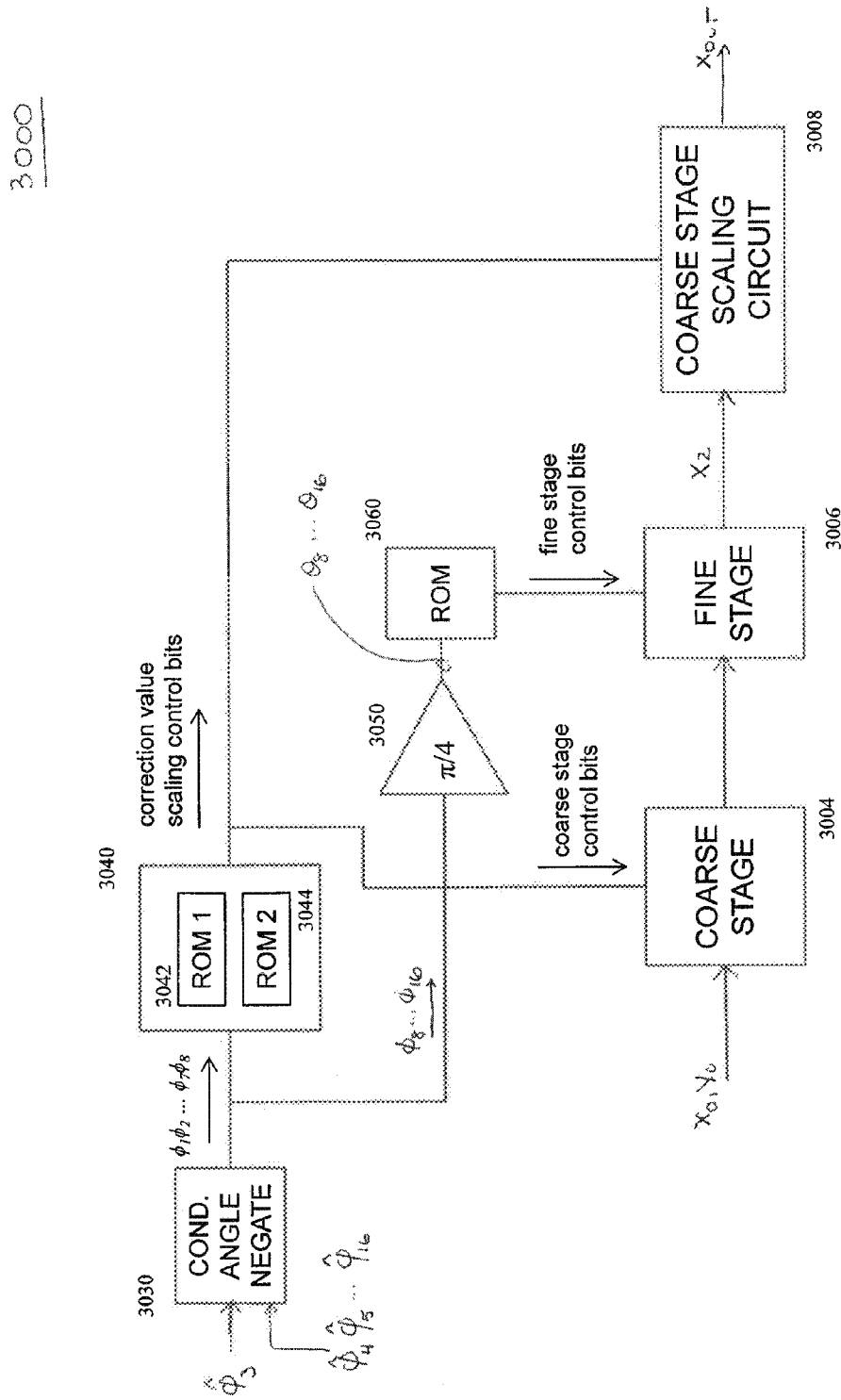

FIG. 30 is a block diagram of a quadrature modulator, according to embodiments of the present invention.

Figure 31A:
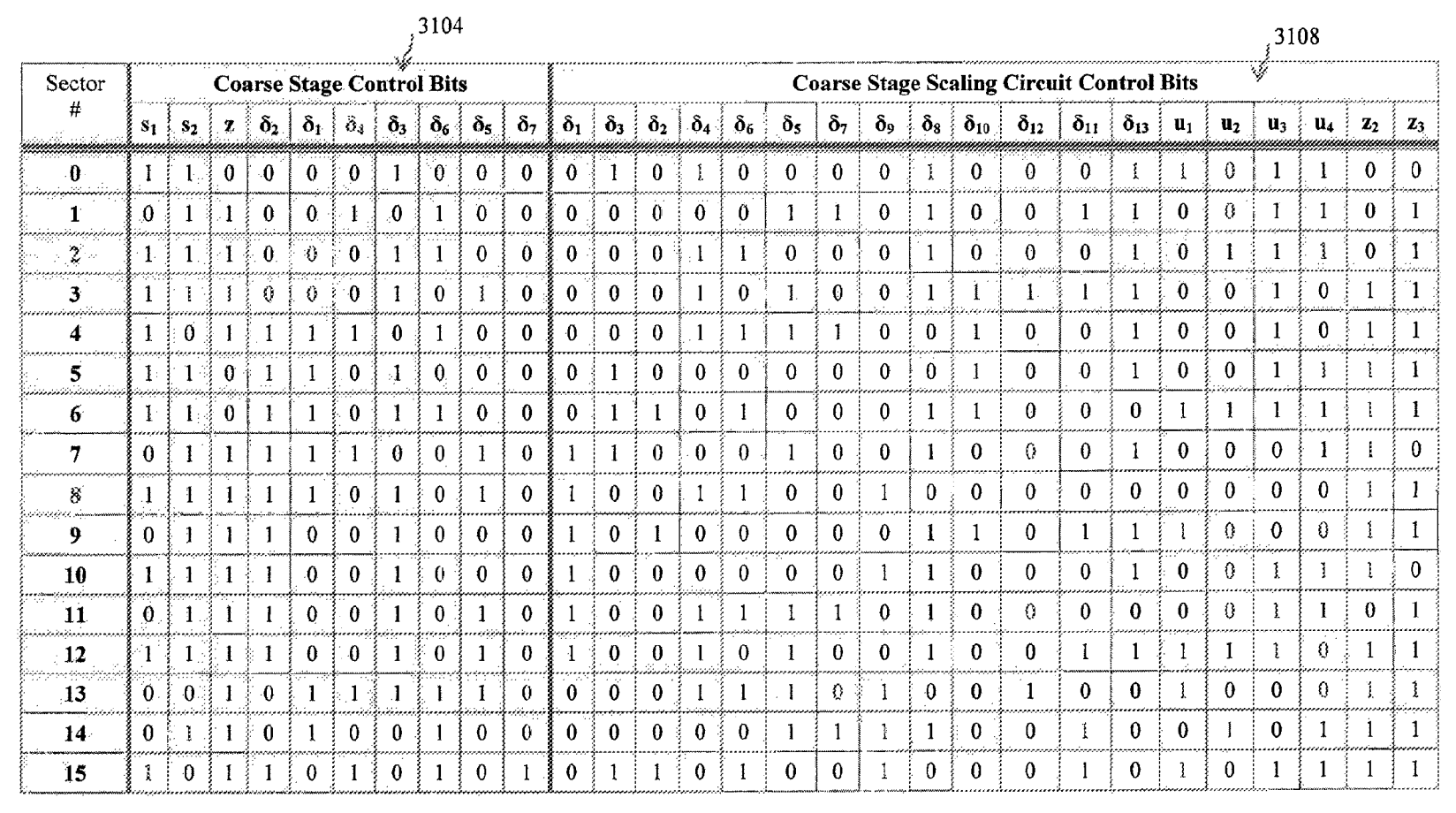

FIG. 31A illustrates exemplary data for large angles that may be stored in ROM and FIG. 31B illustrates exemplary data for small angles that may be stored in ROM, according to embodiments of the present invention.

Figure 1:
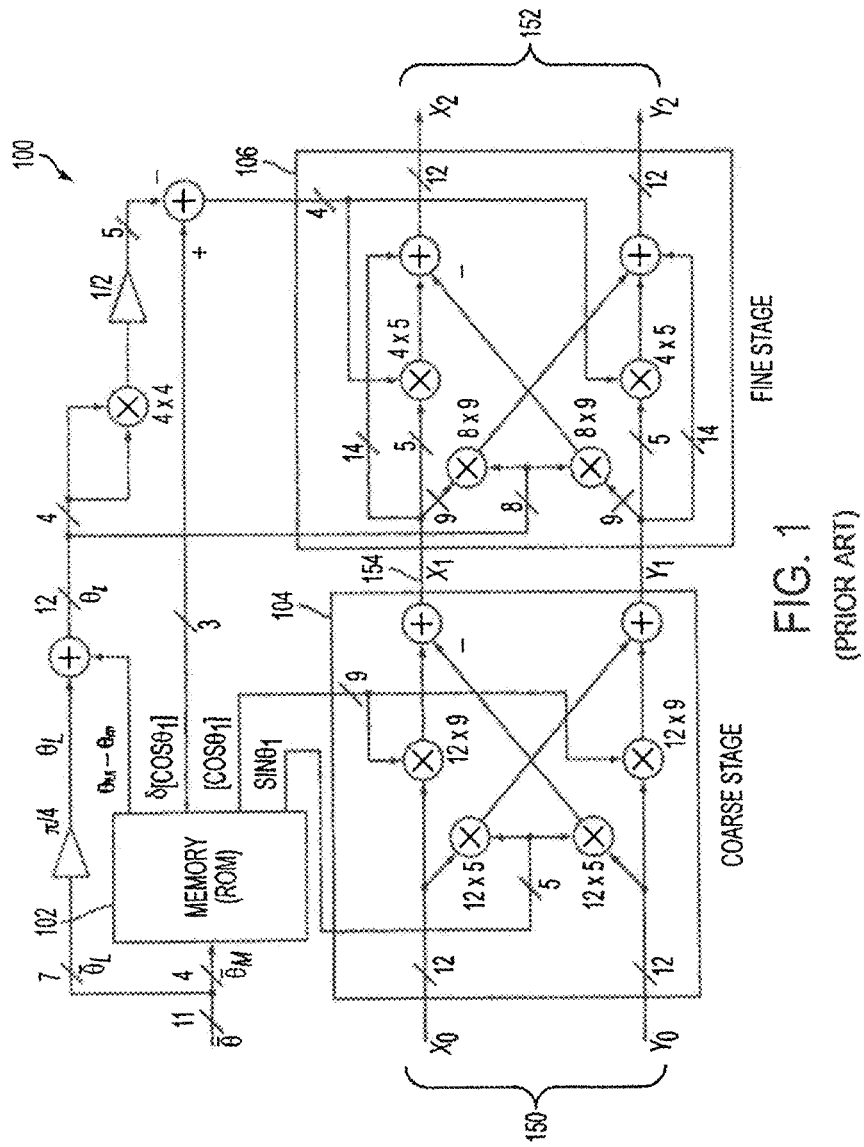
FIG. 1 illustrates a block diagram of a prior-art angle rotator.
Figure 2:
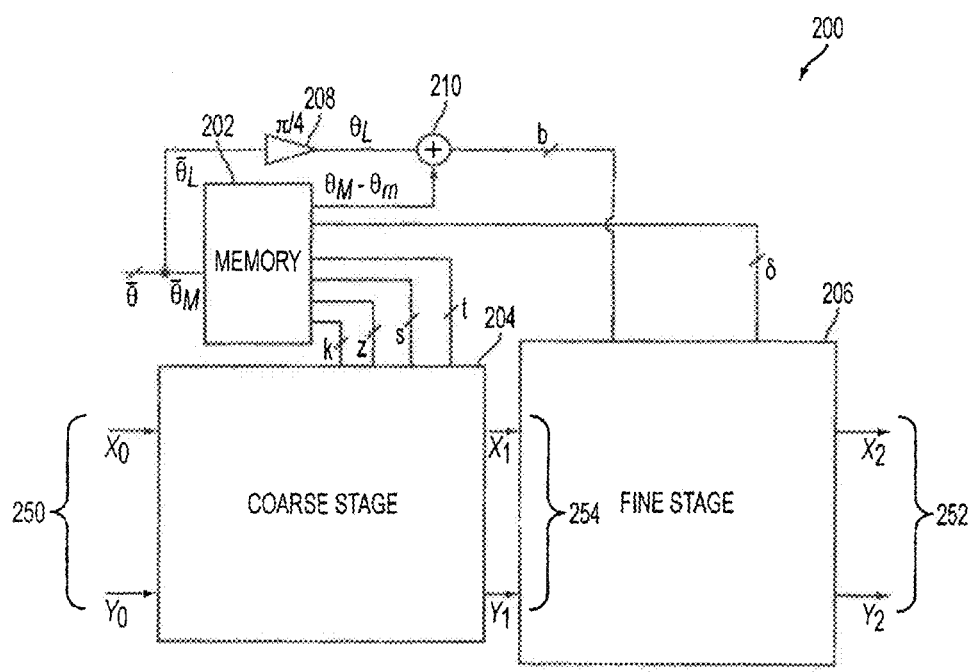
FIG. 2 illustrates a block diagram of an angle rotator according to an exemplary embodiment of the present invention.
Figure 3:
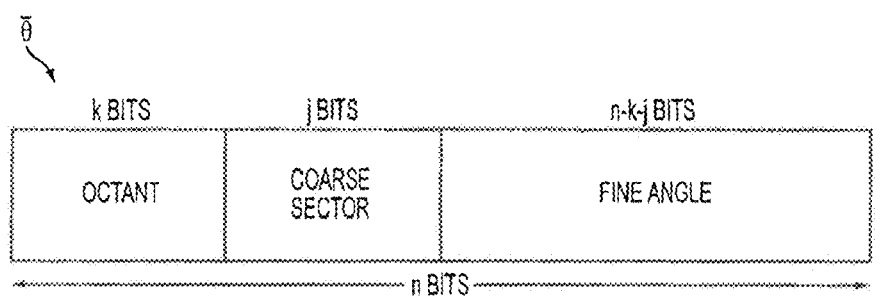
FIG. 3 illustrates an exemplary formatting of an angle used by the angle rotator according to an exemplary embodiment of the present invention.

FIG. 32A-1 depicts a mapping of the placement of FIGS. 32A-2 and 32A-3 to create chart 3204.

FIGS. 32A-2 and 32A-3 and FIG. 32B depict spreadsheets used to determine the necessary control bits to store in the ROMs for coarse stage and coarse stage scaling module.

Figure 33:
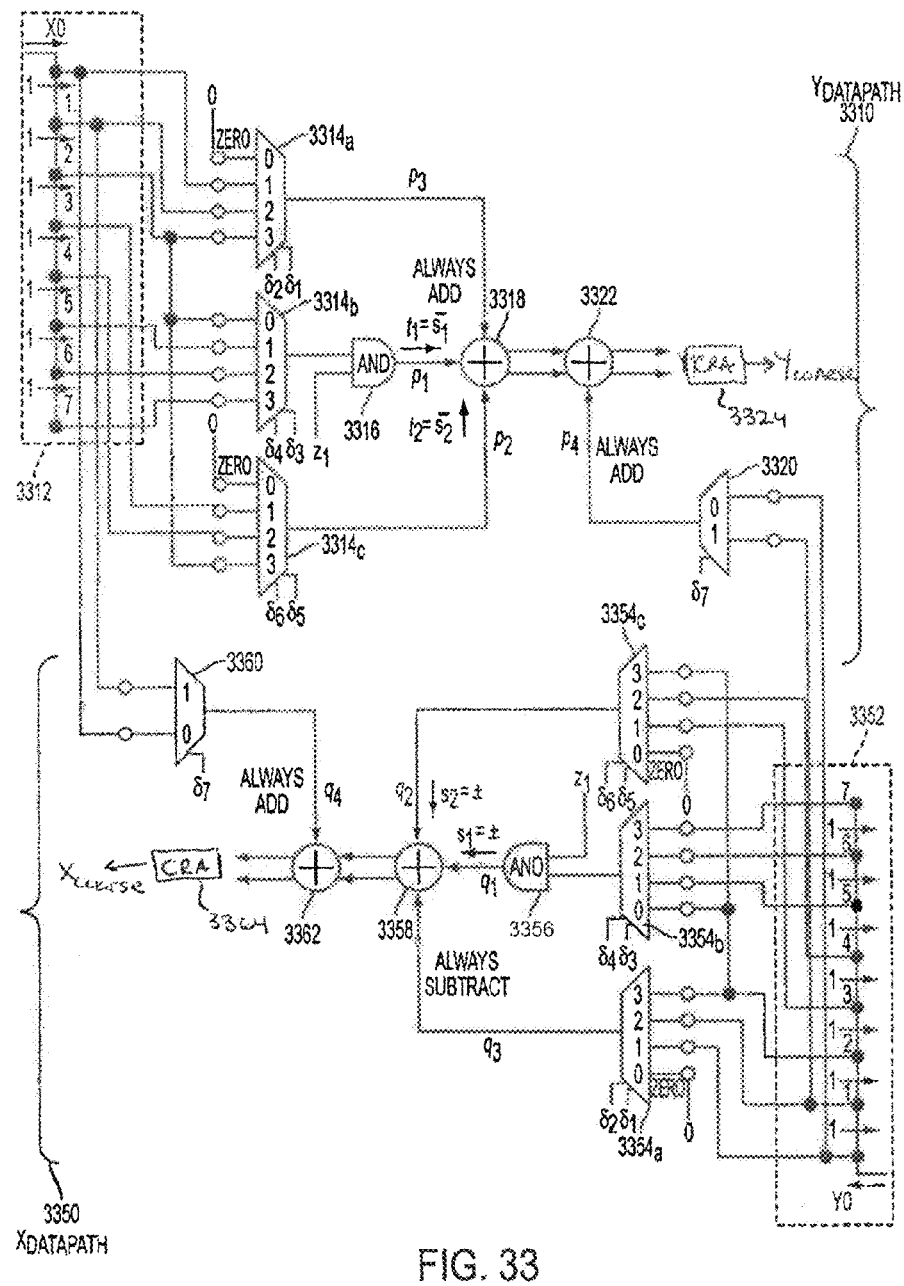

FIG. 33 depicts a block diagram of an exemplary coarse stage, according to embodiments of the present invention.

Figure 34:
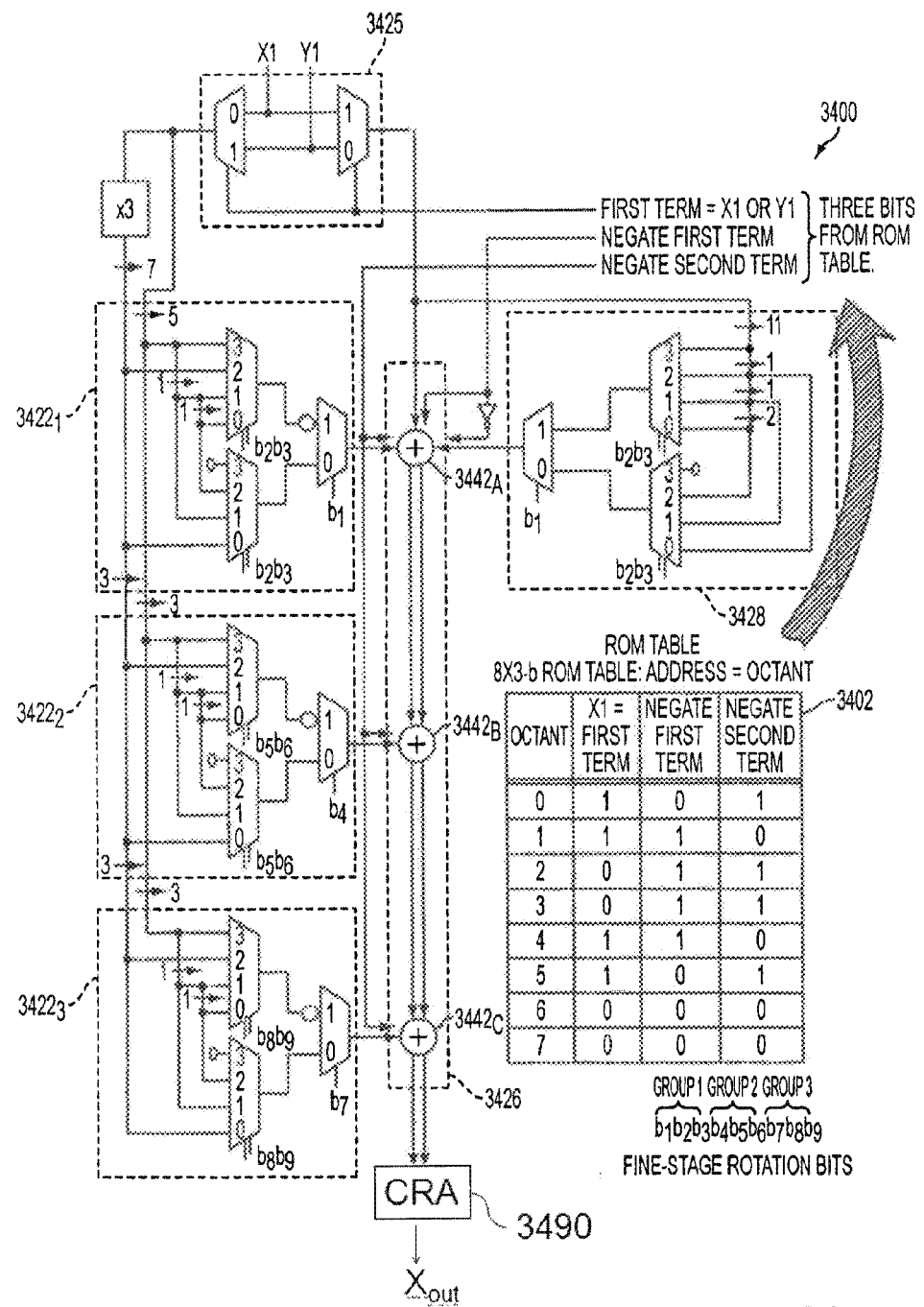

FIG. 34 depicts a block diagram of an exemplary two-multiplier fine-stage circuit, according to embodiments of the present invention.

Figure 35:
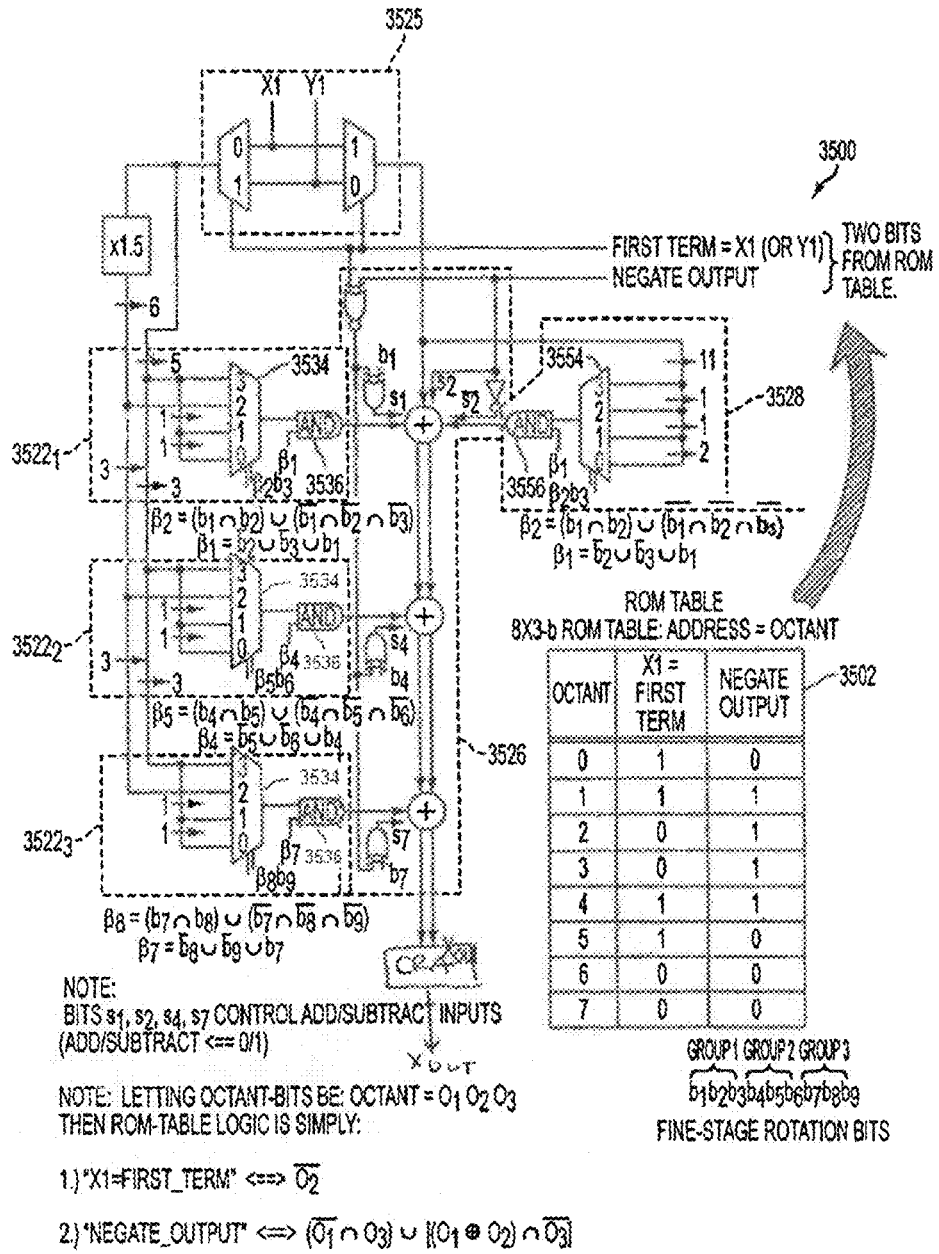

FIG. 35 depicts a block diagram of a consolidated fine-stage, according to embodiments of the present invention.

Figure 36:
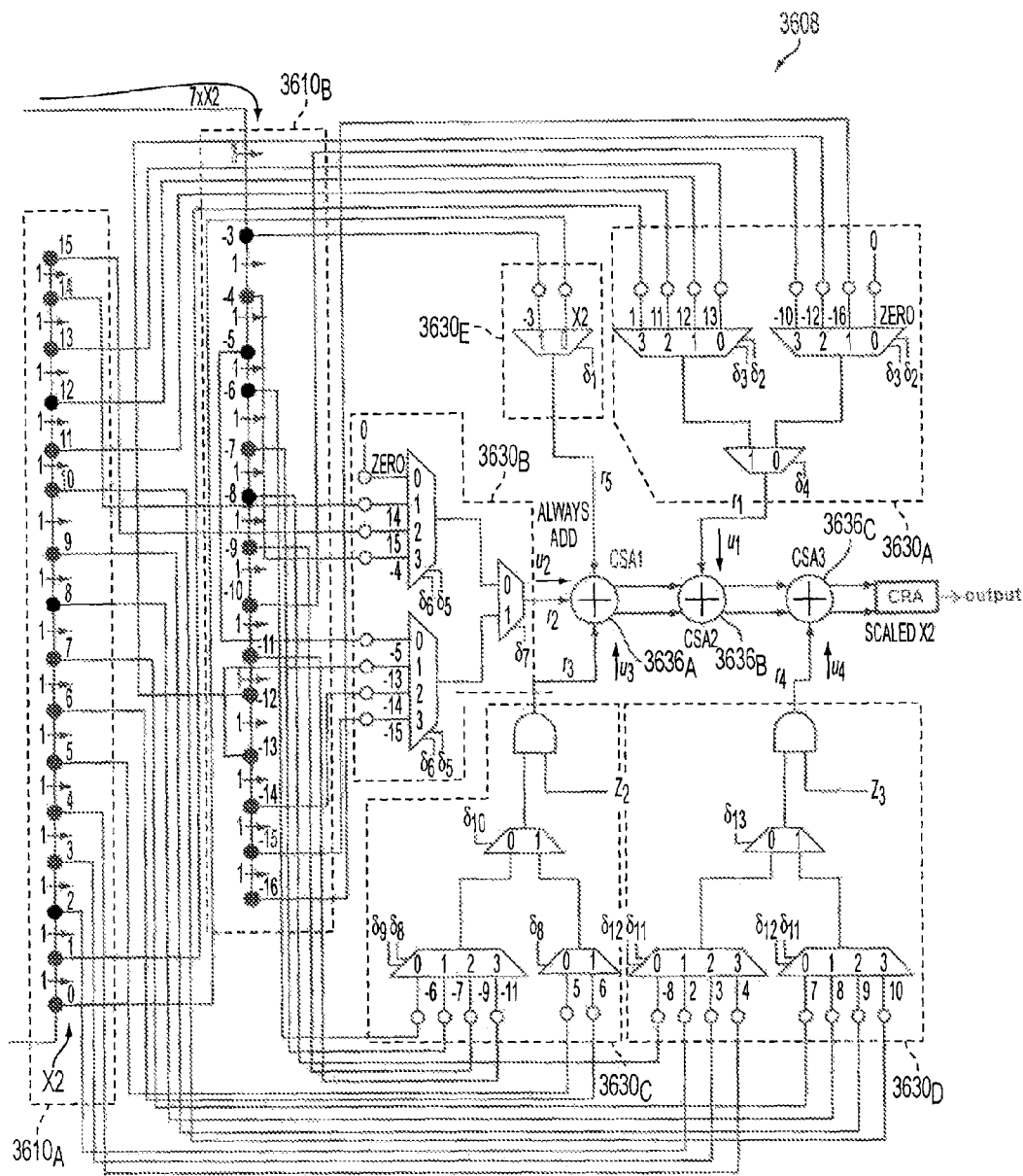

FIG. 36 depicts a block diagram of coarse-stage scaling circuit, according to embodiments of the present invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following detailed description of the present invention refers to the accompanying drawings that illustrate exemplary embodiments consistent with this invention. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it is submitted that it is within the knowledge of one skilled in the art to effect such feature, structure, or characteristic in connection with other embodiments whether or not explicitly described.

Other embodiments are possible, and modifications may be made to the embodiments within the spirit and scope of the invention. Therefore, the detailed description is not meant to limit the invention. Rather, the scope of the invention is defined by the appended claims.

FIG. 1 illustrates a block diagram of a prior-art angle rotator. A prior-art angle rotator 100 may be used in a digital device, such as, but not limited to, a digital mixer. The prior-art angle rotator 100 rotates a complex input signal 150 having coordinates $(X_0, Y_0)$ to produce a rotated complex output signal 152. Rotation of the complex input signal 150 in the X-Y plane counterclockwise, around the origin, by the angle $\theta$, results in the rotated complex output signal 152 having coordinates $(X_2, Y_2)$. The complex output signal 152 is related to the complex input signal 150 as:

$$X2 = X0 \cos\theta - Y0 \sin\theta$$

$$Y2 = Y0 \cos\theta + X0 \sin\theta. \quad (1)$$

As shown in FIG. 1, the angle $\theta$ may be broken down into a most significant portion (or word) $\theta_M$ and least significant portion (word) $\theta_L$. The rotation of the complex input signal 150 may be decomposed into two stages: a coarse rotation of the complex input signal 150 by $\theta_M$ followed by a fine rotation of an intermediate complex number 154 by $\theta_L$. More specifically, the rotation of the complex input signal 150 may be decomposed into:

$$X_1 = X_0 \cos\theta_M - Y_0 \sin\theta_M$$

$$Y_1 = Y_0 \cos\theta_M + X_0 \sin\theta_M \quad (2)$$

and $$X_2 = X_1 \cos\theta_L - Y_1 \sin\theta_L$$

$$Y_2 = Y_1 \cos\theta_L + X_1 \sin\theta_L, \quad (3)$$

where (2) represents the coarse rotation of the complex input signal 150, and (3) represents the fine rotation of the intermediate complex number 154.

Note that normalized angle values are shown in FIG. 1, as represented by the $\bar{\theta}$ nomenclature. However, normalized angle values are not required, as will be understood by those skilled in the relevant art(s). For example, the angle $\bar{\theta}$ may be represented by eleven bits, of which the first four bits designate the most significant portion $\bar{\theta}_M$, and the remaining seven bits designate the least significant portion $\bar{\theta}_L$. A ROM 102 stores the following for each most significant portion $\bar{\theta}_M$: sin $\theta_l$, [cos $\theta_l$], $\delta_{[\cos \theta_l]}$, and $\theta_M - \theta_m$, where all of these values are further described in U.S. Pat. No. 7,203,718 to Fu et al., entitled "Apparatus and Method for Angle Rotation," filed on Oct. 30, 2000 (Fu I), which is incorporated by reference in its entirety.

In the conventional angle rotator 100, a coarse rotation butterfly circuit 104 performs the coarse rotation of the complex input signal 150 to produce the intermediate complex number 154 having coordinates $(X_1, Y_1)$ using the sin $\theta_l$ and

[cos $\theta_I$] values from the ROM 102. More specifically, the coarse rotation butterfly circuit 104 calculates:

$$X_1 = X_0[\cos\theta_I] - Y_0 \sin\theta_I$$

$$Y_1 = Y_0[\cos\theta_I] + X_0 \sin\theta_I, \quad (4)$$

for the given most significant portion $\overline{\theta}_M$. As shown in FIG. 1, the coarse rotation butterfly circuit 104 includes multiple multipliers and adders to implement the coarse rotation of the complex input signal 150. In particular, the coarse rotation butterfly circuit 104 receives $(C,S) \equiv ([\cos\theta_I], \sin\theta_I)$ from the ROM 102 and uses the $\sin\theta_I$ and the $[\cos\theta_I]$ values as coefficients of four multipliers and two adders to rotate the input point $(X_0, Y_0)$ to produce the intermediate complex number 154.

A fine rotation butterfly circuit 106 performs the fine rotation of the intermediate complex number 154 to produce the complex output signal 152. More specifically, the fine rotation butterfly circuit 106 calculates:

$$X_2 = X_1 \cos\theta_L - Y_1 \sin\theta_L$$

$$Y_2 = Y_1 \cos\theta_L + X_1 \sin\theta_L, \quad (5)$$

for a given least significant portion $\overline{\theta}_L$. As shown in FIG. 1, the fine rotation butterfly circuit 106 includes multiple multipliers and adders to implement the fine rotation of the intermediate complex number 154. The conventional angle rotator 100 is further described in Fu I.

FIG. 1 can be further understood by reviewing A. Torosyan, D. Fu, and A. N. Willson, Jr., "A 300-MHz Quadrature Direct Digital Synthesizer/Mixer in 0.25-µm CMOS," *IEEE J. Solid-State Circuits*, vol. 38, no. 6, pp. 875-887, June 2003, (Torosyan I), which is incorporated herein by reference in its entirety.

FIG. 2 illustrates a block diagram of an angle rotator according to an exemplary embodiment of the present invention. An angle rotator 200 may be used in a digital device, such as, but not limited to, a digital mixer.

As will be understood by those skilled in the relevant art(s) from the teachings provided herein, the angle rotator 200 may be readily implemented in hardware, software, or a combination of hardware and software. For example, based on the teachings provided herein, those skilled in the relevant art(s) could implement the angle rotator 200 via a combination of one or more application specific integrated circuits and a processor core for implementing software commands stored in one or more attached memories and/or a state machine having digital logic devices in integrated or hybrid from to provide some examples. However, these examples are not limiting, and other implementations are within the spirit and scope of the present invention.

The angle rotator 200 rotates a complex input signal 250 having coordinates $(X_0, Y_0)$ to produce a rotated complex output signal 252. Rotation of the complex input signal 250 in the X-Y plane counterclockwise, around the origin, by the angle $\theta$, results in the rotated complex output signal 252 having coordinates $(X_2, Y_2)$. The complex output signal 252 is related to the complex input signal 250 as:

$$X_2 = X_0 \cos\theta - Y_0 \sin\theta$$

$$Y_2 = Y_0 \cos\theta + X_0 \sin\theta. \quad (6)$$

The rotation of the complex input signal 250 may be decomposed into two stages: a coarse rotation of the complex input signal 250 by $\theta_M$ followed by a fine rotation of an intermediate complex number 254 by $\theta_L$. More specifically, the rotation of the complex input signal 250 may be decomposed into:

$$X_1 = X_0 \cos\theta_M - Y_0 \sin\theta_M$$

$$Y_1 = Y_0 \cos\theta_M + X_0 \sin\theta_M \quad (7)$$

and $$X_2 = X_1 \cos\theta_L - Y_1 \sin\theta_L$$

$$Y_2 = Y_1 \cos\theta_L + X_1 \sin\theta_L, \quad (8)$$

where (7) represents the coarse rotation of the complex input signal 250, and (8) represents the fine rotation of the intermediate complex number 254.

The angle $\theta$ may be separated into a coarse angle $\theta_M$ and a fine angle $\theta_L$. In an exemplary embodiment shown in FIG. 3, the normalized angle $\overline{\theta}$ may be represented by n bits, of which k bits designate a partition, j bits designate the normalized coarse angle $\overline{\theta}_M$, and n−k−j bits designate the normalized fine angle $\overline{\theta}_L$. For example, the normalized angle $\overline{\theta}$ may be represented by sixteen bits, of which the first three most significant bits designate the octant, the next four bits designate the normalized coarse angle $\overline{\theta}_M$, and the remaining nine bits designate the normalized fine angle $\overline{\theta}_L$. However, those skilled in the relevant art(s) will recognize that the angle $\theta$ may be represented by any suitable data length having any suitable data format without departing from the spirit and scope of the present invention. In an exemplary embodiment, the "normalization" referred to in the example is one wherein all 16 bits define a positive binary fraction where the upper limiting value 1 represents a normalized value for the radian-valued angle $2\pi$. Thus, the three MSBs of $\overline{\theta}$ naturally designate the smallest angle within each of a circle's eight octants. Similarly, an octant may be divided into 16 sectors, with each sector being designated by the normalized four-bit value $\overline{\theta}_M$ that specifies the normalization of the coarse angle $\theta_M$. It follows, therefore, as will be understood by one of ordinary skill in the art, that the symbol $\overline{\theta}_M$ can be used to designate a specific angle value, or to designate a specific sector within an octant that contains the angle $\theta_M$, depending on the context in which it is used. For example, the angle $\theta$, understood to be within a specified octant, may be represented by n bits, of which the k most significant bits designate the coarse angle $\theta_M$, and the remaining n−k bits designate the fine angle $\theta_L$. In an exemplary embodiment, the bits that designate the octant are removed from the angle $\theta$ before rotation of the complex input signal 250.

1. Coarse Stage Architecture 1.1 Overview

A coarse rotation butterfly circuit 204 performs the coarse rotation of the complex input signal 250 to produce the intermediate complex number 254 having coordinates $(X_1, Y_1)$ based upon the coarse angle $\theta_M$. More specifically, the coarse rotation butterfly circuit 204 generates the intermediate complex number 254 by calculating:

$$X_1 = X_0 \cos\theta_M - Y_0 \sin\theta_M$$

$$Y_1 = Y_0 \cos\theta_M + X_0 \sin\theta_M. \quad (9)$$

Unlike the conventional coarse rotation butterfly circuit 104, the coarse rotation butterfly circuit 204 implements the multiplications, such as, but not limited to, $X_0 \cos\theta_M$, $Y_0 \sin\theta_M$, $Y_0 \cos\theta_M$, and $X_0 \sin\theta_M$, in shift and add/subtract signed-power-of-two (SPT) form rather than simply storing and retrieving multiplier coefficient values using a memory storage device, such as the ROM 102.

1.2 Exemplary Numbering Systems

The specific cosine and sine values, denoted as (C, S), such as, but not limited to, the $\cos\theta_M$ and/or the $\sin\theta_M$, may be expressed in an SPT numeral system. Those skilled in the arts will recognize that the specific cosine and sine values (C, S) may also define a point (C, S) in the plane that is within, but close to the boundary of the unit circle without departing from the spirit and scope of the present invention. The specific cosine and sine values (C, S) for any angle θ may be expressed using a positional numbering system, such as, but not limited to, the binary numeral system. In the positional numbering system, specific cosine and sine values (C, S) may be represented by a unique series of digits. Each digit position may be represented by an associated weight of $b^i$, where b represents the base, or radix of the number system. A general form of specific cosine and sine values (C, S) in such a system is given as:

$$d_{p-1}d_{p-2}\ldots d_1d_0.d_{-1}d_{-2}\ldots d_{-n}, \quad (10)$$

where there are p digits to the left of a point, called the radix point, and n digits to the right of the point. The value of the specific cosine and sine values (C, S) may be expressed as:

$$D = \sum_{p-1 \geq i \geq -n} d_i * b^i, \quad (11)$$

where D represents the summation of each digit multiplied by the corresponding power of the radix. The binary numeral system is a positional numbering system wherein each digit position has a weight of $2^i$. For example, for an angle θ≈0.794 radians, the specific cosine and sine values (C, S) may be expressed in the binary numeral system as:

cos θ=0.101101010 sin θ=0.10111, (12)

where the binary representations of cos θ and sin θ have been truncated to nine bits and five bits, respectively.

In a signed positional numeral system, the specific cosine and sine values (C, S) may be represented by a non-unique series of digits. Each digit position may be represented by an associated weight of $b^i$, where b represents the base, or radix of the number system, and an associated sign. The value of the specific cosine and sine values (C, S) may be expressed as:

$$D = \sum_{p-1 \geq i \geq -n} \pm d_i * b^i, \quad (13)$$

where D represents the summation of each digit multiplied by the corresponding power of the radix and the corresponding sign. The SPT numeral system is a signed positional numeral system wherein each digit position has a corresponding weight of $2^i$ and a corresponding sign. For example, for the angle θ≈0.794 radians, the specific cosine and sine values (C, S) may be expressed in the SPT numeral system as:

cos θ=1.0$\bar{1}$00$\bar{1}\bar{1}$010 sin θ=1.0$\bar{1}$00$\bar{1}$, (14)

where the symbol $\bar{1}$ represents a −1 or, more precisely, a digit that receives a negated $2^k$ weighting instead of the $2^k$ weighting that the digit would receive in a binary numeral system.

Unlike the uniqueness of the positional number system, a representation of specific cosine and sine values (C, S) in the signed positional numeral system is non-unique. In other words, the representation of the specific cosine and sine values (C, S) in the signed positional numeral system may include one or more non-unique series of digits. For example, the binary numeral system representation of a decimal integer 21 is a unique representation 10101. However, the decimal integer 21 may also be represented by one or more non-unique series of digits in the SPT numeral system, such as 110$\bar{1}$1 (or 24-3 in decimal), 10$\bar{1}$0$\bar{1}\bar{1}$ (or 32-11 in decimal), and/or 101101 (or 33-12 in decimal) to provide some examples. To create efficient circuitry for implementing the coarse rotation butterfly circuit 204, it can be helpful for certain specific pairs of digits never to occur in any representation of the specific cosine and sine values (C, S) in the SPT numeral system. To provide this feature, it can be helpful to examine several alternate forms of the SPT numeral system representation of the specific cosine and sine values (C, S) that yield the same desired number. The non-uniqueness feature of the SPT numeral system may be used to provide a needed representation of a number in which certain specific digits must be zero.

As a special case of the SPT numeral system, the specific cosine and sine values (C, S) may be represented in a Canonic Signed-Digit (CSD) numeral system. In the CSD numeral system, the specific cosine and sine values (C, S) may be represented by a unique series of signed digits. Each digit position may be represented by an associated weight of $b^i$, where b represents the base, or radix of the number system, and an associated sign. The value of the specific cosine and sine values (C, S) may be expressed as:

$$D = \sum_{p-1 \geq i \geq -n} \pm d_i * b^i, \quad (15)$$

where D represents the summation of each digit multiplied by the corresponding power of the radix and the corresponding sign. Conversion of the specific cosine and sine values (C, S) from a representation in the positional number system, such as the binary numeral system, to the CSD numeral system is well known in the art. The CSD form ensures the specific cosine and sine values (C, S) contain the fewest number of non-zero bits. For example, for the angle θ≈0.794 radians, the specific cosine and sine values (C, S) may be expressed in the CSD numeral system as:

cos θ=1.0$\bar{1}$0$\bar{1}$01010, sin θ=1.0$\bar{1}$00$\bar{1}$, (16)

where the symbol $\bar{1}$ represents a −1 or, more precisely, a digit that receives a negated $2^k$ weighting instead of the $2^k$ weighting that the digit would receive in the binary numeral system.

1.3 Shift and Add/Subtract SPT Form

The coarse rotation butterfly circuit 204 employs the SPT numeral system representation of sine and cosine values to implement the multiplications in shift and add/subtract SPT form to calculate the intermediate complex number 254. However, those skilled in the relevant art(s) will recognize that the teachings herein may be equally applied to representations in the CSD numeral system without departing from the spirit and scope of the present invention. From the discussion above, the coarse rotation butterfly circuit 204 calculates the intermediate complex number 254 according to:

$$X_1 = X_0 \cos\theta_M - Y_0 \sin\theta_M$$

$$Y_1 = Y_0 \cos\theta_M + X_0 \sin\theta_M, \quad (17)$$

which may be expressed as:

$$\begin{bmatrix} X_1 \\ Y_1 \end{bmatrix} = \begin{bmatrix} C & -S \\ S & C \end{bmatrix} \begin{bmatrix} X_0 \\ Y_0 \end{bmatrix}, \quad (18)$$

where C may represent the $\cos \theta_M$ and S may represent the $\sin \theta_M$. Consider an angle $\theta$ whose specific cosine and sine values (C, S) may be represented by an n-bit number in the SPT numeral system and a k-bit number in the SPT numeral system, respectively. The specific cosine value C for the angle $\theta$ may be represented as $C=<c_0 \cdot c_{-1} c_{-2} \ldots c_{-n}>$. Likewise, the specific sine value S for the angle $\theta$ may be represented as $S=<s_0 \cdot s_{-1} s_{-2} \ldots s_{-k}>$. Thus, for the angle $\theta$, the desired computation for the coarse rotation butterfly circuit 204 rotation of the complex input signal 250 may be expressed as:

$$\begin{bmatrix} X_1 \\ Y_1 \end{bmatrix} = \begin{bmatrix} C_0 X_0 \pm C_{-1} X_0 \times 2^{-1} \pm \ldots \pm C_{-a} X_0 \times 2^{-n} - \\ S_0 Y_0 \mp S_{-1} Y_0 \times 2^{-1} \mp \ldots \mp S_{-k} Y_0 \times 2^{-k} \\ S_0 X_0 \pm S_{-1} X_0 \times 2^{-1} \pm \ldots \pm S_{-k} X_0 \times 2^{-k} + \\ C_0 Y_0 \pm C_{-1} Y_0 \times 2^{-1} \pm \ldots \pm C_{-n} Y_0 \times 2^{-n} \end{bmatrix} \quad (19)$$

where the coefficients $C_0$ through $C_{-n}$ and $S_0$ through $S_{-k}$ represent the magnitude of the coefficients $c_0$ through $c_{-n}$ and $s_0$ through $s_{-k}$. Using "rtsh($X_0$, d)" to denote a right-shift of the $X_0$ coordinate of the complex input signal 250 by d bits, which is equivalent to multiplying $X_0$ by $2^{-d}$, the computation of the intermediate complex number 254 may be expressed as:

$$\begin{bmatrix} X_1 \\ Y_1 \end{bmatrix} = \begin{bmatrix} C_0 X_0 + C_{-1} rtsh(X_0, 1) \pm \ldots \pm C_n rtsh(X_0, n) - \\ S_0 Y_0 \mp S_{-1} rtsh(Y_0, 1) \mp \ldots \mp S_{-k} rtsh(Y_0, k) \\ S_0 X_0 \pm S_{-1} rtsh(X_0, 1) \pm \ldots \pm S_{-k} rtsh(X_0, k) + \\ C_0 Y_0 \pm C_{-1} rtsh(Y_0, 1) \pm \ldots \pm C_{-n} rtsh(Y_0, n) \end{bmatrix}. \quad (20)$$

As an example, consider a specific computation of the coarse rotation butterfly circuit 204 for an angle $\theta$ whose specific cosine value C is represented by the 8-bit binary fraction of 0.11100010 and whose specific sine value S is represented by the 5-bit binary fraction of 0.01111. However, this example is not limiting, those skilled in the relevant art(s) will recognize that this example is for illustrative purposes only. From the discussion above, the binary representations for the specific cosine and sine values (C, S) may be expressed in the SPT numeral system as $C=1.00\bar{1}00010$ and $S=0.1000\bar{1}$. Thus, for the angle $\theta$, the desired computation for the coarse rotation butterfly circuit 204 rotation of the complex input signal 250 may be expressed as:

$$\begin{bmatrix} X_1 \\ Y_1 \end{bmatrix} = \begin{bmatrix} C & -S \\ S & C \end{bmatrix} \begin{bmatrix} X_0 \\ Y_0 \end{bmatrix} = \begin{bmatrix} X_0 - 2^{-3} X_0 + 2^{-7} X_0 - 2^{-1} Y_0 + 2^{-5} Y_0 \\ Y_0 - 2^{-3} Y_0 + 2^{-7} Y_0 + 2^{-1} X_0 - 2^{-5} X_0 \end{bmatrix}. \quad (21)$$

Once again, using "rtsh($X_0$, d)" to denote the right-shift of the $X_0$ coordinate of the complex input signal 250 by d bits, the computation of the intermediate complex number 254 may be expressed as:

$$\begin{bmatrix} X_1 \\ Y_1 \end{bmatrix} = \begin{bmatrix} X_0 - rtsh(X_0, 3) + rtsh(X_0, 7) - rtsh(Y_0, 1) + rtsh(Y_0, 5) \\ Y_0 - rtsh(Y_0, 3) + rtsh(Y_0, 7) + rtsh(X_0, 1) - rtsh(X_0, 5) \end{bmatrix}. \quad (22)$$

The representations of approximations to specific cosine and sine values (C, S) for the angle $\theta$ may be implemented using a signed positional numeral system, such as the SPT numeral system, or the CSD numeral system to facilitate the use of multiplexers in the coarse-rotation butterfly circuit 204. The non-uniqueness feature of the SPT numeral system allows (20) and/or (22) to be adjusted such that certain specific pairs of shifting operations will never occur in any expression for specific (C, S) values in the SPT numeral system. For example, the specific (C, S) values in (22) may be adjusted such that at most one of rtsh($X_0$,2), rtsh($X_0$,3), and rtsh($X_0$,6) and/or at most one of $Y_0$, rtsh($Y_0$,5), rtsh($Y_0$,6) is necessary to produce the $X_1$ coordinate of the intermediate complex number 254. In other words, the specific (C, S) values representing cosine and sine for the angle $\theta$ may be adjusted such that no specific value C in the coarse-rotation butterfly circuit 204 will have more than one of its fractional bits 2, 3, and 6 nonzero, and similarly, no specific sine value S in the coarse-rotation butterfly circuit 204 will have more than one of its bits 0, 5 and 6 nonzero.

The non-uniqueness feature of the SPT numeral system also allows (20) and/or (22) to be adjusted such that certain specific pairs of coefficients will never occur in any expression of the specific (C, S) values in the SPT numeral system. For example, the coefficients $C_0$ through $C_{-8}$ and $S_0$ through $S_{-6}$ in (20) may be adjusted such that at most one of $C_{-2}$, $C_{-3}$, and $C_{-6}$ will be non-zero, both $C_{-4}$ and $C_{-5}$ will not be non-zero, both $C_{-7}$ and $C_{-8}$ will not be non-zero. Also, at most one of $S_{-1}$ and $S_{-2}$ will be non-zero, at most one of $S_{-3}$ and $S_{-4}$ will be non-zero, and at most one of $S_0$, $S_{-5}$ and $S_{-6}$ will be non-zero.

1.4 Exemplary Shifting Methods

Figure 4A:
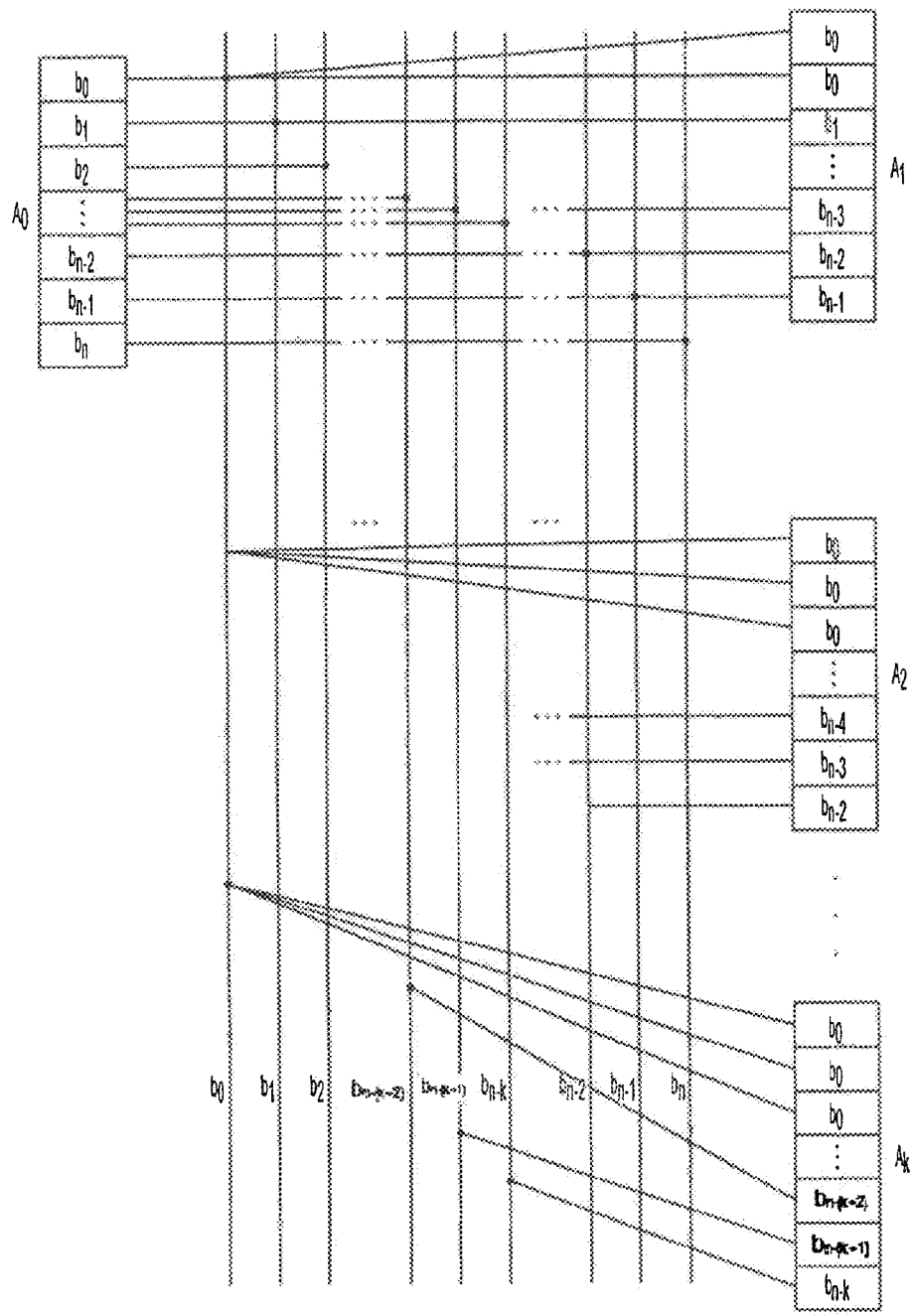
FIG. 4A illustrates a "hard-wired" method of shifting used by the coarse rotation butterfly circuit according to an exemplary embodiment of the present invention.
Figure 4B:
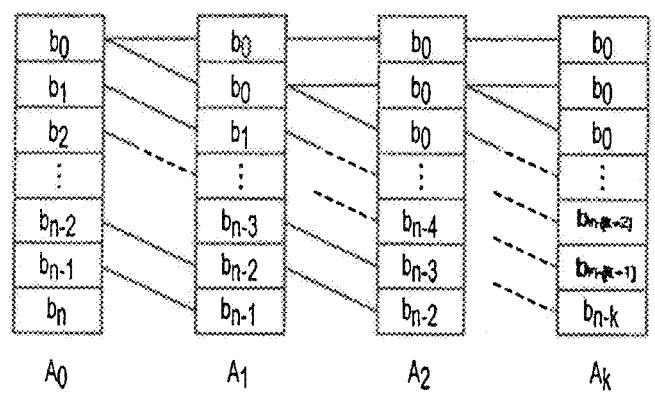
FIG. 4B illustrates the "hard-wired" method of shifting used by the coarse rotation butterfly circuit according to another exemplary embodiment of the present invention.

From the discussion above, the computation of the $X_1$ coordinate and the $Y_1$ coordinate of the intermediate complex number 254 may involve a right shift of the $X_0$ coordinate of the complex input signal 250 by one or more bits and a right shift of the $Y_0$ coordinate of the complex input signal 250 by one or more bits. The right shifting of the $X_0$ coordinate may occur simultaneously with and/or separately from the right shifting of the $Y_0$ coordinate. FIG. 4A and FIG. 4B illustrate "hard-wired" methods of shifting used by the coarse-rotation butterfly circuit according to embodiments of the present invention. As shown in FIG. 4A and FIG. 4B, $A_0$ may be represented as a bit sequence $<b_0 b_1 b_2 \ldots b_{n-2} b_{n-1} b_n>$ where $b_0$ represents the most significant bit and $b_n$ represents the least significant bit. $A_0$ may represent an exemplary embodiment of the $X_0$ coordinate of the complex input signal 250. The "hard-wired" method of shifting may shift $A_0$ by one bit to produce a bit sequence $<b_0 b_0 b_1 \ldots b_{n-3} b_{n-2} b_{n-1}>$, denoted as $A_1$ in FIG. 4A. The second most significant bit of $A_1$ corresponding to $b_0$ may be replicated as the most significant bit of $A_1$. More specifically, shifting $A_0$ results in $A_1$ having a bit sequence $<\_b_0 b_1 \ldots b_{n-3} b_{n-2} b_{n-1}>$ where "_" denotes an unoccupied bit as a result of the shifting operation. As a result, the second most significant bit of $A_1$ is extended to or replicated onto the most significant bit of $A_1$. In an exemplary embodiment, $A_1$ is produced by directly connecting or "hard-wiring" each of its bits in the bit sequence $<b_0 b_0 b_1 \ldots b_{n-3} b_{n-2} b_{n-1}>$ to corresponding bits in $A_0$ as shown in FIG. 4A. In another exemplary embodiment, shown in FIG. 4B, $A_1$ is produced by directly connecting each of its bits in the bit sequence <$b_0 b_0 b_1 \ldots b_{n-3} b_{n-2} b_{n-1}$> to a lesser shifted data stream, such as $A_0$ to provide an example.

Likewise, the "hard-wired" method of shifting may shift $A_0$ by two bits to produce <$b_0 b_0 b_0 \ldots b_{n-4} b_{n-3} b_{n-2}$>, denoted as $A_2$ in FIG. 4A and FIG. 4B. The third most significant bit corresponding to $b_0$ of $A_2$ may be replicated as the two most significant bits of $A_2$. In an exemplary embodiment, $A_1$ is produced by directly connecting or "hard-wiring" each of its bits in the bit sequence <$b_0 b_0 b_1 \ldots b_{n-3} b_{n-2} b_{n-1}$> to corresponding bits in $A_0$ as shown in FIG. 4A. In another exemplary embodiment, shown in FIG. 4B, $A_2$ is produced by directly connecting each of its bits in the bit sequence <$b_0 b_0 b_0 \ldots b_{n-4} b_{n-3} b_{n-2}$> to one or more lesser shifted data streams, such as $A_0$ and/or $A_1$ to provide some examples.

Similarly, the "hard-wired" method of shifting may shift the data stream $A_0$ by k bits to produce a bit sequence <$b_0 b_0 b_0 \ldots b_{n-(k+2)} b_{n-(k+1)} b_{n-k}$>, denoted as $A_k$, in FIG. 4A and FIG. 4B. The k most significant bits corresponding to $b_0$ of $A_k$ may be replicated as the k−1 most significant bits in the k bit shifted data stream $A_k$. In an exemplary embodiment, $A_k$ is produced by directly connecting or "hard-wiring" each of its bits in the bit sequence <$b_0 b_0 b_1 \ldots b_{n-3} b_{n-2} b_{n-1}$> to corresponding bits in $A_0$ as shown in FIG. 4A. In another exemplary embodiment, shown in FIG. 4B, $A_k$ is produced by directly connecting each of its bits in the bit sequence <$b_0 b_0 b_0 \ldots b_{n-(k+2)} b_{n-(k+1)} b_{n-k}$> to one of the lesser shifted data streams, such as $A_0$, $A_1$, $A_2$, and/or any combination of $A_0$, $A_1$, and/or $A_2$ to provide some examples.

Alternatively, one or more shift registers or any other suitable method of shifting that is capable of right shifting the $X_0$ coordinate by one or more bits and right shifting the $Y_0$ coordinate of the complex input signal 250 by one or more bits, such as an algorithm implemented by a software routine to provide an example, may be used to right shift the $X_0$ coordinate and the $Y_0$ coordinate of the complex number.

Figure 5:
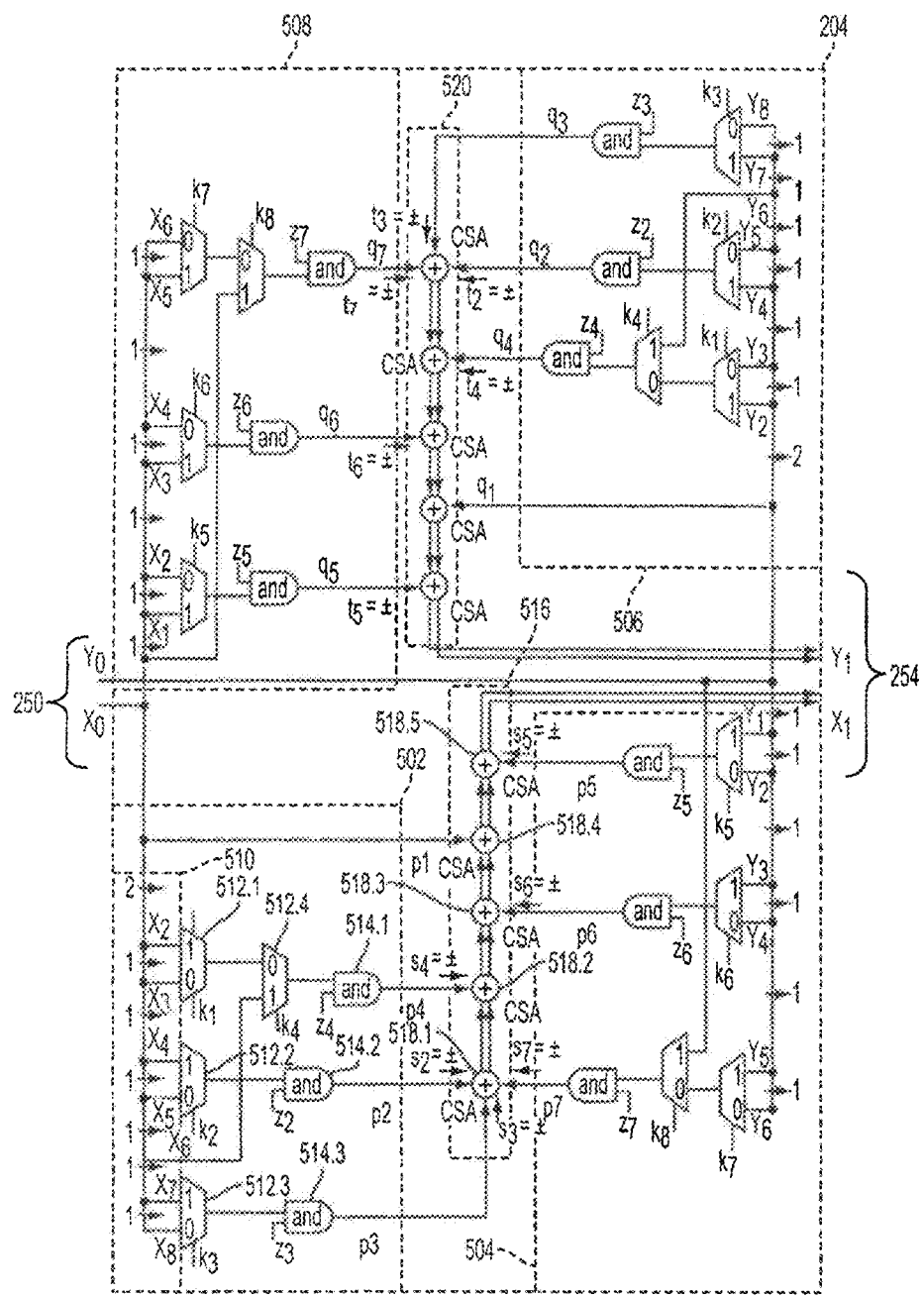
FIG. 5 illustrates a block diagram of the coarse rotation butterfly circuit according to an exemplary embodiment of the present invention.

1.5 Shift and Add/Subtract Signed-Power-of-Two (SPT) Implementation of the Coarse Rotation Butterfly FIG. 5 illustrates a block diagram of the coarse rotation butterfly circuit 204 according to an exemplary embodiment of the present invention. The coarse rotation butterfly circuit 204 performs the coarse rotation of the $X_0$ coordinate and the $Y_0$ coordinate of the complex input signal 250 to produce the $X_1$ coordinate and the $Y_1$ coordinate of the intermediate complex number 254 using a shift and add/subtract signed-power-of-two (SPT) form.

The operation of the coarse rotation butterfly circuit 204 may be explained using an angle θ whose specific cosine value C may be represented by an 8-bit number in the SPT numeral system and whose specific sine value S may be represented by a 6-bit number in the SPT numeral system, such that:

$$\begin{bmatrix} X_1 \\ Y_1 \end{bmatrix} = \begin{bmatrix} C_0 X_0 \pm C_{-1} rtsh(X_0, 1) \pm \ldots \pm \\ C_{-8} rtsh(X_0, 8) - S_0 Y_0 \mp S_{-1} rtsh(Y_0, 1) \mp \ldots \mp \\ S_{-6} rtsh(Y_0, 6) \\ S_0 X_0 \pm S_{-1} rtsh(X_0, 1) \pm \ldots \pm \\ S_{-6} rtsh(X_0, 6) + C_0 Y_0 \pm C_{-1} rtsh(Y_0, 1) \pm \ldots \pm \\ C_{-8} rtsh(Y_0, 8) \end{bmatrix} \quad (23)$$

However, this example is not limiting, those skilled in the relevant art(s) will recognize that (23) is solely used to illustrate the operation of one embodiment of the coarse rotation butterfly circuit 204. For example, those skilled in the relevant art(s) may implement (23) differently in accordance with the teachings herein without departing from the spirit and scope of the present invention.

As shown in FIG. 5, the coarse-rotation butterfly circuit 204 includes a multi-addition term generator 502, a multi-addition term generator 504, a multi-addition term generator 506, and a multi-addition term generator 508. The multi-addition term generators 504, 506 and 508 operate in a manner substantially similar to the operation of generator 502, as will be apparent to those skilled in the relevant art(s), and therefore will not be described in further detail herein. The multi-addition term generators 502 through 508 may also be referred to as shifter-selector modules because they right-shift the input digital signal to generate a plurality of shifted digital signal and subsequently select a subset of the shifted digital signal for combination (i.e., addition and/or subtraction).

The multi-addition term generator 502 includes a shifting module 510. The shifting module 510 shifts the $X_0$ coordinate of the complex input signal 250 according to the methods of shifting discussed in FIG. 4A and FIG. 4B to produce shifted digital signals $X_2$ through $X_8$. In other words, $X_2$ through $X_8$ are shifted representations of $X_0$. For example, the shifting module 510 shifts $X_0$ by three bits to produce $X_3$. The multi-addition term generator 502 includes multiplexers 512.1 through 512.4 to select a corresponding $X_2$ through $X_8$ based upon the corresponding control bits $k_1$ through $k_4$. For example, the multiplexer 512.1 selects between $X_2$ corresponding to $C_{-2} rtsh(X_0, 2)$ in (23) and $X_3$ corresponding to $C_{-3} rtsh(X_0, 3)$ in (23) based upon the control bit $k_1$.

The multi-addition term generator 502 additionally includes AND gates 514.1 through 514.3 to produce the corresponding multi-addition terms $p_2$ through $p_4$ according to the corresponding control bits $z_2$ through $z_4$. The multi-addition terms $p_2$ through $p_4$ are the subset of shifted digital signals $X_2$ through $X_8$ that have been selected for combination. For example, the AND gate 514.1 produces the multi-addition term $p_4$ based upon the control bit $z_4$. However, those skilled in the relevant art(s) will recognize that the use of AND gates is not required, one or more suitable logic gate may be used to provide a means of causing any unnecessary digits to be set to zero without departing from the spirit and scope of the present invention.

The coarse rotation butterfly circuit 204 includes an adder module 516 to combine the multi-addition terms $p_1$ through $p_4$ from the multi-addition term generator 502 and the multi-addition terms $p_5$ through $p_7$ from the multi-addition term generator 504 and an adder module 520 to combine the multi-addition terms $q_1$ through $q_4$ from the multi-addition term generator 506 and the multi-addition terms $q_5$ through $q_7$ from the multi-addition term generator 508. The adder module 520 operates in a substantially similar manner as adder module 516, as will be apparent to those skilled in the relevant art(s), and therefore will not be described in further detail herein.

The adder module 516 performs a conditional negation or inversion of the multi-addition terms $p_2$ through $p_7$ based upon a corresponding control bit $s_2$ through $s_7$. In other words, the determination of whether a corresponding multi-addition term $p_2$ through $p_7$ is to be added to and/or subtracted from the $X_1$ coordinate of the intermediate complex number 254 is based upon the corresponding control bit $s_2$ through $s_7$. For example, CSA 518.1 adds and/or subtracts the multi-addition term $p_2$ based upon control bit $s_2$, adds and/or subtracts the multi-addition term $p_3$ based upon control bit $s_3$, and adds and/or subtracts the multi-addition term $p_7$ based upon control bit $s_7$.

As shown in FIG. 5, the adder module 516 includes carry-save adders 518.1 through 518.5. However, those skilled in the relevant art(s) will recognize that the adder module 516 may be implemented using any suitable means to add two or more digital values. Such add/subtract means may be used without departing from the spirit and scope of the present invention. The $X_0$ coordinate of the complex input signal 250 may be expressed in a positional numbering system and/or a signed positional numbering system, allowing a first carry-save adder, such as the carry-save adder 518.1, to provide an example, to accommodate three terms, such as the multi-addition terms $p_2$, $p_3$, and $p_7$, to provide some examples, as adder inputs. Each subsequent carry-save adder, such as the carry-save adders 518.2 through 518.5 may only accommodate one additional term in the summation expression. For example, the carry-save adder 518.2 combines an output of the carry-save adder 518.1 with the multi-addition term $p_4$. The output of the carry-save adders 518.1 through 518.5 may be expressed in carry-save notation where each output includes a carry component and a sum component.

Figure 6A:
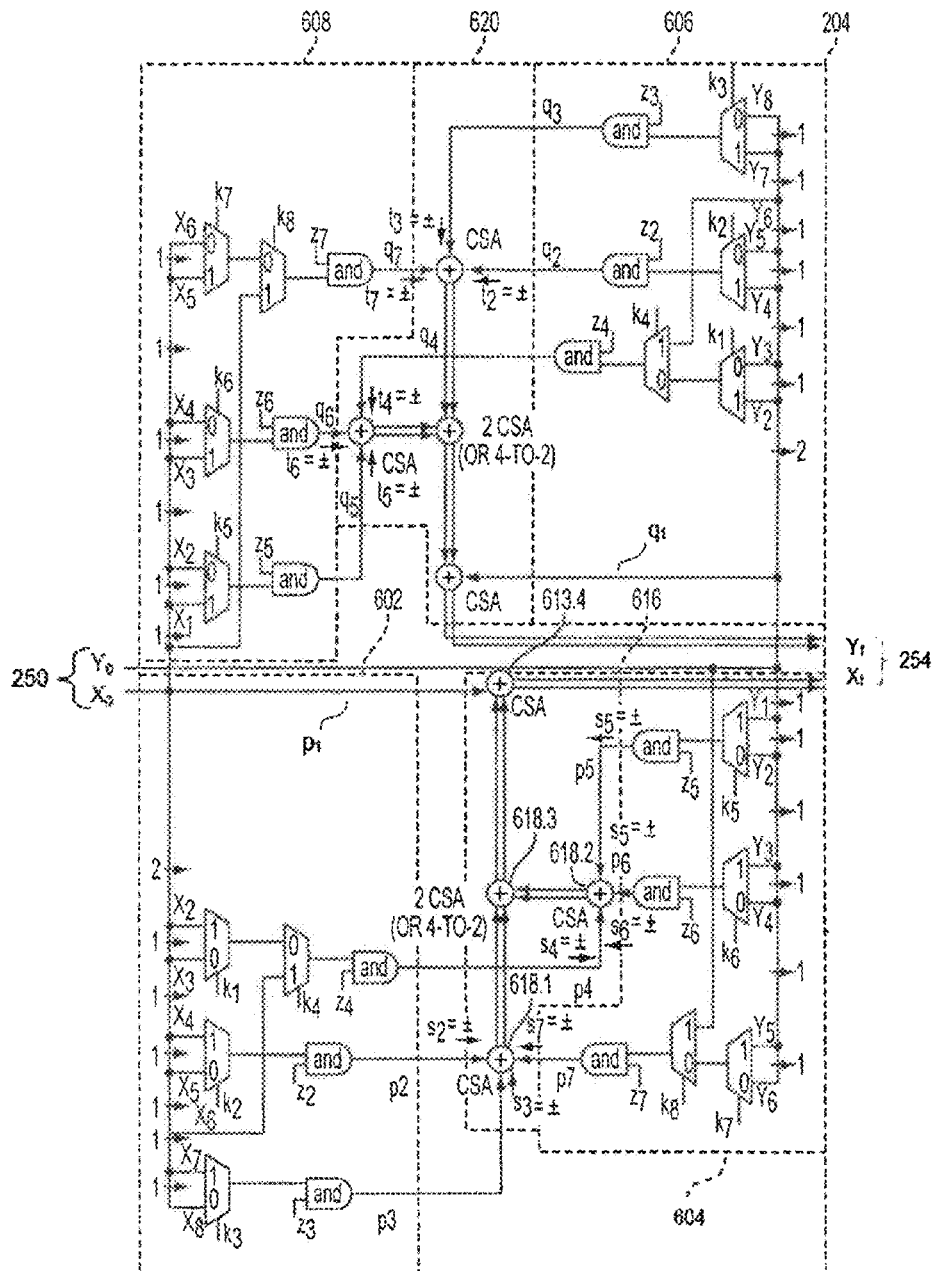
FIG. 6A illustrates a block diagram of the coarse rotation butterfly circuit according to another exemplary embodiment of the present invention.

FIG. 6A illustrates a block diagram of the coarse rotation butterfly circuit 204 according to another exemplary embodiment of the present invention. As shown in FIG. 6A, the coarse rotation butterfly circuit 204 includes a multi-addition term generator 602, a multi-addition term generator 604, a multi-addition term generator 606, and a multi-addition term generator 608. As will be apparent to those skilled in the relevant art(s), the multi-addition term generators 602 through 608 operate in a substantially similar manner as the multi-addition term generators 502 through 508 as discussed in FIG. 5, and therefore will not be described in further detail herein.

The coarse rotation butterfly circuit 204 includes an adder module 616 to combine the multi-addition terms $p_1$ through $p_4$ from the multi-addition term generator 602 and the multi-addition terms $p_5$ through $p_7$ from the multi-addition term generator 604 and an adder module 620 to combine the multi-addition terms $q_1$ through $q_4$ from the multi-addition term generator 606 and the multi-addition terms $q_5$ through $q_7$ from the multi-addition term generator 608. As will be apparent to those skilled in the relevant art(s), the adder module 620 operates in a substantially similar manner as the adder module 616, and therefore will not be described in further detail herein.

Referring back to FIG. 6A, the adder module 616 operates in a substantially similar manner as the adder module 516 with the exception of merging or combining one or more carry-save additions into a cascade of two carry-save operations as shown by carry-save adder 618.3. One or more carry-save adders, such as the carry-save adder 618.2 and/or the carry-save adder 618.1 to provide some examples, may accommodate three terms, such as the multi-addition terms $p_2$, $p_3$, and $p_7$ and/or the multi-addition terms $p_4$, $p_5$, and $p_6$. The carry-save adder 618.3 may accommodate four terms, such as the combination of the multi-addition terms $p_2$, $p_3$, and $p_7$ by carry-save adder 618.1 expressed in carry-save notation and the combination of the multi-addition terms $p_4$, $p_5$, and $p_6$ carry-save adder 618.2 expressed in carry-save notation, to provide an example, to produce two terms expressed in carry-save notation. Alternatively, those skilled in the relevant art(s) will recognize that the carry-save adder 618.3 may be implemented as a 4-to-2 converter, a 4-to-2 compressor, and/or using any other suitable means to merge one or more carry-save additions into a cascade of two carry-save operations without departing from the spirit and scope of the present invention.

Figure 6B:
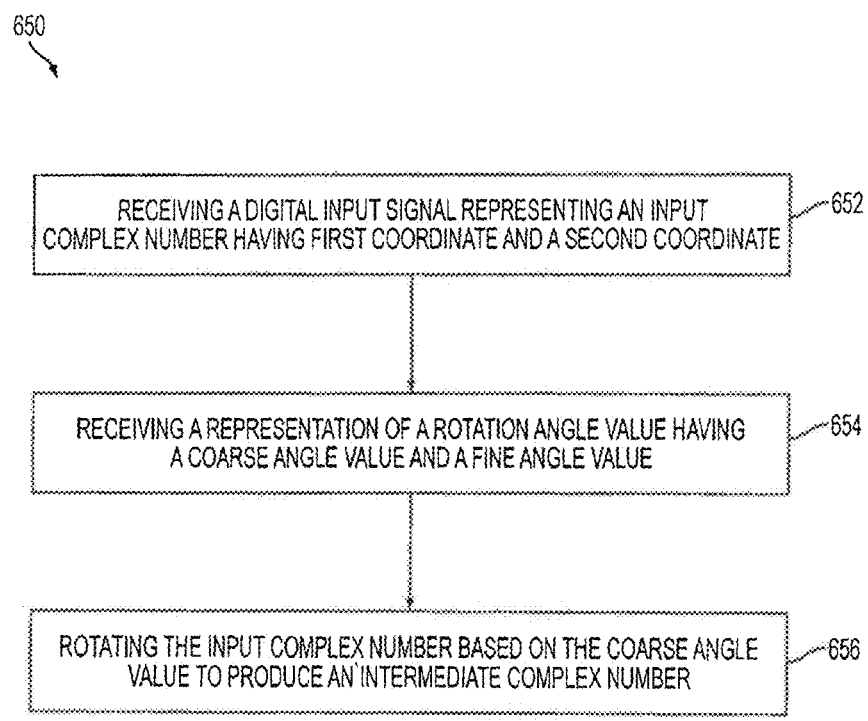
FIG. 6B illustrates a flowchart that further describes the operation of the coarse stage butterfly circuit according to an exemplary embodiment of the present invention.

FIG. 6B illustrates a flowchart 650 that further describes the operation of the coarse stage butterfly circuit 204 according to one embodiment of the present invention. Specifically, flowchart 650 describes the rotation of an input complex number via a rotation angle to generate an output complex number. The invention is not limited to this operational description. Rather, it will be apparent to persons skilled in the relevant art(s) from the teachings herein that other operational control flows are within the spirit and scope of the present invention. The following discussion describes the steps in FIG. 6B.

Referring to flowchart 650, in step 652, a digital input signal is received representing an input complex number having a first coordinate and a second coordinate. In step 654, a representation of a rotation angle value is received having a coarse angle value and a fine angle value. In step 656, the input complex number is rotated based on the coarse angle value to generate an intermediate complex number. For example, the coarse stage butterfly circuit 204 rotates the input complex number 250 according to a normalized rotation angle $\bar{\theta}$ to generate an intermediate complex number. The intermediate complex number is subsequently rotated again using the fine stage butterfly circuit 206.

Figure 6C:
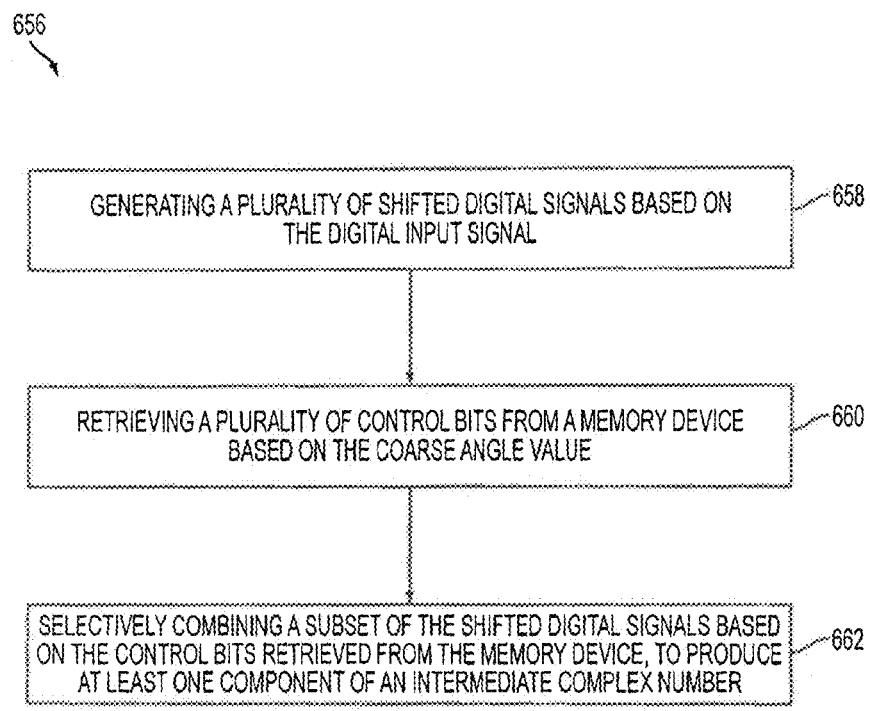
FIG. 6C illustrates a flowchart that further describes the operation of the coarse stage butterfly circuit according to another embodiment of the present invention.

FIG. 6C illustrates a flowchart that further describes the operation of the step 656, according to one embodiment of the present invention. The invention is not limited to this operational description. Rather, it will be apparent to persons skilled in the relevant art(s) from the teachings herein that other operational control flows are within the spirit and scope of the present invention. The following discussion describes the steps in FIG. 6C.

Referring to flowchart 6C, in step 658, a plurality of shifted digital signals are generated based on the digital input signal. In step 660, a plurality of control bits are retrieved from a memory device based on the coarse angle value. For example, the memory device could be a read-only-memory (ROM), or other type of device. In step 662, a subset of the shifted digital signals is selectively combined based on the control bits retrieved from the memory device, to produce at least one coordinate of an intermediate complex number.

Figure 6D:
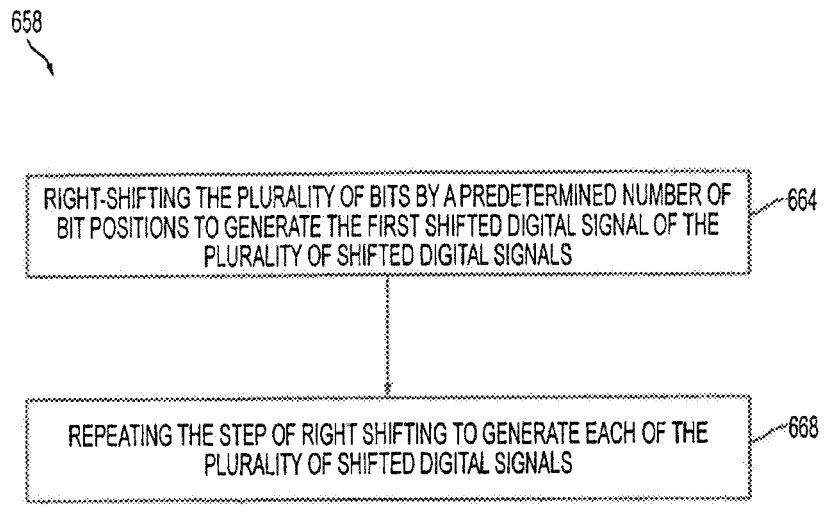
FIG. 6D illustrates a flowchart that further describes the operation of the coarse stage butterfly circuit according to an additional embodiment of the present invention.

FIG. 6D illustrates a flowchart that further describes the operation of the step 658, according to one embodiment of the present invention. The invention is not limited to this operational description. Rather, it will be apparent to persons skilled in the relevant art(s) from the teachings herein that other operational control flows are within the spirit and scope of the present invention. The following discussion describes the steps in FIG. 6D.

In one embodiment, the first coordinate of said digital input signal includes a plurality of bit positions numbered 1-n having a corresponding number of bits. In step 664, the plurality of bits are right-shifted by a predetermined number of bit positions to generate the first shifted digital signal of the plurality of shifted digital signals. In step 668, the step of right-shifting is repeated to generate each of the plurality of shifted digital signals. For example, as FIG. 4A illustrates, the digital input signal $A_0$ is shifted a number of times in a parallel fashion to generate a plurality of shifted signals $A_1$, $A_2$, . . . $A_K$. As shown in FIG. 4A, the right shifting is performed so that $b_0$ (in $A_0$) is shifted from the most significant bit to the second most significant bit in the shifted digital signal $A_1$. Likewise, $b_1$ (in $A_0$) is shifted from the second most significant bit to the third most significant bit to generate the shifted digital signal $A_1$. The other bits in $A_0$ are shifted in a consistent manner to generate shifted digital signal $A_1$. To generate $A_2$, the right shifting is performed so that $b_0$ (in $A_0$) is shifted from the most significant bit to the second most significant bit in the shifted digital signal $A_1$. Likewise, $b_1$ (in $A_0$) is shifted from the second most significant bit to the third most significant bit in the shifted digital signal $A_2$. The other bits in $A_2$ are shifted in a consistent manner to generate shifted digital signal $A_2$.

Figure 6E:
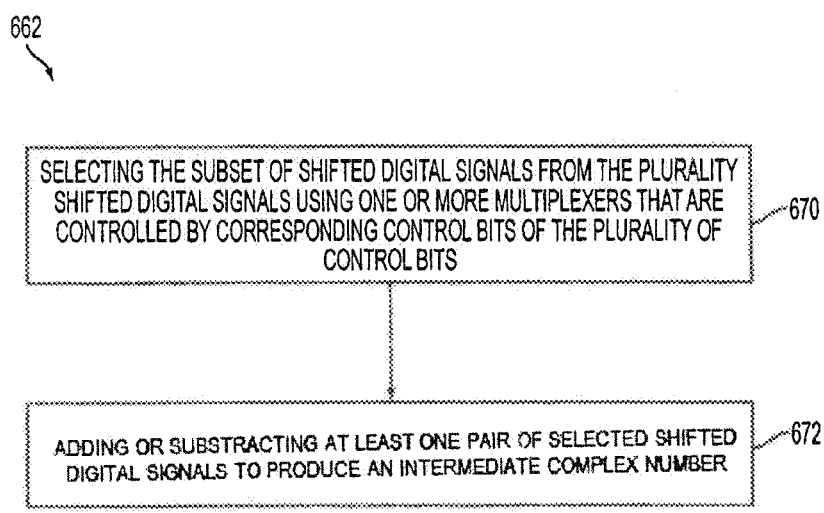
FIG. 6E illustrates a flowchart that further describes the operation of the coarse stage butterfly circuit according to a further embodiment of the present invention.

FIG. 6E illustrates a flowchart that further describes the operation of the step 662, according to one embodiment of the present invention. The invention is not limited to this operational description. Rather, it will be apparent to persons skilled in the relevant art(s) from the teachings herein that other operational control flows are within the spirit and scope of the present invention. The following discussion describes the steps in FIG. 6E.

In step 670, a subset of shifted digital signals is selected from said plurality of shifted digital signals using one or more multiplexers that are controlled by corresponding control bits of said plurality of control bits. For example, in FIG. 5, multiplexers 512 are controlled by control bits $k_1, k_2, k_3, k_4$ to select a subset of the plurality of shifted digital signals that are subsequently combined in order to effect the multiplication needed for angle rotation.

In step 672, at least one pair of the selected shifted digital signals are added or subtracted to produce an intermediate complex number. For example, returning to FIG. 5 the certain outputs of the multiplexers 512 are added or subtracted using the carry save adders 518 to effect the approximate multiplication by the cosine and sine of the coarse rotation angle value.

Figure 7:
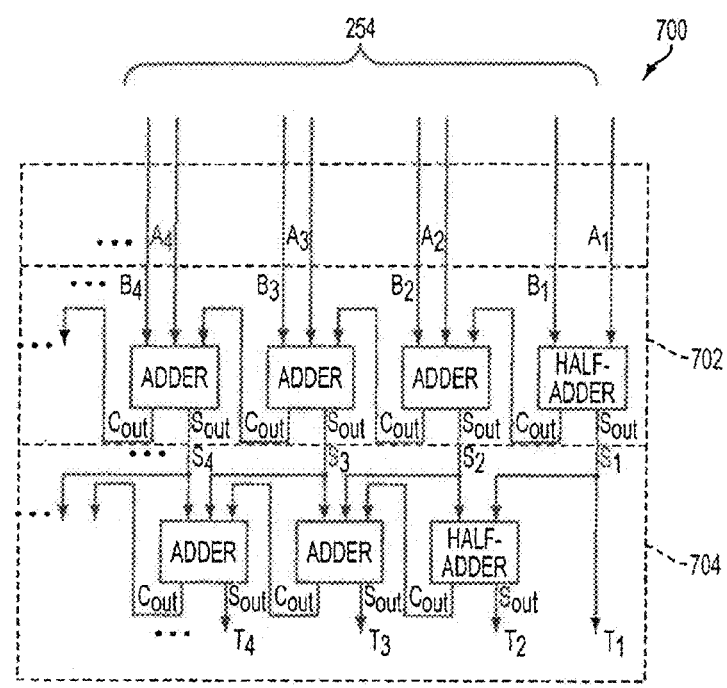
FIG. 7 illustrates a combination module used to combine two bit sequences into a single bit sequence and to generate three times the single bit sequence according to an exemplary embodiment of the present invention.

From the discussion of FIG. 5 and FIG. 6A above, the adder module 516 and/or the adder module 616 produces the $X_1$ coordinate of the intermediate complex number 254 in carry-save notation. It may be useful to combine the two components representing the $X_1$ coordinate into a single bit sequence representing the $X_1$ coordinate as shown in FIG. 7. A combination module 700 provides a means of simultaneously performing the carry-ripple adder operations to produce a single bit sequence. A combination module 700 combines a first operand A having the bit sequence $<A_1 A_2 A_3 \ldots A_n>$ with a second operand B having the bit sequence $<B_1 B_2 B_3 \ldots B_n>$ to produce a single bit sequence S having the bit sequence $<S_1 S_2 S_3 \ldots S_n>$ through an adder module 702. Those skilled in the relevant art(s) will recognize that the first operand A may represent the carry component of the $X_1$ coordinate or the summation component of the $X_1$ coordinate and the second operand B may represent the carry component of the $X_1$ coordinate or the summation component of the $X_1$ coordinate without departing from the scope and spirit of the present invention.

It may be also useful to scale the single bit sequence S by a scaling factor to produce a scaled single bit sequence T having the bit sequence $<T_1 T_2 T_3 \ldots T>$. For example, as shown in FIG. 7, the single bit sequence S may be scaled by a factor of three to be used by the fine stage butterfly circuit 206 to be discussed in further detail below. However, this example is not limiting, those skilled in the relevant art(s) will recognize that the single bit sequence S may be scaled by any suitable scaling factor to produce the scaled single bit sequence T using one or more half-adders in combination with one or more adders without departing from the scope and spirit of the present invention.

Figure 8:
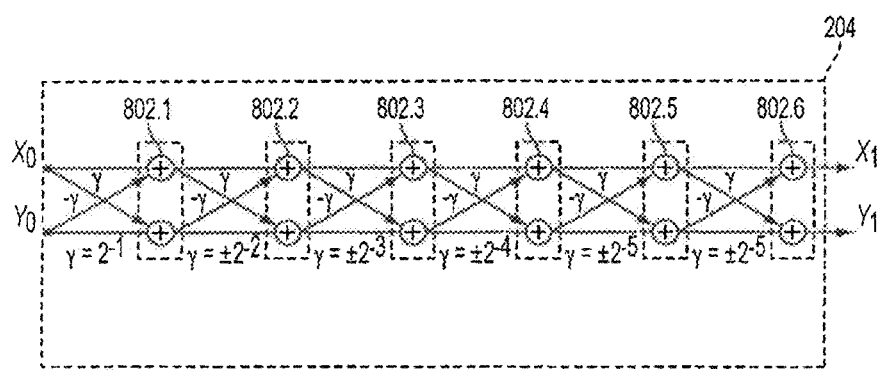
FIG. 8 illustrates a block diagram of the coarse rotation butterfly circuit according to a further exemplary embodiment of the present invention.

1.6 Coordinate Rotation Digital Computer (CORDIC)-Type Implementation of the Coarse Rotation Butterfly FIG. 8 illustrates a block diagram of the coarse rotation butterfly circuit according to a further exemplary embodiment of the present invention. As an alternative to the shift and add/subtract signed-power-of-two (SPT) forms as discussed in FIG. 5 and FIG. 6A, the coarse rotation butterfly circuit 204 may be expressed as coordinate rotation digital computer (CORDIC)-type angle rotations using the SPT numeral system.

A CORDIC-type angle rotation performs one or more sub-rotations of the $X_0$ coordinate and the $Y_0$ coordinate of the complex input signal 250 to produce the $X_1$ coordinate and the $Y_1$ coordinate of the intermediate complex number 254. More specifically, the coarse rotation butterfly circuit 204 may include rotation stages 802.1 to 802.6 to rotate the $X_0$ coordinate and the $Y_0$ coordinate of the complex input signal 250 by six sub-rotations to produce the $X_1$ coordinate and the $Y_1$ coordinate of the intermediate complex number 254. In an exemplary embodiment, the coarse rotation butterfly circuit 204 includes six rotation stages 802.1 through 802.6. However, this example is not limiting; those skilled in the relevant art(s) will recognize that the teachings herein may be used to implement the coarse rotation butterfly circuit 204 using any suitable number of rotation stages without departing from the spirit and scope of the present invention.

An input-output relationship for a corresponding rotation stage, such as the rotation stage 802.2, may be expressed as:

$$\begin{pmatrix} X_{out} \\ Y_{out} \end{pmatrix} = \begin{bmatrix} 1 & \mp 2^{-k} \\ \pm 2^{-k} & 1 \end{bmatrix} \begin{pmatrix} X_{in} \\ Y_{in} \end{pmatrix}, \qquad (25)$$

where the $\pm$ and $\mp$ operators in (25) determine whether a rotation to be performed by the corresponding rotation stage is clockwise or counter-clockwise. For example, the six rotation stages 802.1 through 802.6 may be expressed as:

$$\begin{pmatrix} X_1 \\ Y_1 \end{pmatrix} = \begin{bmatrix} 1 & \mp 2^{-6} \\ \pm 2^{-6} & 1 \end{bmatrix} \cdots \begin{bmatrix} 1 & \mp 2^{-2} \\ \pm 2^{-2} & 1 \end{bmatrix} \begin{bmatrix} 1 & -2^{-1} \\ 2^{-1} & 1 \end{bmatrix} \begin{pmatrix} X_0 \\ Y_0 \end{pmatrix}. \qquad (26)$$

However, in an exemplary embodiment as shown in FIG. 8, the final two coarse rotation stages, such as the rotation stages 802.5 and 802.6 may rotate an output of a previous stage a substantially equal amount, such as the rotation stages 802.1 through 802.6, may be expressed as:

$$\begin{pmatrix} X_1 \\ Y_1 \end{pmatrix} = \begin{bmatrix} 1 & \mp 2^{-5} \\ \pm 2^{-5} & 1 \end{bmatrix} \begin{bmatrix} 1 & \mp 2^{-5} \\ \pm 2^{-5} & 1 \end{bmatrix} \qquad (27)$$
$$\cdots \begin{bmatrix} 1 & \mp 2^{-2} \\ \pm 2^{-2} & 1 \end{bmatrix} \begin{bmatrix} 1 & -2^{-1} \\ 2^{-1} & 1 \end{bmatrix} \begin{pmatrix} X_0 \\ Y_0 \end{pmatrix}.$$

Because the determinant of (25)-(27) will exceed one, each rotation stage will provide a magnitude scaling operation in addition to a rotation. The scaling operation will increase the magnitude of the rotated vector. However, the magnitude scaling amount is invariant regardless of whether the rotation to be performed by any rotation stage is clockwise or counter-clockwise.

Referring to FIG. 8, the coarse rotation butterfly circuit 204 may be implemented using carry-save adders, with one carry-ripple occurring at the $X_1$ coordinate and one at the $Y_1$ coordinate of the intermediate complex number 254. For example, a first rotation stage, such as the rotation stage 802.1, may be given by the fixed-direction rotation:

$$\begin{pmatrix} X^{out,1} \\ Y^{out,1} \end{pmatrix} = \begin{bmatrix} 1 & -2^{-1} \\ 2^{-1} & 1 \end{bmatrix} \begin{pmatrix} X_0 \\ Y_0 \end{pmatrix} = \begin{pmatrix} X_0 - rtsh(Y_0, 1) \\ Y_0 + rtsh(X_0, 1) \end{pmatrix}. \quad (28)$$

wherein $X^{out,1}$ represents an X coordinate of the first rotation stage expressed in carry-save notation and $Y^{out,1}$ represents a Y coordinate of the first rotation stage expressed in carry-save notation.

From (28), the $X^{out,1}$ coordinate of the first rotation stage is expressed in carry-save notation and the $Y^{out,1}$ coordinate of the first rotation stage expressed in carry-save notation. Any subsequent rotation stage, such as the rotation stages 802.2 through 802.6, require more carry-save adders. For example the rotation stage 802.2 requires four carry-save additions: one carry-save addition for each summation component for a total of two carry-save additions and an additional one carry-save addition for each carry component, for a total of four carry-save additions. For example, to compute the $X_{out}$ coordinate for the subsequent stages involves computing $$X^{temp} = X_a + X_b - rtsh(Y_a, k), \quad (32)$$

followed by $$X_{out} = X_a^{temp} + X_b^{temp} - rtsh(Y_b, k). \quad (33)$$

The subscript a and the subscript b denote the two words, such as $X_a^{temp}$ and $X_b^{temp}$ whose sum represents a value of a carry-save number, such as $X^{temp}$.

An alternate embodiment may obtain a greater computational advantage by keeping the system's computations expressed in terms of the original data (X and Y) for several rotation stages. For example, if the rotation stages 802.1 and 802.2 perform $$X^1 = X - rtsh(Y, p) \; X^2 = X^1 - rtsh(Y^1, q)$$

and, $$Y^1 = Y + rtsh(X, p) \; Y^2 = Y^1 + rtsh(X^1, q) \quad (34)$$

respectively, only four CSA computations are used, which may be determined from the product of the two rotation matrices, namely:

$$X^1 = X - rtsh(Y, p) - rtsh(Y, q)$$

$$Y^1 = Y + rtsh(X, p) + rtsh(X, q)$$

$$X^2 = X_a^1 + X_b^1 - rtsh(rtsh(X, p), q)$$

$$Y^2 = Y_a^1 + Y_b^1 - rtsh(rtsh(Y, p), q). \quad (35)$$

In a further exemplary embodiment, the fixed rotation stage, such as the rotation stage 802.1, and the first two variable-direction rotation stages, such as the rotation stages 802.2 and 802.3, may be expressed as:

$$\begin{bmatrix} 1 & \mp 1/8 \\ \pm 1/8 & 1 \end{bmatrix} \begin{bmatrix} 1 & \mp 1/4 \\ \pm 1/4 & 1 \end{bmatrix} \begin{bmatrix} 1 & -1/2 \\ 1/2 & 1 \end{bmatrix} \begin{pmatrix} X_0 \\ Y_0 \end{pmatrix}. \quad (37)$$

However, this example is not limiting; those skilled in the relevant art(s) will recognize that any suitable number of variable-direction rotation stages may be expressed in a similar manner without departing from the spirit and scope of the present invention. The expression in (37) provides a choice of one of four cases, each involving a single matrix:

$$\begin{bmatrix} 1 - 7/32 & -55/64 \\ 55/64 & 1 - 7/32 \end{bmatrix}, \quad (38).$$

$$\begin{bmatrix} 1 + 3/32 & -25/64 \\ 25/64 & 1 + 3/32 \end{bmatrix},$$

$$\begin{bmatrix} 1 - 1/32 & -41/64 \\ 41/64 & 1 - 1/32 \end{bmatrix},$$

$$\begin{bmatrix} 1 + 5/32 & -7/64 \\ 7/64 & 1 + 5/32 \end{bmatrix}.$$

All four entries differ in (38), from case to case, but all may be represented in the form:

$$\begin{bmatrix} P & -Q \\ Q & P \end{bmatrix}, \quad (39)$$

where each entry in (38) has the same determinant of $P^2 + Q^2$ and the matrices of (38) all scale an input vector by exactly the same magnitude scaling factor, namely $\sqrt{P^2+Q^2} \approx 1.1614$, where any one of entries in (38) may be used to compute the magnitude scaling operation.

Expressing each entry in (38) in the SPT numeral system may result in:

$$\begin{bmatrix} 1.0\bar{1}001 & -(1.00\bar{1}00\bar{1}) \\ 1.00\bar{1}00\bar{1} & 1.0\bar{1}001 \end{bmatrix}, \quad (40)$$

$$\begin{bmatrix} 1.00011 & -(0.011001) \\ 0.011001 & 1.00011 \end{bmatrix},$$

$$\begin{bmatrix} 1.0000\bar{1} & -(0.101001) \\ 0.101001 & 1.0000\bar{1} \end{bmatrix},$$

$$\begin{bmatrix} 1.00101 & -(0.00100\bar{1}) \\ 0.00100\bar{1} & 1.00101 \end{bmatrix},$$

which may readily be implemented as the addition/subtraction of signed-power-of-two (SPT) form, as will be apparent to those skilled in the relevant art(s). However, this example is not limiting, those skilled in the relevant art(s) will recognize that any suitable number of fixed rotation stages, variable-direction rotation stages, and/or combinations of fixed rotation stages and variable-direction rotation stages may be expressed in a similar manner without departing from the spirit and scope of the present invention.

The CORDIC-type angle rotation implementation for the coarse rotation butterfly circuit 204 shown in FIG. 8 represents one or more embodiments. Those skilled in the relevant art(s) will recognize that various implementations are possible, such as modifying the coarse rotation butterfly circuit 204 as discussed in FIG. 6A using 20 carry-save adders to provide an example, without departing from the spirit and scope of the present invention.

2. Memory Storage Device
2.1 Overview

Referring back to FIG. 2, a memory storage device 202 receives the normalized coarse angle $\bar{\theta}_M$. In an exemplary embodiment, the memory storage device 202 is implemented as a Read Only Memory (ROM), but those skilled in the relevant art(s) will recognize that the memory storage device 202 may also be implemented using as a Random Access Memory (RAM), a Dynamic RAM (DRAM), a Synchronous DRAM (SDRAM), a Double Data Rate SDRAM (DDR SDRAM), a hard disk drive, a flash drive such as a Universal Serial Bus (USB) flash drive, or any other suitable memory source capable of storing information without departing from the spirit and scope of the present invention.

The memory storage device 202 generates control information for the coarse stage butterfly circuit 204 and the fine stage butterfly circuit 206 based upon the normalized coarse angle $\bar{\theta}_M$. As shown in FIG. 2, the memory storage device 202 produces control bits k, z, s, and t to be used by the coarse stage 204, a scaling error correction δ to be used by the fine stage butterfly circuit 206, and a conversion factor $\theta_M - \theta_m$ to convert the fine angle $\theta_L$ from a normalized representation to a representation in radians for a given coarse angle $\theta_M$. More specifically, the memory storage device 202 uses a given normalized coarse angle $\bar{\theta}_M$ as a memory address to look up corresponding storage locations for control bits k, z, s, t, scaling error correction δ, and the conversion factor $\theta_M - \theta_m$.

Recalling from the discussion above, the normalized angle $\bar{\theta}$ may be represented by n bits, of which k=3 bits designate the octant, j bits designate the normalized coarse angle $\bar{\theta}_M$, and n−k−j bits designate the normalized fine angle $\bar{\theta}_L$. The k bits designating the octant locate the angle θ in one of the $2^k=8$ octants of the X-Y plane. The octants of the X-Y plane may be divided into $2^j$ sectors based upon the j bits that designate the normalized coarse angle $\bar{\theta}_M$.

2.2 Determining of the Specific Cosine and Sine Values (C, S)

2.2.1 Locating Angular Bounds on the Coarse-Stage Rotation Angle Arctan(S/C)

Since the coarse stage actually performs a rotation by the angle arctan(S/C) instead of the desired rotation of $\theta_M$+offset, the fine stage may be used to compensate for the coarse-stage angular-rotation error. Thus, the rotation angle for the fine stage becomes $(\theta_M+\text{offset})-\arctan(S/C)+(\pi/4)\bar{\theta}_L$. This fine-stage angle has a nonnegative value and represents a relatively small rotation (relative to the typical rotation of the coarse-stage). In other words, denoting the fine-stage rotation angle by $\theta_f$, its value satisfies $0 \le \theta_f < 0.0001$ where the binary fraction $0.0001 = 1/16$ in these inequalities has the dimension of radians.

One more constraint arises as a result of the fine-stage angle $(\theta_M+\text{offset})-\arctan(S/C)+(\pi/4)\bar{\theta}_L$ being completely determined only when the specific normalized fine angle $\bar{\theta}_L$ is known. Thus, its first part, namely $(\theta_M+\text{offset})-\arctan(S/C)$, which is completely determined by just the normalized coarse-stage angle $\bar{\theta}_M$ (and stored in a table, to be retrieved using the $\bar{\theta}_M$ value as the address) accommodates the use of fine-stage normalized angles having arbitrary values satisfying $0 \le \bar{\theta}_L < 0.0001$ where the binary fraction (0.0001=1/16), being associated with a normalized angle, is not dimensioned in radians. This observation leads to the two inequalities:

$$0 \le (\theta_M+\text{offset})-\arctan(S/C)+(\pi/4)\bar{\theta}_L < 1/16 \quad (41)$$

which holds for all values of $\bar{\theta}_L$ lying in the half-open interval [0, 1/16). Hence, $$\bar{\theta}_L < (4/\pi)(1/16)-\bar{\theta}_M-(4/\pi)\text{offset}+(4/\pi)\arctan(S/C)$$

and therefore, using one extreme $\bar{\theta}_L$ value $$1/16 \le (4/\pi)(1/16)-\bar{\theta}_M-(4/\pi)\text{offset}+(4/\pi)\arctan(S/C) \quad (42)$$

and using the other extreme $\bar{\theta}_L$ value:

$$0 \le \bar{\theta}_M+(4/\pi)\text{offset}-(4/\pi)\arctan(S/C). \quad (43)$$

Thus, $$0 \le \bar{\theta}_M+(4/\pi)\text{offset}-(4/\pi)\arctan(S/C) \le (4/\pi)(1/16)-1/16.$$

Therefore, for each coarse-stage segment M, the C and S values may be chosen such that $$-(1-\pi/4)(1/16)+\theta_M+\text{offset} \le \arctan(S/C) \le \theta_M+\text{offset}.$$

These constraints specify a relatively narrow interval below the angle $\theta_M$+offset within which the angle arctan(S/C) would have to be located. Namely, $$(\theta_M+\text{offset})-0.0134 \le \arctan(S/C) \le (\theta_M+\text{offset}).$$

To satisfy such constraints would typically require many bits in the specification of C and S, which would tend to reduce computational efficiency in hardware implementations. The specifications for C and S that derive from the coarse stage constraints of Fu 1 are, for example, a five-bit S value and an eight-bit C value. It is improbable that such values could be found that satisfy the above inequality constraints. A modified approach is next developed.

The modified approach begins by handling two cases separately: the case of large fine-stage rotation angles and the case of small fine-stage rotation angles. These two cases may be designated by the value of the first (high-order) bit of the normalized fine-stage angle $\bar{\theta}_L$. In other words, the two cases, $\bar{\theta}_L=00001\text{xxxxxxxx}$ and $\bar{\theta}_L=00000\text{xxxxxxxx}$ (where each x denotes either 0 or 1), are treated separately. In both cases, however, it will be shown that the constraint provided by inequalities (41):

$(\theta_M+\text{offset})+(\pi/4)\bar{\theta}_L-1/16 < \arctan(S/C) \le (\theta_M+\text{offset})+(\pi/4)\bar{\theta}_L$ is easily satisfied.

Case 1, ($\bar{\theta}_L=00001\text{xxxxxxxx}$):

Here, $\bar{\theta}_L \ge 0.00001$ and $\bar{\theta}_L \ge 0.0000111111111=2^{-4}2^{-13}$, and therefore the above inequalities are satisfied if:

$$(\theta_M+\text{offset})+(\pi/4)(2^{-4}-2^{-13})-1/16 < \arctan(S/C) \le (\theta_M+\text{offset})+(\pi/4)(1/32) \quad (44)$$

These inequalities provide a reasonably large interval around $\theta_M$+offset within which one might expect to find a suitable value for arctan(S/C).

Case 2, ($\bar{\theta}_L=00000\text{xxxxxxxx}$):

Here, $\bar{\theta}_L \ge 0$ and $\bar{\theta}_L \le 0.0000011111111=2^{-5}2^{-13}$, and therefore the above inequalities are satisfied if $$(\theta_M+\text{offset})+(\pi/4)(2^{-5}-2^{-13})-1/16 < \arctan(S/C) \le (\theta_M+\text{offset}).$$

Again, these inequalities yield a reasonably large interval below $\theta_M$+offset within which one might expect to find a suitable value for arctan(S/C).

The process explained above shows how to determine upper and lower limits on the angle arctan(S/C) associated with each of the M coarse-stage angular sectors. Each of the coarse-stage rotations actually employs sines and cosines of this rotation angle to perform the rotation computations. For this reason, two values S and C that represent these sine and cosine values, respectively, are of concern. The two values S and C also define a point (C, S) in the plane that is within, but close to the boundary of the unit circle.

2.2.2 Locating Radial Bounds on the Coarse-Stage Rotation Values S and C

For each coarse-stage segment M, one of the principal concerns in determining the appropriate values of C and S is the following. When performing a coarse-stage rotation of a point $(X_0, Y_0)$ by the angle $\arctan(S/C)$, to obtain the rotated output of the coarse stage $(X_1, Y_1)$, using the mapping:

$$\begin{bmatrix} X_1 \\ Y_1 \end{bmatrix} = \begin{bmatrix} C & -S \\ S & C \end{bmatrix} \begin{bmatrix} X_0 \\ Y_0 \end{bmatrix}$$

the magnitude scaling of the vector $[X_0\ Y_0]^T$ must not be excessive. In other words, the magnitudes of the two vectors $[X_1\ Y_1]^T$ and $[X_0\ Y_0]^T$ may only differ by a scale factor that is suitably close to 1.

It is well known that when $C=\cos\theta$ and $S=\sin\theta$, for any angle $\theta$, the above mapping becomes a pure rotation and, as such, the magnitudes of both vectors $[X_1\ Y_1]^T$ and $[X_0\ Y_0]^T$ will be equal; that is, the mapping's magnitude scaling factor is then exactly 1. This fact can also be derived directly by computing the Euclidean norm of each vector (i.e., $\|[X\ Y]^T\| = \sqrt{X^2+Y^2}$) and using the fact that, for any angle $\theta$, $\sin^2\theta + \cos^2\theta = 1$.

When C and S do not satisfy $C=\cos\theta$ and $S=\sin\theta$ exactly (for some angle $\theta$), then the mapping will impose a magnitude scaling as well as a rotation. The determinant of the mapping's matrix (i.e., $C^2+S^2$) can indicate whether the magnitude scaling factor is greater than one (when $C^2+S^2>1$) or less than one (when $C^2+S^2<1$). When a rotation by an angle $\theta_M$ is desired, and $\theta_I$ is the angle for which $\sin\theta_I=S=[\sin\theta_M]$, with $[\sin\theta_M]$ an approximation of $\sin\theta_M$ ($[\sin\theta_M]$ being, in fact, a truncated and then rounded-up version of $\sin\theta_M$), and if $C=[\cos\theta_I]$ is a truncated version of $\cos$ then $S^2+C^2=\sin^2\theta_I+[\cos\theta_I]^2<1$, and hence the mapping's scale factor is less than 1. By choosing a value of $\theta_I$ such that sine is a 5-bit approximation to $\sin\theta_M$ and $[\cos\theta_I]$ is an 8-bit truncation of $\cos\theta_I$ then the mapping's magnitude scaling factor can be sufficiently close to 1 that it is possible to correct the scaling error by multiplying the coordinates of the rotated vector by $1+\delta$, where the binary fraction=0.00000000xxxx; that is, each rotated vector coordinate can be scaled by performing a multiplication of the coordinate by a four-bit number xxxx and shifting the resulting product and adding it to the coordinate; this is a reasonably efficient scaling correction process. Similar efficiency may be achieved by an appropriate choice of C and S values. This will require $C^2+S^2\approx 1$, a matter that will now be made more precise.

Let the point $p=(C, S)$ be a point in the plane that is inside the unit circle, but close to it. For example, let the point p lie outside the circle of radius $r=1/(1+2^{-8})$, centered at the origin. Then, by multiplying the coordinates of p by a factor f to put the resulting point on the unit circle, f will be closer to 1 than the f value that scales the lower limit point $p_r=1/(1+2^{-8})$. Let $f=1+\delta_r$, then $f\times p_r=(1+\delta_r)(1/(1+2^{-8}))=1$ implies $\delta_r=2^{-8}=2^4\times 2^{-12}$. That is, for any point within the two concentric circles, the scaling factor that moves the point to the unit circle is $1+\delta$ where $\delta<\delta_r$, that is 0.00000000xxxx. Those skilled in the relevant art(s) will recognize that a similar procedure could be followed with other values of r, leading to $\delta$ values that are smaller than, or larger than, $2^{-8}$ without departing from the spirit and scope of the invention.

Figure 11:
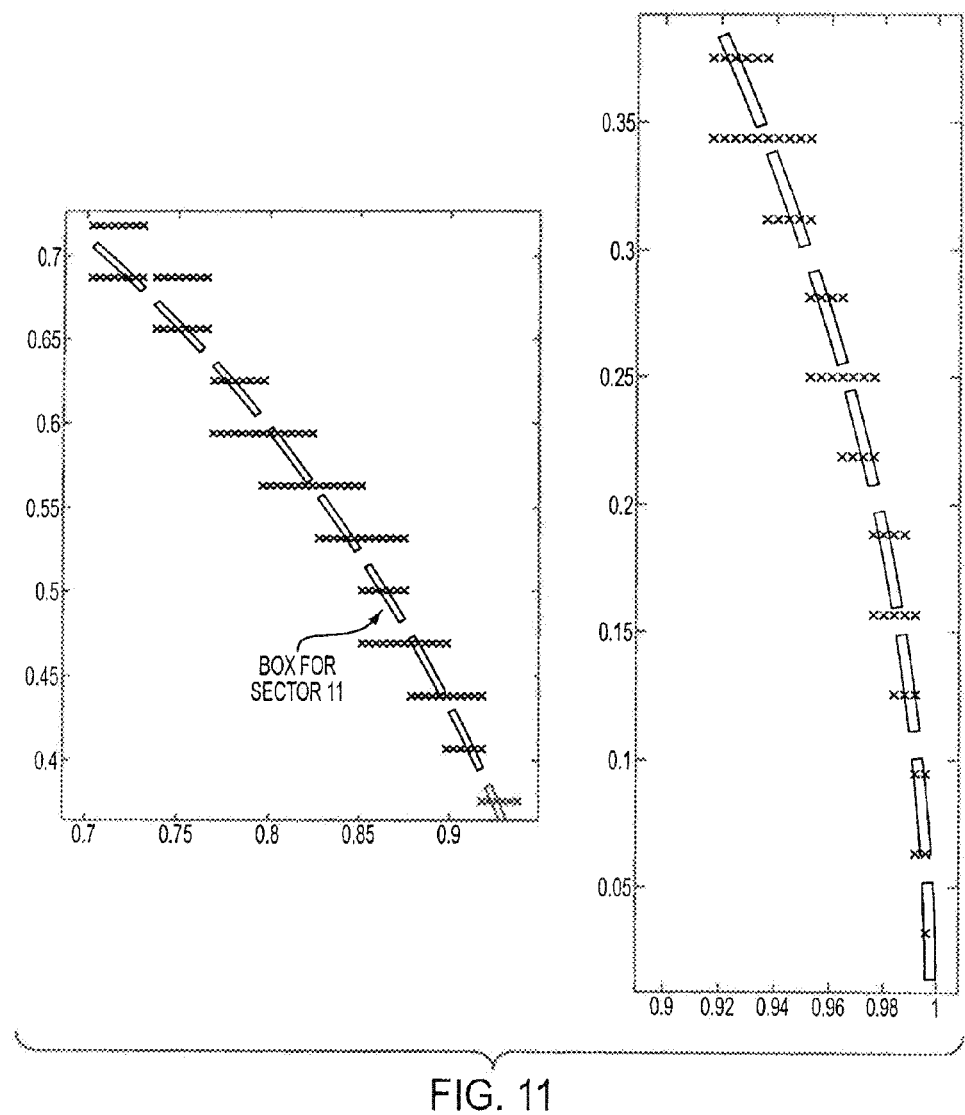
FIG. 11 illustrates intersections of X-rows and boxes for case 1 coarse stage inequalities according to an exemplary embodiment of the present invention.

The above discussion has shown how one can define 16 slightly curved rectangles ("boxes"), for each of the two possibilities (Case 1 and Case 2) of normalized fine-stage rotation words, within which a suitable point (C, S) may be found. The boxes shown in FIG. 11 are generated according to the boundaries defined by inequalities (44). Also shown in FIG. 11 are points, marked by X, that are points whose coordinates are suitable for C and S values where each C (horizontal coordinate) is described by 8-bit fractions and each S (vertical coordinate) is defined by 5-bit fractions. Notice that the vertical spacing between rows of X points is far larger than the horizontal spacing between points on the same row. This is a direct consequence of the fact that the vertical coordinate of each X is specified by a 5-bit fraction while the horizontal coordinate of each X is specified by an 8-bit fraction. (Both the horizontal and vertical axes of FIG. 11 have the same scale.) It also happens that each box has at least one (typically just one) X point in it. Here's why:

The radial width of each box is $1-1/(1+2^{-8})\approx 2^{-8}$, hence, due to the slanting orientation of each box, if a horizontal X-row intersects a box, it is virtually a certainty that one X (but usually just one X) lies inside the box.

From inequalities (44), it is evident that the angular length of a box is $$(\theta_M+\text{offset})+(\pi/4)(1/32)-(\theta_M+\text{offset})-(\pi/4)(2^{-4}-2^{-13})+ 1/16\approx(\pi/128)-(\pi/64)+1/16=1/16-\pi/128\approx 0.038$$

while the distance between X-rows is the smaller amount $2^{-5}=0.03125$. These facts make it virtually inevitable that each box will be intersected by at least one (and possibly two) X-rows. As the box orientations tend to have more shallow slopes near the top of the first octant, it follows that their vertical height then becomes shorter ($\approx 0.038/\sqrt{2}=0.027$ in the limit) but the vertical height of all boxes is still close enough to 0.03125 that it is quite reasonable to expect intersections with X-rows—and they do, indeed, occur for all M sectors, as is shown in FIG. 11.

Figure 12:
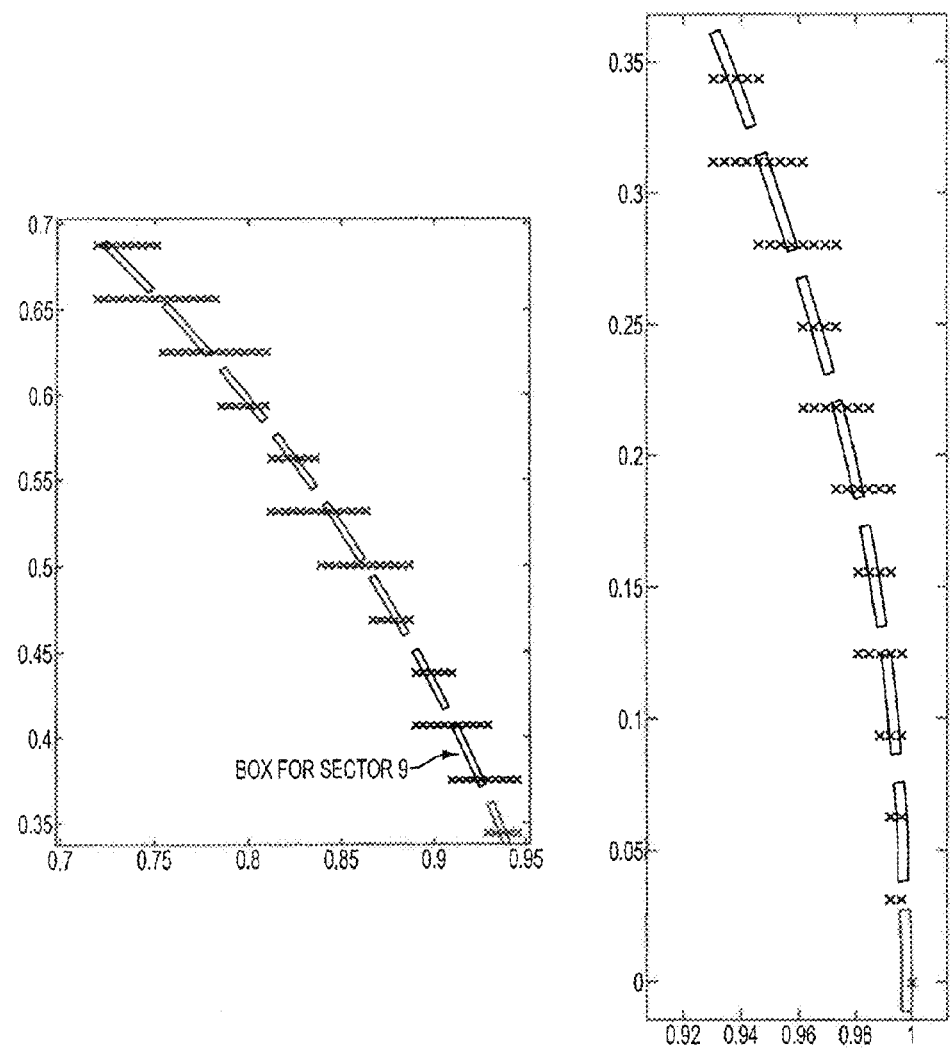
FIG. 12 illustrates intersections of X-rows and boxes for case 2 coarse stage inequalities according to an exemplary embodiment of the present invention.

A similar situation exists for the boxes that are created for Case 2 angles, as shown in FIG. 12. Their angular lengths are, again, approximately $1/16-\pi/128\approx 0.038$, making them equally capable to the Case 1 of having intersections with X-rows.

A complete set of C and S pairs, with two such pairs corresponding to each of the M=16 sectors [one pair for each of the Case 1 and Case 2 possibilities] can be generated in the manner described above. These values can be used to generate $\arctan(S/C)$ values, which can be employed in the construction of ROM tables containing $\theta_M-\theta_m$ values, in the spirit of the ROM 102, where now the content of each ROM entry is, according to inequalities (41), $(\theta_M+\text{offset})-\arctan(S/C)$, this value representing the difference between the desired coarse-stage rotation value and the actual coarse-stage rotation value. Upon the adding of this ROM value to the $(\pi/4)\overline{\theta}_L$ value, during the operation of the digital mixer circuit, as is also done in FIG. 1, we obtain the fine rotation angle, augmented by the offset value, which is to be processed by the fine-angle rotation stage.

For each of the M sectors it is also possible to store delta values ($\delta$) in a ROM and they can be retrieved during the operation of the mixer; these are used to direct the magnitude-scaling operation that compensates for the small amount of coarse-stage magnitude reduction that is produced by the circuits performing the coarse-stage rotations by the arctan (S/C) angles.

2.2.3 Alternative Radial Bounds on the Coarse-Stage Rotation Values S and C

It is evident that a radial bounding region of similar type to that discussed in the previous section could be located just outside the unit circle, rather than just inside it. Doing so would lead to S and C values for which the coarse stage rotation would slightly lengthen the rotated vectors rather than slightly shortening them. This would require a compensating scaling procedure that shortens, rather than lengthens the coarse stage output vectors. Following a procedure similar to that described previously, we can, for example, consider a point p=(C, 5) in the plane that lies outside the unit circle, but close to it. Namely, let p lie inside the circle of radius r=1+2$^{-8}$ centered at the origin. Then, if we multiply the components of p by a factor f to put the resulting point on the unit circle, f will be closer to 1 than the f value that scales the upper limit point $p_r$=1+2$^{-8}$. Let f=1−$\delta_r$, then f×$p_r$=(1−$\delta_r$)(1+2$^{-8}$)=1 implies $\delta_r$≈2$^{-8}$=2$^4$×2$^{-12}$. That is, for any point within the two concentric circles, the scaling factor that moves the point to the unit circle is 1−δ where δ=0.00000000xxxx. (Again, other values of r can be employed.) By continuing to follow this kind of development, patterned after the discussion of the previous section, it will be clear to those of ordinary skill in the art that a similar method of determining suitable locations for points (C, 5) can be obtained. It will also be clear that in the overall system, compensating scaling circuitry can be employed that is similar to that used for the previous (C, S) points, except subtractions of "delta" values could be used rather than additions.

In addition, it will be clear to those of ordinary skill in the art that it is possible to determine radial bounding regions of the sort we have been describing that extend both inside and outside the unit circle, but remain close to it. It may happen that this leads to scaling compensation circuitry that must consider both up-scaling and down-scaling of the length of the rotated vector. This could entail circuitry capable of conditionally adding or subtracting, in the processing of δ values. The number of nonzero bits employed in the representation of the δ values could differ from the four bits employed in the preceding discussion. It will also be evident to one of ordinary skill in the art that, by creating such bounds, we may increase the horizontal width of the boxes discussed in the preceding section, which could provide additional intersections between the points on the horizontal X-rows and the boxes, leading to an expansion in the possible options available for the overall system design, in the spirit of the techniques discussed elsewhere in this patent—techniques described in the next section, for example.

Figure 13:
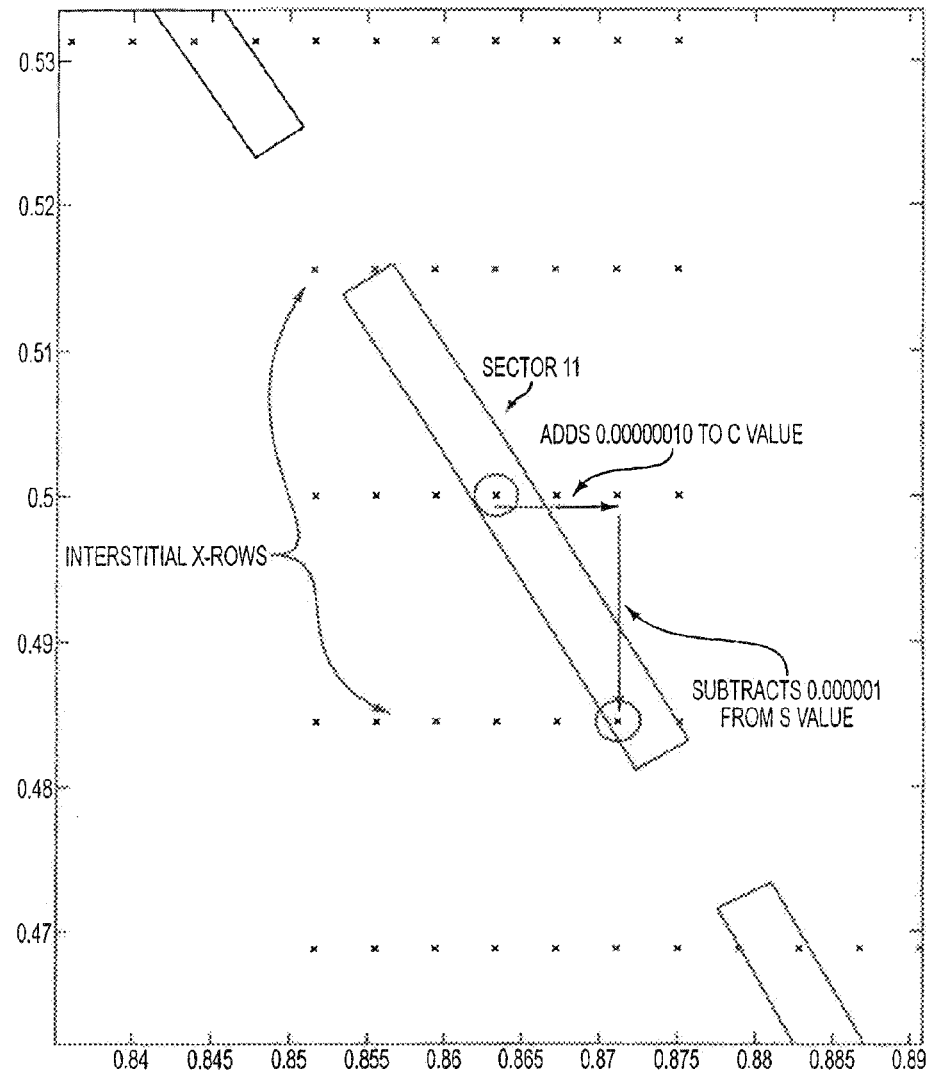
FIG. 13 illustrates using interstitial rows to create intersections of X-rows and boxes for case 1 and/or case 2 coarse stage inequalities according to an exemplary embodiment of the present invention.

The bit sequence representing the specific cosine value C and/or the S specific sine value S may be extend by one or more bits to create interstitial rows to ensure that all boxes in FIG. 11 and FIG. 12 have intersections with X-rows. For example, as shown in FIG. 13, the bit sequence representing the S specific sine value S may be extended from five to six bits, which causes "interstitial" X-rows to be present midway between the rows shown in FIG. 11 and FIG. 12. A nonzero extension of the S specific sine value S allows for alteration of the specific cosine value C such that appropriate bits are made zero simultaneously, causing the resulting point (C, S) to satisfy certain implementation requirements of a circuit such as that shown in FIG. 5.

Figure 14:
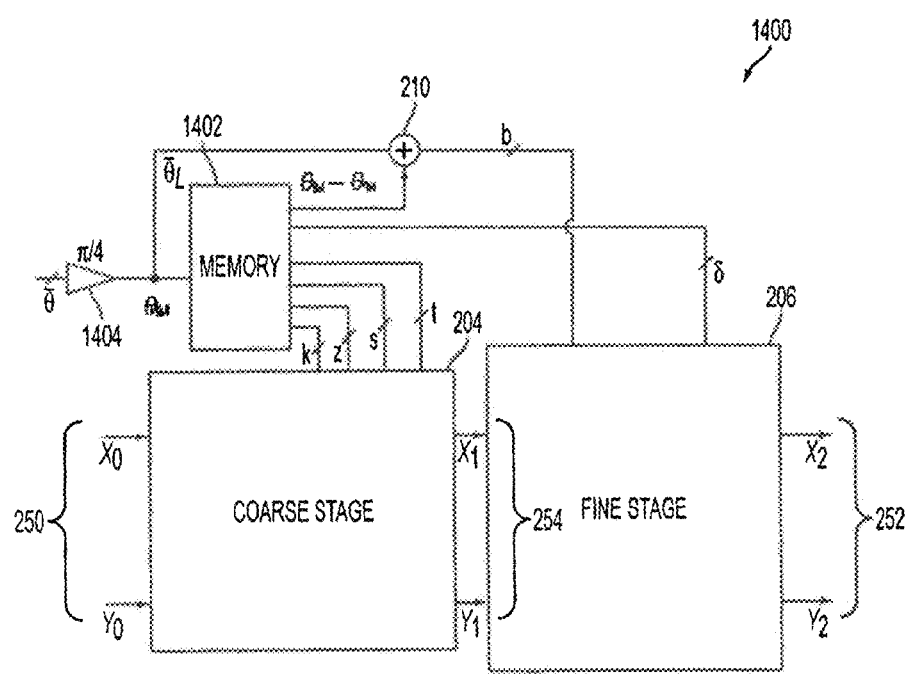
FIG. 14 illustrates a block diagram of the angle rotator according to an additional embodiment of the present invention.

2.3 Optimization to Reduce Memory Storage for the Coarse Rotation Butterfly Circuit Referring to FIG. 2, the angle rotator 200 includes a scaling multiplier 208 to convert the normalized fine angle $\bar{\theta}_L$ to a representation in radians. A summation module 210 next combines $\theta_L$, the normalized fine angle $\bar{\theta}_L$ as expressed in radians, with the conversion factor $\theta_M$−$\theta_m$ to create a fine angle that includes both the true fine angle as well as error correction amounts for correcting the coarse-stage rotation error. We now call this radian-dimensioned value b. As shown in FIG. 14, an angle rotator 1400 includes a memory storage device 1402 that includes a reduction in the size of available storage when compared to memory storage device 202. The reduction in the size of the memory storage device 202 may be achieved by placing the scaling multiplier 1402 such that it directly converts the complete normalized angle $\bar{\theta}$ to a representation in radians. The most significant bits of the converted unnormalized angle θ may be used to address the memory storage device 1402 in a substantially similar manner as was done for the angle rotator 200.

Since one radian corresponds to approximately 57.3 degrees, which is greater than the π/4 value that defines the upper limit of an interval of angles of interest, it is evident that the larger angles in this set would never be accessed by the unnormalized address word $\theta_M$, i.e., by the four most-significant bits of the angle θ=(π/4)×$\bar{\theta}$. Hence, the corresponding memory storage positions need not be constructed. A rough approximation of π/4≈¾ shows that approximately ¼ of the previously employed storage locations need not be built. For example, a coarse angle $\theta_M$ having four bits requires only thirteen storage locations.

3. Fine Stage Architecture 3.1 Overview

The angle rotation performed by coarse stage 204 discussed above may alter the magnitude scaling of its $X_1$, $Y_1$ outputs because the coefficient values employed to approximate cos θ and sin θ do not exactly satisfy cos$^2$ θ+sin$^2$ θ=1. This is discussed in detail in Fu I and Fu, "Efficient Synchronization Architectures for Multimedia Communications," Ph.D. dissertation, Univ. California, Los Angeles, 2000 (Fu II), each of which is incorporated by reference in its entirety. Thus, in addition to providing a small further rotation according to the fine angle, the fine stage corrects for small coarse-stage angular rotation imprecisions and re-scales the output values to correct for slight magnitude scaling errors caused by the coarse stage. FIGS. 15-A and 15-B depict a high-level block diagram of an exemplary fine stage 1506, according to embodiments of the present invention.

Fine stage 1506 may include a magnitude scaling module 1510 and an angle-rotation module 1520. Magnitude scaling module 1510 is configured to correct for scaling errors introduced by coarse stage 204. Magnitude scaling module 1510 is discussed in detail in Section 3.3 below. Angle-rotation module 1520 corrects for small coarse-stage angular rotation imprecisions. Angle-rotation module 1520 is discussed in Section 3.2 below. As illustrated in FIG. 15-A, magnitude scaling module 1510, when present, can be coupled between the coarse stage 204 and angle-rotation module 1520 at the input of fine stage 1506A. Alternatively, as illustrated in FIG. 15-B, magnitude scaling module 1510, when present, can be coupled to the output of angle-rotation module 1520.

As illustrated in FIGS. 15-A and B, unlike the prior-art system depicted in FIG. 1, magnitude scaling is factored-out from angle-rotation in the fine stage. The magnitude-scaling operation that the fine stage 106 of the system of FIG. 1 performs is the multiplication of the $X_2$, $Y_2$ fine-stage outputs (input scaling is equivalent) by the factor 1+$\delta_{[\cos\,\theta_l]}$. The rotation operation that the fine stage 106 of the system of FIG. 1 performs is:

$$\begin{pmatrix} X_{out} \\ Y_{out} \end{pmatrix} = \begin{bmatrix} \cos\phi & -\sin\phi \\ \sin\phi & \cos\phi \end{bmatrix} \begin{pmatrix} X_{in} \\ Y_{in} \end{pmatrix} \quad (45)$$

where the matrix element sin φ is an approximation to the sine of the angle through which the fine stage must rotate the input vector $[X_{in}\,Y_{in}]^T$. That approximate value is, according to Fu I, sin φ≈$\theta_l$, where $\theta_l$ is generated at the top of FIG. 1. The matrix element cos φ is an approximation to the cosine of the angle through which the fine stage must rotate its input vector. That approximate value is: cos φ≈(1−$\theta_l^2$/2).

The magnitude-scaling operation that the fine stage 106 of the system of FIG. 1 performs is $$\begin{pmatrix} X_{out} \\ Y_{out} \end{pmatrix} = \begin{bmatrix} 1 + \delta_{[\cos\theta_1]} & 0 \\ 0 & 1 + \delta_{[\cos\theta_1]} \end{bmatrix} \begin{pmatrix} X_{in} \\ Y_{in} \end{pmatrix} \quad (46)$$

where the matrix element $1+\delta_{[\cos\theta_l]}$ employs the value $\delta_{[\cos\theta_l]}$ that is stored and retrieved from ROM 102. These two matrix operations (rotation and scaling) are cascaded and, in principle, either one can be first. The result of these two operations is as if the single matrix operation $$\begin{pmatrix} X_{out} \\ Y_{out} \end{pmatrix} = \begin{bmatrix} 1+\delta_{[\cos\theta_1]}(1-\theta_l^2/2) & -(1+\delta_{[\cos\theta_1]})\theta_l \\ (1+\delta_{[\cos\theta_1]})\theta_l & (1+\delta_{[\cos\theta_1]})(1-\theta_l^2/2) \end{bmatrix} \begin{pmatrix} X_{in} \\ Y_{in} \end{pmatrix} \quad (47)$$

is employed.

In computing the products indicated by each entry in this matrix, the error analysis, described in Fu I, justifies the omission of the terms that result from multiplying two elements that are both small; more specifically, the product terms $\delta_{[\cos\theta_l]}\times\theta_l^2/2$ and $\delta_{[\cos\theta_l]}\times\theta_l$ are ignored. This reduces the combined matrix operation to the following, which describes the fine-stage portion of the angle-rotator shown in FIG. 1.

$$\begin{pmatrix} X_{out} \\ Y_{out} \end{pmatrix} = \begin{bmatrix} 1+\delta_{[\cos\theta_1]} - \theta_l^2/2 & -\theta_l \\ \theta_l & (1+\delta_{[\cos\theta_1]} - \theta_l^2/2) \end{bmatrix} \begin{pmatrix} X_{in} \\ Y_{in} \end{pmatrix}. \quad (48)$$

Another way to organize the same fine-stage computations is described mathematically as follows. The fine stage angle-rotation matrix of (45) is written in detail, using $\sin\phi \approx \theta_l$ and $\cos\phi \approx (1-\theta_l^2/2)$, and a diagonal matrix containing the approximations used for the $\cos\phi$ terms is factored out. The following equation results:

$$\begin{pmatrix} X_{out} \\ Y_{out} \end{pmatrix} = \begin{bmatrix} 1 & -\theta_l/(1-\theta_l^2/2) \\ \theta_l/(1-\theta_l^2/2) & 1 \end{bmatrix} \quad (49)$$

$$\begin{bmatrix} (1-\theta_l^2/2) & 0 \\ 0 & (1-\theta_l^2/2) \end{bmatrix} \begin{pmatrix} X_{in} \\ Y_{in} \end{pmatrix}.$$

The error made in approximating $\theta_l/(1-\theta_l^2/2)$ by the much simpler expression $\theta_l$ is on the order of $\theta_l^3/2$. Thus, this approximation is used to obtain:

$$\begin{pmatrix} X_{out} \\ Y_{out} \end{pmatrix} = \begin{bmatrix} 1 & -\theta_i \\ \theta_i & 1 \end{bmatrix} \begin{bmatrix} (1-\theta_l^2/2) & 0 \\ 0 & (1-\theta_l^2/2) \end{bmatrix} \begin{pmatrix} X_{in} \\ Y_{in} \end{pmatrix}. \quad (50)$$

The magnitude-scaling matrix for the fine-stage computations is applied by multiplying the matrix product shown above by $1+\delta_{[\cos\theta_l]}$. This yields:

$$\begin{pmatrix} X_{out} \\ Y_{out} \end{pmatrix} = \begin{bmatrix} 1 & -\theta_i \\ \theta_i & 1 \end{bmatrix} \begin{bmatrix} (1-\theta_l^2/2) & 0 \\ 0 & (1-\theta_l^2/2) \end{bmatrix} \quad (51)$$

$$\begin{bmatrix} 1+\delta_{[\cos\theta_1]} & 0 \\ 0 & 1+\delta_{[\cos\theta_1]} \end{bmatrix} \begin{pmatrix} X_{in} \\ Y_{in} \end{pmatrix}$$

and, when multiplying the two diagonal matrices, the same omission of the small term $\delta_{[\cos\theta_l]}\times\theta_l^2/2$ that the analysis of Fu I has justified is made, yielding:

$$\begin{pmatrix} X_{out} \\ Y_{out} \end{pmatrix} = \begin{bmatrix} 1 & -\theta_i \\ \theta_i & 1 \end{bmatrix} \quad (52)$$

$$\begin{bmatrix} (1+\delta_{[\cos\theta_1]} - \theta_l^2/2) & 0 \\ 0 & (1+\delta_{[\cos\theta_1]} - \theta_l^2/2) \end{bmatrix} \begin{pmatrix} X_{in} \\ Y_{in} \end{pmatrix}.$$

As discussed above, the diagonal matrices that were factored out of the fine-stage matrix could have been located on either side of the remaining matrix (because they are more special than just "diagonal"—they are a multiple of the identity matrix). Thus, the same types of magnitude-scaling circuitry could be employed at the output of the fine-stage (e.g., as illustrated in FIG. 15-B) rather than at the input (e.g., as illustrated in FIG. 15-A).

Equation (52) exactly describes the revised fine-stage architecture shown in FIG. 16, where $(X_{in}, Y_{in})=(X_1, Y_1)$ and $(X_{out}, Y_{out})=(X_2, Y_2)$. FIG. 16 is an exemplary embodiment of a fine stage 1606, according to embodiments of the present invention. Fine stage 1606 includes a factored-out magnitude scaling module 1610 and an angle-rotation block 1620.

As described above, the cosine multipliers, along with their added magnitude scaling feature, are factored-out from the fine stage. These computations can be re-introduced either at the input to the remaining fine-stage circuitry or at the output of the remaining fine-stage circuitry. In the example embodiment of FIG. 16, the removed circuitry is located at the fine stage input—that is between the coarse stage and the fine stage. As would be appreciated by persons of skill in the art, the removed circuitry could also have been located at the fine stage output in FIG. 16.

The magnitude-scaling module 1610 employs the same multiplication and addition operations as those appearing in the corresponding circuitry of FIG. 1. As in FIG. 1, the multiplications can be implemented using small (order N/3×N/3) multipliers. Since these multipliers are known to be small, they could be implemented efficiently by traditional methods, such as employing Booth-encoded multipliers, or they could be replaced with SPT multiplications of the sort described herein for the coarse stage. For more detail on the use of Booth encoded multipliers, see A. D. Booth, "A Signed Binary Multiplication Technique," *Quart. J. Mech. Appl. Math.*, vol. 4, 1951, pp. 236-240 (Booth) and I. Koren, *Computer Arithmetic Algorithms*, $2^{nd}$ ed., Natick, Mass. (2002), each of which is incorporated by reference in its entirety.

Performing a multiplication by a four-bit coefficient (as feeds the 4×5 multipliers in FIG. 1), selected from a set of hard-wired choices, would require an average of approximately 0.81 additions/subtractions. Thus, if implemented this way, the complete magnitude scaling module 1610 would require an average total of just 2×(0.81+1)=3.6 add/subtract operations, and its computational delay would never exceed the time required for three additions. Additional alternatives for magnitude-scaling module 1610 are described in Section 3.3 below.

Angle-rotation module 1620 can be structured in various ways. Fundamentally, it is a block having a pair of inputs that can be considered the coordinates of a point in the X-Y plane, and an input specifying an angle $\theta_l$ (in radians) by which the point is to be rotated to arrive at a new point in the X-Y plane whose coordinates are the pair of output values $X_2, Y_2$. Moreover $\theta_l$ is a sufficiently small angle that the approximation sin $\theta_I \approx \theta_I$ applies. The function required by this angle-rotation block is similar to the function required in various publications in the current literature and, depending upon the mixer's application, one or another of the existing techniques may be the most preferable approach. Many publications have discussed the use of the CORDIC algorithm for this task. For more details on the use of the CORDIC algorithm for this task, see J. Voider, "The CORDIC Trigonometric Computing Technique," *IEEE Trans. Computers*, vol. EC-8, pp. 330-334, September 1959 (Voider), J. Vankka and K. Halonen, *Direct Digital Synthesizers: Theory, Design, Applications*. Boston: Kluwer, 2001 (Vankka), Y. Ahn, et al., "VLSI Design of a CORDIC-based Derotator," in *Proc. IEEE Int. Symp. Circuits Syst.*, vol. 2, May 1998, pp. 449-452 (Ahn), D. DeCaro, N. Petra, and A. G. M. Strollo, "A 380 MHz, 150 mW Direct Digital Synthesizer/Mixer, in 0.25 μm CMOS," (DeCaro I) in *IEEE Int. Solid-State Circuits Conf. Dig. Tech. Papers*, February 2006, pp. 258-259, and D. DeCaro, N. Petra, and A. G. M. Strollo, "A 380 MHz Direct Digital Synthesizer/Mixer with Hybrid CORDIC Architecture in 0.25-μm CMOS" *IEEE J. Solid-State Circuits*, vol. 42, no. 1, pp. 151-160, January 2007 (DeCaro II), each of which is incorporated by reference in its entirety.

In addition, a modified CORDIC approach has been proposed. For more details on the modified CORDIC approach, see A. Madisetti, "VLSI Architectures and IC Implementations for Bandwidth Efficient Communications," Ph.D. dissertation, Univ. California, Los Angeles, 1996 (Madisetti I) and A. Madisetti and A. Y. Kwentus, "Method and Apparatus for Direct Digital Frequency Synthesizer," U.S. Pat. No. 5,737,253, issued Apr. 7, 1998 (Madisetti II), each of which is incorporated by reference in its entirety.

Additionally, angle-rotation may also be performed using the minority-select technique described in U.S. Patent Publication No. 2006/0167962, entitled "Method and Apparatus for Improved Direct Digital Frequency Synthesizer," filed Jan. 26, 2005, which is incorporated herein by reference in its entirety. In some of these solutions (e.g., Madisetti, minority-select), it may be required to incorporate an additional (conditional) rotation of the $(X_1, Y_1)$ point. Alternatively, this conditional rotation could occur at various locations in the datapath, i.e., at the block's input (or even before that), or at the block's output, or at some internal point along the datapath.

3.2 Fine Angle Rotation
3.2.1 Minority Select Techniques

The fine-stage datapath can be constructed as a sequence of subrotations, with each rotation controlled by certain information provided by the rotation angle $\theta_I$ of FIG. 16. The individual bits of the angle $\theta_I$ could directly provide the information needed to define a sequence of subrotations, as could the bits of a "normalized" angle-specification which would differ from $\theta_I$ by a factor of $4/\pi$. The Madisetti approach uses the bits of 9 in a certain "re-coded form" with the re-coded bit sequence used to specify the subrotation direction for each member of a sequence of controlled "butterfly stages," as discussed in Madisetti I and II. Moreover, certain butterfly stages can be implemented more cheaply than discussed in Torosyan I by using the minority-select approach of U.S. Patent Publication No. 2006/0167962. Here, it may be necessary to add one or more conditional offset rotations to the $(X_1, Y_1)$ scaled (or unscaled) input, or to one of the (X, Y) pairs at some point along the overall system's datapath. This could be accomplished by use of the approach described in Chapter 3 of Madisetti I or, for example, by incorporating, conditionally, an additional rotation into the coarse stage which would be dependent on the value of $\theta_I$.

3.2.1.1 Minority Select with Conditional Rotation

FIG. 17 is a block diagram of an exemplary fine stage 1706 using conditional rotation to facilitate the use of minority-select angle rotation in the fine stage, according to embodiments of the present invention. Fine stage 1706 includes a minority bit detector 1770, an initial conditional rotation stage 1780, a multiplexer 1790, and multiple minority select stages 1792.

Initial conditional rotation stage 1780 receives the input coordinates $(X_1, Y_1)$ and at least a portion of the bit sequence $b_1 b_2 b_3 \ldots b_n$ representing $\theta_I$ and performs an initial conditional rotation of the coordinates. In an embodiment, the initial conditional rotation is the maximum fine rotation. In this embodiment, the output of the initial conditional rotation stage 1780 is over-rotated. The subsequent minority select stages then must subtract rotation (i.e., perform a clockwise rotation).

FIG. 18 is a block diagram 1880 of an exemplary initial conditional rotation stage 1780, according to embodiments of the present invention. FIG. 18 provides a hard-wired shift and add/subtract implementation of conditional rotations. Let it be assumed that certain subrotation stages, in the fine-rotation stage, are implemented by the minority-select method and these stages will, for a range of consecutive integers $k = k_a, \ldots k_z$, either perform a rotation by the subangle $\theta_k = 2^{-k}$ radians, specified by bit k of the angle $\theta_I$ or else no rotation related to $\theta_k$ will occur. According to the minority-select requirements, means of conditionally rotating a datapath point, $(X_1, Y_1)$, by the angle $2^{-k_a} + 2^{-(k_a+1)} + \ldots + 2^{-k_z}$ Must be provided. It is well known that this finite geometric series can be summed as $2^{-(k_a-1)} - 2^{-k_z}$. Therefore, one method of performing the conditional rotation is to build the simple hard-wired shift and add/subtract circuitry required to conditionally perform the two rotations by the radian angles $2^{-(k_a-1)}$ and $-2^{-k_z}$. In the context of the minority-select angle-rotation block, since it is not known in advance which bit pattern is to be encountered when processing each input data sample pair $(X_1, Y_1)$, it is not known in advance whether the conditional rotation is to be performed. Nonetheless, the values of $k_a$ and $k_z$ are known in advance, hence we can build two fixed-shift add/subtract butterfly stages for which "variable shifters" (as discussed in U.S. Patent Publication No. 2006/0167962) are not required.

FIG. 18 illustrates these (conditionally employed) fixed rotation stages. In initial conditional rotation stage 1880, first shift by $k_a - 1$ bits block 1882 and first shift by $k_z$ bits block 1886 receive input $X_{in}$. Second shift by $k_a - 1$ bits block 1884 and second shift by $k_z$ bits block 1888 receive input $Y_{in}$. In an embodiment, the shift blocks are hard-wired shifts. Adder 1883 receives the output of first shift by $k_a - 1$ bits block 1882 and Y, as inputs. Adder 1885 receives the inversion of the output of first shift by $k_z$ bits block 1886 and the output of adder 1883. The output of adder 1885 is $Y_{out}$. Similarly, Adder 1887 receives the inversion of the output of second shift by $k_a - 1$ bits block 1884 and X, as inputs. Adder 1889 receives the output of second shift by $k_z$ bits block 1888 and the output of adder 1887 as inputs. The output of adder 1889 is $X_{out}$.

It is clear that the complete system of FIG. 18 can be built with a cost of just four additions, which, if desired, can be implemented as carry-save arrays, operating on input data $(X_{in}, Y_{in})$ and producing carry-save output data $(X_{out}, Y_{out})$. If the input data $(X_{in}, Y_{in})$ are in carry-ripple form, the $X_{out}$ value can be produced in carry-save form by use of a single CSA. This, of course, is true for $Y_{out}$ as well. Other manners of employing the minority-select technique in the implementation of a mixer's fine stage will be discussed subsequently.

Returning to FIG. 17, minority bit detector 1770 receives at least a portion of the bit sequence $b_1b_2b_3 \ldots b_n$ representing $\theta_I$ and determines whether the minority of bits in the bit sequence are "1" or "0" bits. Minority bit detector 1770 generates a minority bit signal 1772 indicating which bit is in the minority. In an embodiment, the minority bit signal 1772 is used to control multiplexer 1790. Minority bit detector 1770 also generates the shift and zero signals for the minority-select stages.

Multiplexer 1790 determines whether to provide the over-rotated input coordinates or the unrotated input coordinates to minority select stages 1792 based on the value of the minority bit controlling the multiplexer. The output of multiplexer 1790 is represented as intermediate coordinates, $X_{int}$, $Y_{int}$. For example, if the minority bit indicates that "0" bit is in the minority, multiplexer 1790 outputs the over-rotated input coordinates from initial conditional rotation stage 1780. Alternatively, if the minority bit indicates that "1" bit is in the minority, multiplexer 1790 outputs the unrotated input coordinates.

Minority select stages 1792 receive the intermediate coordinates and either rotate the coordinates clockwise (subtracting rotations) or counter clockwise (adding rotations) based on the shift and zero signals received from minority bit detector 1770. For example, if the intermediate coordinates are the over-rotated input coordinates, minority select stages 1792 are used to subtract rotation (i.e., rotate intermediate coordinates in the clockwise direction). For information on minority select stages, see U.S. Patent Publication 2006/0167962.

3.2.1.2 Minority Select with Offset

If a two-stage mixer is designed such that the coarse-stage rotation can efficiently offer a choice of two outputs, one differing from the other by a built-in offset rotation of a fixed angular amount that is appropriate for supplying the conditional rotation needed by a minority-select fine stage, then this feature can lead to an attractive overall system. An alternative, when it is apparent that the cost of generating a choice of two coarse-stage outputs would be excessive, is a system wherein, for each data point processed, the specific minority-select fine-stage angle rotation requirements are made apparent prior to performing (or prior to completing) the coarse-stage rotation. Then, for each data point processed, rather than providing a choice of two output pairs ($X_{out1}$, $Y_{out1}$), ($X_{out2}$, $Y_{out2}$), the coarse stage need only proved the one output pair ($X_{out}$, $Y_{out}$) that is most appropriate for improving the fine stage's computational efficiency via "minority select."

In this embodiment, the fine stage of the two-stage mixer includes a minority-select rotation feature for a range of consecutive bits within $\theta_I$, as described previously; most typically this range would be all bits of the angle $\theta_I$. Rather than explicitly providing a conditional rotation for this minority-select fine stage system by, for example, the use of the circuit in FIG. 18, an alternative is the introduction of the offset rotation value $2^{-(k_a-1)} - 2^{-k_z}$ in the manner discussed for the excess-threes and excess-fours system, below. A problem presented by this approach is that when such an offset becomes a part of the $\theta_I$ fine-stage angle, it is not such a simple matter to modify the fine-stage processing to accommodate it.

Consider, for simplicity, the example situation where there are just three bits (B=3) in the fine stage angle $\theta_I$ and a minority-select fine-stage rotation involving a single addition of a scaled Y value to the X value is desired (and, of course, a similar computation for generating a rotated Y output). When 'one' bits are in the minority, just one addition is needed. When 'zero' bits are in the minority, however, the minority-select method requires the performance of the conditional rotation by 111 and then the processing of the minority-zero bit. For example, to provide the rotation 011 a conditional (counter-clockwise) rotation of 111 would be "built-in" and the single fine stage (clockwise) rotation by 100 then performed. However, when adding 111 to whatever overall rotation is otherwise required, if the result is that the fine-stage rotation angle were to change from 011 (three) to 1010 (ten=three+seven) then, assuming the leading (high-order) bit of 1010 (i.e., "eight") becomes a part of whatever angle-rotation processing precedes the minority-select fine stage, it would be necessary for the fine stage to interpret the new three-bit pattern 010 as if it were 101, which, while correctly compensating, by rotating (clockwise) for a counter-clockwise rotation by 8 (because 3=8−5), would not be a rotation driven by a single 'one' bit. Moreover, when this process is employed on other minority-zero patterns, a similar situation results. In general:

011=>1010=>8−(101)

110=>1101=>8−(010)

101=>1100=>8−(011)

111=>1110=>8−(001)

which does not always yield the desired simple fine-stage processing.

The problem being encountered here is the need to always provide a clockwise rotation of 001 which compensates for the offset rotation by 8, which is larger than the 7 that is intended. Assuming the larger "eight" offset can be implemented at "no cost," the larger "eight" offset can be used along with the original three-bit pattern to indicate the "zero-bit driven" clockwise-rotation processing. Additionally, another "clean-up" rotation of −1 is then required (an additional one-LSB subtraction must also be performed in all cases where "0" is the minority bit).

FIG. 19 illustrates an exemplary embodiment of a fine stage 1906 using minority selection with offset rotation, according to embodiments of the present invention. Fine stage 1906 includes a minority bit selector 1970, a plurality of minority-select stages 1992, and a final rotation stage 1994.

As described above, minority bit detector 1970 receives the input angle $\theta_I$ bit sequence. Minority bit detector 1970 then determines whether the minority of bits in the bit sequence are "1" or "0" bits. Minority bit detector 1970 generates a minority bit signal 1972 indicating which bit is in the minority. In an embodiment, the minority bit signal 1972 is used to determine whether a final rotation should be applied to the output of the minority select stages. Minority bit detector 1970 also generates the shift and zero signals 1974 for the minority-select stages 1992.

As described above, minority select stages 1992 receive the input coordinates ($X_{in}$, $Y_{in}$) and either rotate the coordinates clockwise (subtracting rotations), counter clockwise (adding rotations) or perform no rotation, based on the shift and zero signals 1974 received from minority bit detector 1970.

Final rotation stage 1994 is configured to rotate the output of the minority select stages clockwise by a predetermined number (e.g., 1) to compensate for the rotation error introduced by the offset. In an embodiment, final rotation stage 1994 receives the minority select bit 1972 and the offset angle 1976. The final rotation stage 1994 then provides the final rotation, based on the offset angle, only when "0" bit is in the minority. As would be appreciated by persons of skill in the art, various mechanisms for performing this selection, including, but not limited to multiplexers, could be used in the present invention.

In summary, this minority-select implementation encounters a cost of one additional subtraction, which could be an acceptable cost in the overall system, particularly if the string of minority-select bits is long—longer than the three bits used in this simple example. Table 5 shows a tally of the cost for various B-bit lengths for the minority-select method. The right-most column shows other data for comparison purposes.

TABLE 5

| B | "Adds" for conventional Minority-Select | "Adds" for new Minority-Select method | When FIG. 13 rotation is used in Minority-sel. | Excess 3 or Excess 4 offset methods |
|---|---|---|---|---|
| 3 | 1 | 2 | 3 | 2 |
| 4 | 2 | 3 | 4 |   |
| 5 | 2 | 3 | 4 |   |
| 6 | 3 | 4 | 5 | 3 |
| 7 | 3 | 4 | 5 |   |
| 8 | 4 | 5 | 6 |   |
| 9 | 4 | 5 | 6 | 4 |
| 10 | 5 | 6 | 7 |   |
| 11 | 5 | 6 | 7 |   |
| 12 | 6 | 7 | 8 | 5 |
| 13 | 6 | 7 | 8 |   |
| 14 | 7 | 8 | 9 |   |
| 15 | 7 | 8 | 9 | 6 |

The issue of whether or not the "carry bit" (e.g., the "eight" in the example we've been considering), can be included for free in previous angle rotation processing must also be addressed. If, for example, the overall system consisted of a coarse-stage rotation driven by a radian-dimensioned address word, and if the "carry bit" simply incremented the coarse-rotation sector by one, then such a system could provide the sort of "free" inclusion of the carry bit that is desirable for the above-described type of system.

3.2.2 Non-Minority Select Techniques

While the minority-select fine-stage architecture provides a good means of improving the fine-stage efficiency of the FIG. 1 two-stage digital mixer (as well as being very efficient in the final angle-rotation processing for direct digital synthesizers described in U.S. Patent Publication 2006/0167962), methods and systems are described herein to provide alternatives to the minority-select system. One of the advantages gained by the minority-select method derives from its rejection of the CORDIC-type processing's requirement that each butterfly stage must always perform a rotation—even when the rotation is basically for the purpose of "undoing" another rotation. The minority-select method, however, imposes its own disadvantageous limitation: it restricts the available options to the binary choice of either doing just positive rotations (if '1' is in the minority) and no rotations, or else doing just negative rotations (if '0' is in the minority) and no rotations. The system's efficiency can be improved by combining all three types of rotations (positive, negative, none) irrespective of whether '0' or '1' is in the minority. The following embodiments describe systems and methods for such improvements to the minority-select techniques.

FIG. 20 is a high level block diagram of an exemplary angle rotation module 2020, according to embodiments of the present invention. Angle rotation module 2020 has a pair of inputs 2001, 2002 that can be considered coordinates of a point in the X-Y plane (e.g., $X_1, Y_1$). Note that angle rotation module 2020 may alternatively receive a pair of inputs 2001*, 2002* that are the outputs of the magnitude scaling module 1510. Angle rotation module 2020 may also receive a scaled $X_1$ input 2011 and a scaled $Y_1$ input 2012. In an embodiment, the scaled $X_1$ and $Y_1$ inputs are scaled by an integer, m (e.g., $3X_1, 3Y_1$). Angle rotation module 2020 also receives an input specifying an angle $\theta_I$ (in radians) 2003 by which one or more of the input coordinates are to be rotated to arrive at the new point in the X-Y plane whose coordinates are the pair of output values $X_2$ and $Y_2$, which are labeled $X_{OUT}$ and $Y_{OUT}$ in FIG. 20. The angle $\theta_I$ 2003 is an N-bit radian-valued angle $b_1 b_2 b_3 \ldots b_{N-1} b_N$ in which each $b_k$ represents a bit having a 0 or a 1.

As illustrated in FIG. 20, angle rotation module 2020 includes a plurality of subrotation modules $2022_A$-$2022_N$. Each of the subrotation modules $2022_A$-$2022_N$ generates a subrotation output based on an n-bit group of the N-bit radian-valued angle word $b_1 b_2 b_3 \ldots b_{N-1} b_N$. For example, subrotation module $2022_A$ receives a first group of adjacent bits $b_1 b_2 \ldots b_n$, subrotation module $2022_B$ receives a second group of adjacent bits $b_{n+1} b_{n+2} \ldots b_{2n}$, and subrotation module $2022_N$ receives the final group of adjacent bits $b_{N-n} \ldots b_N$. As would be appreciated by a person of skill in the art, subrotation module $2022_B$ employs a smaller angle than subrotation module $2022_A$, subrotation module $2022_C$ employs a smaller angle than subrotation module $2022_A$, and so on.

In an embodiment, the radian-valued angle is a nine-bit word and each subrotation module 2022 receives a 3-bit group of the nine-bit angle word. As demonstrated below, it is useful to group all rotation bit positions into three-bit groups and to rotate (or not rotate) once for the entire group in either a clockwise or a counter-clockwise direction. The discussion below considers one such three-bit group, and examines how many additions, on average, are required to perform its complete three-bit rotation operation.

Table 1 shows each of the eight possible values that the group's three bits can represent. As shown in Column 3 of Table 1, except for two cases (3 and 5) whose rotation requirements are indicated by asterisks (***), each of the other six cases requires no more than a single add/subtract operation. Also, among those six cases, in two cases (6 and 7) a presumption is made that it is possible to perform the angle-rotation associated with a current three-bit group prior to the next higher-order (i.e., more significant) three-bit group, thereby making it possible to carry a "one" into that next higher-order group before its processing begins. In this regard, when such intergroup carries are being employed, a system must be prepared to process an incoming carry bit. This can lead to the possibility of one more line being required in Table 1, which deals with a "three-bit value" of 8. Here, one more case exists where a carry-out must be passed on to the next higher-order 3-bit group.

TABLE 1

| Three-bit value | The bits | Adds needed to get rotated X value | Cost |
|---|---|---|---|
| 0 | 000 | zero adds | zero adds |
| 1 | 001 | one add | one add |
| 2 | 010 | one add | one add |
| 3 | 011 | *** | one add |
| 4 | 100 | one add | one add |
| 5 | 101 | *** | 5 = 8 − 3, =>carry of 8 & one subtract |
| 6 | 110 | 6 = 8 − 2, =>carry of 8 & one subtract | 6 = 8 − 2, =>carry of 8 & one subtract |
| 7 | 111 | 7 = 8 − 1, =>carry of 8 & one subtract | 7 = 8 − 1, =>carry of 8 & one subtract |

For each of the cases in Table 1 where the asterisks appear, two rotations could be employed (avoiding the use of any "minority-select" methods here). In fact, the case of 5 is treated as representing 8−3, and if, similar to the method discussed in the previous paragraph, a carry into the next higher-order group is used to handle the "8" part, for both *** cases it suffices to be able to multiply the input being added or subtracted by "three" prior to the add/subtract. Therefore, the three-times X value, is simply computed, which costs one additional add (to get the 3X value, a one-bit-shifted copy of the input X value is added to itself). Notice that, when rotation stages associated with "single-bit angles" that represent sufficiently small angles are considered, a single three-times value that can then be repeatedly employed, whenever needed, in any of the three-bit groups is required. Thus, assuming such sufficiently small angles are involved in the complete set of these rotations, there is just the single penalty of one extra add operation that must be paid to facilitate the complete processing of all of the three-bit groups. Note that, of course, a rotated Y value must also be computed; hence a three-times Y value is needed as well. With this in mind, the values appearing in the fourth column of Table 1 are recognized. In the processing of any three-bit group, when the "one add/subtract" corresponding to a case of 3 or 5 is performed, the precomputed three-times value is simply used.

A benefit of this development is that the new three-bit-group processing method provides a means of performing all angle rotations at a cost of no more than N+1 add/subtract operations, where N is the number of three-bit groups. To appreciate the method's efficiency, it is instructive to compare its maximum number of add/subtracts with those of the minority-select method, for various numbers of three-bit groups.

Table 2 illustrates that whenever the number of three-bit groups is larger than N=1, no more total add/subtracts are required by the non-minority-select method than are required by the minority-select method. Moreover, the non-minority-select method has fewer add/subtracts whenever N>3 (i.e., whenever there are more than 9 total stages in the overall rotations that are being performed by minority-select or non-minority-select means). Again, however, this add/subtract number depends on keeping the set of angle bits being processed by these methods restricted to those where Madisetti's lookahead processing would apply. That is, the represented angles must be sufficiently small.

TABLE 2

| Number of small-angle rotations | Number of minority-select add/sub | N = number of three-bit groups | Number of non-minority-select add/sub |
|---|---|---|---|
| 3 | 1 | 1 | 2 |
| 6 | 3 | 2 | 3 |
| 9 | 4 | 3 | 4 |
| 12 | 6 | 4 | 5 |
| 15 | 7 | 5 | 6 |
| 18 | 9 | 6 | 7 |

Excess-Threes Offset

The excess-threes offset technique is a further variation on the above-mentioned non-minority-select method that avoids the necessity to do the "inter-group carry" processing described above. Suppose the overall angle rotation that is specified for the fine subrotation module includes, for each 3-bit group, an extra rotation by $3 \times 2^{-t_k}$, where $t_k$ is the binary weight of the LSB in the k-th group. That is, an offset angle whose binary value increases the overall angle rotation by "011011011 . . . 011" (with one "011" sequence for each three-bit group) is proposed to be added to each of the rotation values. Then, when processing each of the three-bit groups, the actions shown in Table 3 are called for. There is no more than one add/subtract operation required for any three-bit group (just as in Table 1). One bit pattern, of the eight possibilities, requires zero adds, four bit patterns require one add, and three bit patterns require one subtract (just as in Table 1) of course the bit patterns to which these add/subtract actions are attached differ from those of Table 1. Notice, however, that no inter-group carry is required for any three-bit group. In effect, the previous method's carries have been built into the additional offset, computed once and included in the specified rotation values.

TABLE 3

| group value | in binary | treat as | cost |
|---|---|---|---|
| 0 | 000 | −3 | one subtract |
| 1 | 001 | −2 | one subtract |
| 2 | 010 | −1 | one subtract |
| 3 | 011 | 0 | zero adds |
| 4 | 100 | 1 | one add |
| 5 | 101 | 2 | one add |
| 6 | 110 | 3 | one add |
| 7 | 111 | 4 | one add |

Notice that, in addition to the simplifying of the processing of each angle rotation by removing the need to handle inter-group carry propagations in some manner, a further advantage over the minority-select method is achieved. That is, there is no need for the conditional rotations.

Excess-Fours Offset

An alternative embodiment of the previously described excess-threes non-minority-select method employs an excess-fours offset instead of excess-threes. Table 4 illustrates an exemplary excess-fours offset technique.

TABLE 4

| group value | in binary | treat as | cost |
|---|---|---|---|
| 0 | 000 | −4 | one subtract |
| 1 | 001 | −3 | one subtract |
| 2 | 010 | −2 | one subtract |
| 3 | 011 | −1 | one subtract |
| 4 | 100 | 0 | zero add |
| 5 | 101 | 1 | one add |
| 6 | 110 | 2 | one add |
| 7 | 111 | 3 | one add |

It is perhaps not immediately obvious that any systematic advantage exists by which one could determine whether one should choose the excess-threes offset method or the excess-fours offset method. A comparison of Table 3 and Table 4 indicates comparable computational complexity for both. There is, however, one somewhat subtle observation that could lead an person of skill in the art to utilize the "excess-fours" technique. Notice that, unlike Table 3, it would be possible to add a ninth row (call it group value 8) to Table 4, wherein a binary value of 8 could be accommodated by a single addition of 4. Thus, the "treat as" column of Table 4 would then span the range −4 to 4, not just −4 to 3. This 4 value could easily be processed by a single add/subtract, just like the processing of the other eight rows.

One practical use of this "excess-fours" feature relates to its facilitation of an efficient means of rounding the binary value being represented by the bits of the word from which the three-bit groups are taken. For the least significant one of these three-bit groups, if the excess-fours method is being used, one can include one additional LSB, which would bring in the requirement that that three-bit group must be prepared to represent values spanning 0 through 8. But since this representation is translated into the range "−4 through 4" by the excess-fours feature, it is quite possible to accommodate this extension with essentially no additional computational cost. There will be one add/subtract operation for processing the least-significant three-bit group whether or not that group is extended into a four-bit group as an implementation of the rounding of the additional fourth bit.

Returning to FIG. 20, rotation circuit 2026 is coupled to subrotation modules 2022$_A$-2022$_N$. Rotation circuit 2026 is configured to perform a rotation of one or both of the input coordinates X$_1$ or Y$_1$ based on the subrotation values received from each of the subrotation modules 2022$_A$-2022$_N$. Rotation circuit 2026 generates one or more coordinates (X$_2$, Y$_2$) of the rotated input point.

A subrotation module 2022 may have an associated fine stage magnitude scaling module 2028. In an embodiment, only the first subrotation module 2022$_A$ has an associated magnitude scaling module 2028 because the subsequent fine-stage subrotations employ sufficiently small angles. That is, undesired magnitude scaling associated with each of these n-bit groups (of the radian-valued angles) is substantially smaller than that of the first group. In this embodiment, magnitude-scaling compensation for the subsequent fine-stage subrotations is ignored.

The fine stage magnitude scaling module 2028 corrects for the by-product of the process of doing each of these n-bit subrotations—production of undesired magnitude enhancement. The size of this magnitude enhancement can be assessed as follows.

Suppose a rotation of a vector $[x\ y]^T$ by an angle α is desired. Then the following matrix multiplication produces this rotation exactly (i.e., with no magnitude scaling):

$$\begin{bmatrix} \cos\alpha & -\sin\alpha \\ \sin\alpha & \cos\alpha \end{bmatrix} \begin{pmatrix} x \\ y \end{pmatrix}. \quad (53)$$

Suppose, however, the angle α is a sufficiently small angle that the approximations sin α≈α, cos α≈1, and tan α≈α apply. Then, the simpler rotation matrix $$\begin{bmatrix} 1 & -\alpha \\ \alpha & 1 \end{bmatrix} \quad (54)$$

can be used instead of the original matrix. This simpler matrix is also used in the angle rotation block of FIG. 16. The two matrices can be related to one another by considering the simpler matrix (54) to have been obtained from the original matrix in (53) by factoring out the cos α term, that is $$\begin{bmatrix} \cos\alpha & -\sin\alpha \\ \sin\alpha & \cos\alpha \end{bmatrix} = \cos\alpha \begin{bmatrix} 1 & -\tan\alpha \\ \tan\alpha & 1 \end{bmatrix}. \quad (55)$$

More precisely, however, the simpler matrix actually provides a rotation by the angle β=arctan α. In other words, the exact relationship between a pure rotation and the mapping produced by the simpler matrix above, involves the pure rotation by β radians. It is expressed by:

$$\begin{bmatrix} \cos\beta & -\sin\beta \\ \sin\beta & \cos\beta \end{bmatrix} = \cos\beta \begin{bmatrix} 1 & -\tan\beta \\ \tan\beta & 1 \end{bmatrix} \quad (56)$$

$$= \cos\beta \begin{bmatrix} 1 & -\alpha \\ \alpha & 1 \end{bmatrix}.$$

Clearly, when the simpler matrix (54) is used in place of the original matrix of (53), an angular rotation error is introduced, in that the rotation is by β, not α, and a magnitude scaling error is introduced in the rotated vector, where the scaling factor is $1/\cos\beta = \sqrt{1+\alpha^2}$.

In a first fine-stage "excess-threes" rotation, described below, (according to Table 3) the rotation is by the small angle α and the scaling factor that must be used to compensate for the magnitude enhancement is $1+u=1/\sqrt{1+\alpha^2}$, from which can easily be computed $\mu \approx -\alpha^2/2$. If the rotation angles used in the first subrotation are, for example, 0, 1, 2, 3, and 4 times the amount $\alpha = \pm 2^{-7}$, then the corresponding μ amounts of 0, $-2^{-15}$, $-2^{-13}$, $-(9/8)2^{-12} \approx -2^{-12}$ and $-2^{-11}$ result.

FIGS. 21-A and 21-B depict an exemplary angle rotation module 2120 using the excess-three technique, according to embodiments of the present invention. When utilizing the excess-three technique, angle rotation module 2120 receives a bit sequence $b_1b_2b_3b_4b_5b_6b_7b_8b_9$ representing an excess angle. That is, the nine-bit binary number represents the fine-stage rotation angle, $\theta_f$, in excess threes form. Accordingly, each three-bit group of the excess angle in the embodiments of FIGS. 21-A and 21-B is greater than the representation of the associated three-bit group in the radian-valued input angle by three. The desired computation to be performed in angle rotation module 2120 for each three-bit group is the computation indicated in Table 3, described above.

FIG. 21-A is configured to generate X$_2$ (X$_{datapath}$) and FIG. 21-B is configured to generate Y$_2$ (Y$_{datapath}$). Exemplary angle rotation module 2120 includes three subrotation modules 2122, a rotation circuit 2126, and a fine stage magnitude scaling module 2128.

Each subrotation module 2122 includes two 4-to-1 multiplexers 2134$_a$ and 2134$_b$. The outputs of the two 4-to-1 multiplexers 2134 are fed as input to a 2-to-1 multiplexer 2136. The output of the 2-to-1 multiplexer is the subrotation value for that subrotation stage. Each subrotation module 2122 receives a three-bit group of the nine-bit excess angle. The subrotation module must then interpret the three-bit group as three less than the binary representation of the bit group. For example, subrotation module 2122$_1$ receives three-bit group $b_1b_2b_3$, subrotation module 2122$_2$ receives three-bit group $b_4b_5b_6$, and subrotation module 2122$_3$ receives three-bit group $b_7b_8b_9$. The bits in each three-bit group are used to control the multiplexers in their associated subrotation module.

For example, in subrotation module 2122$_1$ of FIG. 21-A, multiplexers 2134$_a$ and 2134$_b$ are controlled by bits $b_2b_3$ of the three-bit group associated with subrotation module 2122$_1$. Multiplexer 2136 is controlled by bit $b_1$ of the three-bit group. Multiplexer 2134$_a$ receives input coordinate Y1 shifted by five at the 3 (1 1) input, scaled input coordinate Y1 (i.e., 3Y1) shifted by seven at the 2 (1 0) input, input coordinate Y1 shifted by a six at the 1 (0 1) input, and input coordinate Y1 shifted by the seven at the 0 (0 0) input. Multiplexer 2134$_b$ receives a zero at the 3 (1 1) input, input coordinate Y1 shifted by a seven at the 2 (1 0) input, input coordinate Y1 shifted by the six at the 1 (0 1) input, and scaled input coordinate Y1 (i.e., 3Y1) shifted by seven at the 0 (0 0) input. Multiplexer 2136 receives the inverted output of multiplexer $2134_a$ at the 1 input and the output of multiplexer $2134_b$ at the 0 input. Subrotation modules $2122_2$ and $2122_3$ operate in a similar manner as subrotation module $2122_1$.

Rotation circuit 2126 includes three adder circuits 2142. In an embodiment, adder circuits 2142 are carry-save adders (CSAs). Adder $2142_a$ is configured to rotate an input coordinate by the subrotation value generated by subrotation module $2122_1$. Adder $2142_b$ receives the output from adder $2142_a$ and the subrotation value generated by subrotation module $2122_2$. Thus, adder $2142_b$ rotates an input coordinate by the additional subrotation value generated by subrotation module $2122_2$. Similarly, adder $2142_c$ receives the output from adder $2142_b$ and the subrotation value generated by subrotation module $2122_3$. Adder $2142_c$ rotates an input coordinate by the additional subrotation value from subrotation module $2122_3$. The output of adder $2142_c$ is a coordinate (e.g., $X_2$ or $Y_2$) of the rotated complex number.

Note that in FIG. 21-B the inversion associated with the 2-to-1 multiplexer 2136 is moved from the '1' input to the '0' input. In an alternate embodiment, the inversion associated with the 2136 multiplexer could be omitted. A conditional subtraction could then be employed at the adder $2142_a$ input being fed by multiplexer 2136 output. Bit $b_1$ would be used to determine whether an add or a subtraction would occur for that adder (e.g., CSA) input.

Fine stage magnitude scaling module 2128 is configured to provide magnitude scaling for the fine-stage angle rotation. Magnitude scaling module 2128 includes two 4-to-1 multiplexers $2154_a$ and $2154_b$. The outputs of the two 4-to-1 multiplexers 2154 are fed as input to a 2-to-1 multiplexer 2156. Multiplexers $2154_a$ and $2154_b$ are controlled by bits $b_2 b_3$ of the three-bit group associated with subrotation module $2122_1$. Multiplexer 2156 is controlled by bit $b_1$ of the three-bit group.

Multiplexer $2154_a$ receives input coordinate X1 shifted by eleven at the 3 (1 1) input, input coordinate X1 shifted by twelve at the 2 (1 0) input, input coordinate X1 shifted by a thirteen at the 1 (0 1) input, and input coordinate X1 shifted by the fifteen at the 0 (0 0) input. Multiplexer $2154_b$ receives a zero at the 3 (1 1) input, input coordinate X1 shifted by fifteen at the 2 (1 0) input, input coordinate X1 shifted by thirteen at the 1 (0 1) input, and input coordinate X1 shifted by twelve at the 0 (0 0) input. Multiplexer 2156 receives the output of multiplexer $2154_a$ at the 1 input and the output of multiplexer $2154_b$ at the 0 input. The output of multiplexer 2156 is inverted and fed as an input to adder $2142_A$ of the rotation circuit 2126.

As would be appreciated by persons of skill in the art, various modifications to the circuits of FIGS. 21-A and 21-B may be possible. Additionally, as would be appreciated by persons of skill in the art, FIGS. 21-A and 21-B could be modified to utilize the excess fours technique.

3.2.3 Methods
3.2.3.1 Minority Select Angle Rotation

FIG. 22 is a flowchart 2200 of a method for rotating one or more coordinates of an input complex number using minority select, according to embodiments of the present invention. Flowchart 2200 is described below in the context of performing a fine angle rotation. As would be appreciated by persons of skill in the art, the method of FIG. 22 may be used in other applications requiring rotation of a complex number. Flowchart 2200 is described with continued reference to the embodiment of FIG. 17. However, flowchart 22 is not limited to that embodiment. Note that some of the steps in flowchart 2200 do not have to occur in the order shown.

In step 2210, one or more input coordinates and at least a portion of the fine rotation angle are received. In an embodiment, the received input coordinate(s) are the output coordinates of a coarse rotation stage.

In step 2220, an initial rotation of the input coordinate(s) by an initial rotation angle are performed. In an embodiment, the initial rotation angle is the maximum possible fine rotation. That is, the initial rotation angle includes the sum of all full angles corresponding to the final rotation stages. As would be appreciated by persons of skill in the art, other initial rotation angles could be used with the present invention.

In step 2230, the bit value in the minority in the received fine rotation angle is determined. In an embodiment, this determination is made in minority bit detector 1770. Minority bit detector 1770 also generates a minority select bit signal 1772 which indicates which bit is in the minority in the received fine rotation angle.

In step 2240, either the initially rotated input coordinate(s) or the unrotated input coordinate(s) are selected based on the value of the minority select bit signal 1772. In an embodiment, the minority select bit signal 1772 controls one or more multiplexers which then output the selected coordinate(s) for processing by the minority select stages 1792. For example, if bit '0' is in the minority, the rotated input coordinate(s) are output.

In step 2250, a determination is made for each minority select stage whether a positive (counter clockwise), negative (clockwise), or no rotation is required based on the value of the minority select bit and the bit value of the fine rotation angle corresponding to the minority select stage. In an embodiment, minority bit detector 1770 transmits a shift and zero signal 1774 to each minority select stage 1792.

For example, if the '0' bit is in the minority, for a '1' bit in the fine rotation angle, no rotation is needed because the rotation has already been performed in the initial rotation stage 1780. However, for a '0' bit in the fine rotation angle, a negative (clockwise rotation) is needed. If the '1' bit is in the minority, for a '1' bit in the fine rotation angle, a positive rotation (counter clockwise) is needed. For a '0' bit in the fine rotation angle, no rotation is required.

In step 2260, the minority select stages 1792 perform the necessary rotations to produce at least one rotated input coordinate.

FIG. 23 is a flowchart 2300 of an alternate method for rotating one or more coordinates of an input complex number using minority select, according to embodiments of the present invention. Flowchart 2300 is described below in the context of performing a fine angle rotation. As would be appreciated by persons of skill in the art, the method of FIG. 23 may be used in other applications requiring rotation of a complex number. Flowchart 2300 is described with continued reference to the embodiment of FIG. 19. However, flowchart 23 is not limited to that embodiment. Note that some of the steps in flowchart 2300 do not have to occur in the order shown.

In step 2310, one or more input coordinates and at least a portion of the fine rotation angle are received. Additionally, final rotation stage 1994 receives the offset angle 1976. In an embodiment, the received input coordinate(s) are the output coordinates of a coarse rotation stage.

In step 2320, the bit value in the minority in the received fine rotation angle is determined. In an embodiment, this determination is made in minority bit detector 1970. Minority bit detector 1970 also generates a minority select bit signal 1972 which indicates which bit is in the minority in the received fine rotation angle.

In step 2330, a determination is made for each minority select stage whether a positive (counter clockwise), negative (clockwise), or no rotation is required based on the value of the minority select bit and on the bit value of the fine rotation angle corresponding to the minority select stage. In an embodiment, minority bit detector 1970 transmits a shift and zero signal 1974 to each minority select stage 1992$_{A-N}$.

In step 2340, the minority select stages 1992$_{A-N}$ perform the necessary rotations to produce at least one temporary rotated input coordinate.

In step 2350, a determination is made whether '0' is the minority bit. If '0' is the minority bit, operation proceeds to step 2360. If '1' is the minority bit, operation proceeds to step 2370.

In step 2360, final rotation stage 1994 performs a final rotation by the offset angle to produce at least one rotated output coordinate.

In step 2370, no final rotation is performed. In this situation, the output from minority select stages 1992$_{A-N}$ is the rotated output of the fine stage.

3.2.3.2 Non-Minority Select Angle Rotation

FIG. 24 is a flowchart 2400 of a method for rotating one or more coordinates of an input complex number, according to an embodiment of the present invention. Flowchart 2400 is described below in the context of performing fine angle rotation. As would be appreciated by persons of skill in the art, the method of FIG. 24 may be used in other applications requiring rotation of a complex number. Flowchart 2400 is described with continued reference to the embodiments of FIGS. 21-A, 21-B, 34, and 35. However, flowchart 2400 is not limited to those embodiments. Note that some of the steps in flowchart 2400 do not have to occur in the order shown and some steps of flowchart 2400 may be performed substantially in parallel.

In step 2410, the fine-stage selects one of the input coordinates as the first term. In an embodiment, the selection is based on data retrieved from memory (not shown). Step 2410 is optional. Step 2410 is typically present in embodiments requiring only a single rotated output coordinate such as the embodiments of FIGS. 34 and 35, described below.

In step 2415, a fine-stage subrotation module receives at least one coordinate of the input complex number. In fine-stage rotation, the input complex number is the intermediate complex number generated by the coarse stage.

In step 2420, the fine-stage subrotation module receives at least one coordinate of the scaled input complex number. As described above, the scaled input complex number is scaled by an integer, m. In an embodiment, the input complex number (e.g., intermediate complex number from coarse stage) is scaled by three.

In step 2425, the fine-stage subrotation module receives an n-bit group from the bit sequence representing an excess fine rotation angle. The excess fine rotation angle is greater than the representation of the input angle by a predetermined number. For example, in an excess three embodiment, each n-bit group is three greater than the value of the corresponding n-bit group of the input fine rotation angle. In an excess four embodiment, each n-bit group is four greater than the value of the corresponding n-bit group of the input fine rotation angle.

In step 2430, a plurality of shifted input signals based on the input coordinate are generated. For example, in the first subrotation module 2122$_1$ of FIG. 21-A, the input coordinate is shifted by five, six, and seven.

In step 2435, at least one shifted input signal based on the scaled input coordinate is generated. For example, in the first subrotation module 2122$_1$ of FIG. 21-A, the scaled input coordinate is shifted by seven. In a further example, in the first subrotation module 3522$_1$ of FIG. 35, the scaled input coordinate is shifted by six.

In step 2440, the subrotation module interprets the bit-group from the excess fine rotation angle. For example, in an excess three embodiment, the subrotation module interprets the bit-group as three smaller than its binary representation. In an excess four embodiment, the subrotation module interprets the bit-group as four smaller than its binary representation.

In step 2445, the subrotation module uses the interpreted excess angle bit-group to produce a subrotation value for the subrotation module. For example, the bits in the bit-group are used to control one or more multiplexers in the subrotation module. As illustrated in subrotation module 2122 of FIG. 21, the 4-to-1 multiplexers are controlled by 2 bits from the 3-bit excess angle bit-group and the 2-to-1 multiplexer is controlled by the third bit from the 3-bit excess angle bit group.

Steps 2415-2445 are performed for each subrotation module in the fine stage. The performance does not necessarily occur sequentially. For example, a subrotation module may be performing one of the steps 2415-2445 while another subrotation module is performing another of the steps (or the same step of) 2415-2445. That is, multiple subrotation modules may be performing some of the steps 2415-2445 in parallel.

Accordingly, in step 2450, a determination is made whether the subrotation module has completed steps 2415-2445. When at least one subrotation module has completed steps 2415-2445, operation proceeds to step 2455.

In step 2455, a fine-stage magnitude scaling factor is generated for one or more of the subrotation modules. Step 2455 is described in further detail in FIG. 25 described below. Note that step 2455 may occur at the same time one or more subrotation modules are performing steps 2415-2445.

In step 2460, at least one input coordinate is scaled by the fine-stage magnitude scaling factor generated in step 2455 and rotated by the subrotation values generated by each subrotation module. Note that step 2460 may begin after the first subrotation module has completed steps 2415-2445 but prior to completion of those steps by the remaining subrotation modules. For example, in the rotation circuit 2126 of FIG. 21, the first subrotation value is added to the input coordinate to rotate the input coordinate by a first sub-angle. The second subrotation value is added to the sub-rotated input coordinate to add additional rotation to the input coordinate. The process is repeated for the subrotation value generated by each subrotation module.

FIG. 25 is a flowchart 2500 of a method for performing fine-stage magnitude scaling, according to an embodiment of the present invention. As would be appreciated by persons of skill in the art, the method of FIG. 25 may be used in other applications requiring rotation of a complex number. Flowchart 2500 is described with continued reference to the embodiments of FIGS. 21-A, 21-B, 34, and 35. However, flowchart 2500 is not limited to those embodiments. Note that some of the steps in flowchart 2500 do not have to occur in the order shown.

In step 2510, a plurality of shifted signals based on an input coordinate are generated. For example, in the $Y_{datapath}$ processing circuit depicted in FIG. 21-B, the $Y_1$ coordinate is shifted by eleven, twelve, thirteen, and fifteen.

In step 2520, a sequence of control bits are received from ROM 202. In an embodiment, a first set of the control bits controls a set of input multiplexers and a second set of the control bits controls a final selection multiplexer.

In step 2530, the magnitude scaling value is generated as the output of the final selection multiplexer. That is, the magnitude scaling circuit outputs 0 or one of the shifted input coordinate values.

The magnitude scaling value is then either added to the input coordinate datapath, as illustrated in FIG. 34. Note that as shown in FIG. 34 both the input coordinate and the magnitude scaling value may be negated based on the value of a control signal. Alternatively, the magnitude scaling value may be inverted (negated) and combined with the input coordinate datapath as illustrated in FIGS. 21-A, B.

3.3 Magnitude Scaling

As described in detail above, coarse stage 204 introduces magnitude-scaling errors which require compensation. In the coarse stage, the angle rotations discussed previously are performed by matrices of the form:

$$\begin{bmatrix} C & -S \\ S & C \end{bmatrix} \quad (57)$$

where the S and C values are always such that $S^2+C^2 \leq 1$. Therefore, a by-product of the coarse-stage rotations is the scaling down of the magnitude of the output vector. Thus, the coarse-stage magnitude scaling correction that must be applied is a scaling up of the output magnitude.

If the fine-stage rotation angle $\theta_f$ is sufficiently small that the term $\theta_f^2/2$ can be ignored in the magnitude scaling factor, then the magnitude scaling factor becomes just the four-bit $\delta$ value (i.e., $\delta_{[\cos\theta_f]}$, in FIG. 1) whose bits can be retrieved from a ROM, indexed by an appropriate representation of the coarse-stage rotation angle. This can lead to important simplifications in the implementation of the scaling operation.

FIG. 26 illustrates a portion of an exemplary magnitude scaling module 2610 incorporating the simplifications described above, according to embodiments of the present invention. FIG. 26 depicts circuitry for scaling the X-component of the fine-stage data. As would be appreciated by persons of skill in the art, a similar circuit for scaling the Y-component of the fine-stage data would be included in a magnitude scaling module.

Magnitude scaling module 2610 includes two 4-to-1 multiplexers 2616, 2618 and two adders 2612, 2614 (e.g., CSAs). Multiplexer 2616 receives scaled input coordinate X1×3 (i.e., 3X1) shifted by ten at the 3 (1 1) input, input coordinate X1 shifted by nine at the 2 (1 0) input, input coordinate X1 shifted by ten at the 1 (0 1) input, and a zero at the 0 (0 0) input. Multiplexer 2618 receives scaled input coordinate X1×3 (i.e., 3X1) shifted by twelve at the 3 (1 1) input, input coordinate X1 shifted by eleven at the 2 (1 0) input, input coordinate X1 shifted by twelve at the 1 (0 1) input, and a zero at the 0 (0 0) input.

ROM 202 stores two correction values, $\delta$, for each of the 16 sectors. FIG. 26 illustrates an exemplary ROM table 2680 storing the correction values. ROM table 2680 includes a set of correction values 2684 associated with Case 1 described above and a set of correction values 2686 associated with Case 2. ROM table 2680 is addressed with a 4-bit value indicating the sector associated with the input coordinate and a 1-bit value indicating which of the 2 cases applies. As would be appreciated by persons of skill in the art, ROM table 2680 can be organized in other ways. Magnitude scaling module 2610 receives a 4-bit entry associated with the sector and Case for the input angle.

As mentioned above, $\delta$ values are stored in a ROM and retrieved during operation. These $\delta$ values are shown in FIG. 26 for the example of a mixer having a 16-bit frequency control word and input data having $X_{in}$ and $Y_{in}$ words with 12 bits, i.e., 11 fractional bits and a sign bit. FIG. 26 also shows a method for implementing the coarse-stage magnitude-scaling compensation. As discussed above, it requires two CSA for each of the X and Y datapath words, and these two CSA can be inserted into the datapaths immediately following the fine-stage CSAs.

The high-order pair of bits $\delta_4\delta_3$ of the received correction value control 4-to-1 multiplexer 2616 and the low-order pair of bits $\delta_2\delta_1$ of the received correction value control 4-to-1 multiplexer 2618. The multiplexers each provide the $X_1$ data value, or the scaled $X_1$ data value shifted, as appropriate, so that it can be added to the X datapath value.

Adder 2612 receives the X input coordinate and the output of multiplexer 2616 as inputs. Adder 2614 receives the output of adder 2612 and the output of multiplexer 2618 as inputs. The output of adder 2614 is the magnitude-scaled X input coordinate. In an embodiment, adders 2612 and 2614 are CSAs.

In an embodiment, an assumption is made that the fine-stage is employing the "excess-threes offset" technique, discussed above, where the coarse-stage output ($X_1$) has been determined, as has three times that value ($3X_1$). Alternatively, other fine-stage computation schemes and architectures, such as the minority-select method, could be employed as well. The excess-threes technique, however, has an additional advantage, regarding the FIG. 26 circuit. Since it also uses the $3X_1$ data for the purpose of computing the fine-stage rotations, new computational requirements are not introduced for the generation of the scaling circuit's $3X_1$ data value. The "excess-fours offset" technique, described above, has the same advantage.)

Notice that the scaling value being added into the X-component datapath is not necessarily a scaled version of that same X-component (which could also be employed), but rather, a scaled version of X1, the coarse-stage output. In this example, simulations have shown that adequate accuracy in the system output is retained when using the $X_1$ value. The implementation shown in FIG. 26 is employed in a carry-save data path, hence the scaling additions employ carry-save adders.

It is evident that the coarse-stage output $X_1$ data and $3X_1$ data being employed in FIG. 26 have experienced a ripple carry operation, which simplifies the CSA additions used in the scaling circuits (as well as in fine-stage angle rotation circuits such as those for the excess-threes and excess-fours angle rotation). The circuits described previously, at the end of the discussions on the coarse stage, above, could also be useful in producing the required $X_1$ and $3X_1$ data.

FIG. 27 is a flowchart 2700 of a method for performing coarse-stage magnitude scaling, according to an embodiment of the present invention. As would be appreciated by persons of skill in the art, the method of FIG. 27 may be used in other applications requiring rotation of a complex number. Flowchart 2700 is described with continued reference to the embodiments of FIGS. 26 and 28. However, flowchart 2700 is not limited to those embodiments. Note that some of the steps in flowchart 2700 do not have to occur in the order shown.

As described above, magnitude scaling to compensate for error introduced by the coarse stage may be performed prior to the fine angle stage or after the fine angle stage. For ease of description, flowchart 2700 generally refers to input coordinates. As would be appreciated by person skill in the art, the input coordinates may be the coarse rotated coordinates output by the coarse stage if magnitude scaling occurs at the input to the fine stage or alternatively, the input coordinates may be the final rotated coordinates output by the fine stage if magnitude scaling occurs at the output to the fine stage.

In step 2710, magnitude scaling module 2610 (2810) receives one or more input coordinates and one or more scaled input coordinates. In an embodiment, the scaled input coordinates are three-times the input coordinate (e.g., $3X_1$).

In step 2720, a plurality of shifted signals based on an input coordinate(s) and the scaled input coordinate(s) are generated. For example, in the $X_{datapath}$ processing circuit depicted in FIG. 26, the $X_1$ input coordinate is shifted by nine, ten, eleven, and twelve and the scaled $X_1$ input coordinate is shifted by ten and twelve.

In step 2730, an n-bit correction value is received from ROM 202. In an embodiment, the n-bit correction value has 4-bits. In the exemplary scaling circuit of FIG. 26, a first set of the correction bits controls a first 4-to-1 multiplexer and a second set of the correction bits controls a second 4-to-1 multiplexer.

In step 2740, the magnitude scaling value is combined with the input coordinate(s). For example, as illustrated in FIG. 26, a high-order correction is combined with the X input coordinate by adder 2612 and a low-order correction value is combined with the output of adder 2614 to produce the scaled coordinate.

3.4 Example Implementation of Fine Stage

As illustrated in FIGS. 21-A, B and FIG. 26 discussed above, the entire fine-stage processing system involves a chain of five MUX-controlled CSAs on each of the X and Y datapaths. Thus, it is possible to reduce the overall fine-stage CSA delay to just the delay of four CSA, even though the equivalent of five CSA additions are still necessary. FIG. 28 depicts an exemplary fine stage 2806 incorporating this architectural efficiency, according to embodiments of the present invention.

As shown in FIG. 28, in a manner similar to that employed in the coarse stage, fine stage processing can start with two distinct paths, operating simultaneously. Fine stage 2806 accordingly includes a first X path 2840 and a second Y path 2860.

X path 2840 includes three subrotation modules 2822-X, a rotation circuit 2826-X, a fine stage magnitude scaling module 2828-X, and a magnitude scaling module 2810-X. Subrotation modules 2822-X and fine stage magnitude scaling module 2828-X were described above in reference to FIG. 21-A. Magnitude scaling module 2810-X was described above in reference to FIG. 26.

Rotation circuit 2826-X includes multiple adders (e.g., CSAs). A first CSA 2841-X combines the three inputs from fine-stage rotation multiplexers with outputs controlled by bits $b_1$, $b_4$ and $b_7$, on the left side of FIG. 28. Simultaneously, a second CSA 2843-X combines three other inputs, say the three magnitude-scaling subsystems (with output multiplexers controlled by $b_1$, $\delta_4\delta_3$ and $\delta_2\delta_1$). The outputs of these two simultaneous CSA operations are then combined with each other using a cascade of two CSAs or a 4-to-2 converter 2845-X. Finally, the output of this processing, which is represented in carry-save form, is added to $X_{datapath}=X_1$, using a fifth CSA 2847-X.

Similarly, Y path 2860 includes three subrotation modules 2822-Y, a rotation circuit 2826-Y, a fine stage magnitude scaling module 2828-Y, and a magnitude scaling module 2810-Y. Subrotation modules 2822-Y and fine stage magnitude scaling module 2828-Y were described above in reference to FIG. 21-B. Magnitude scaling module 2810-Y was described above in reference to FIG. 26.

Rotation circuit 2826-Y includes multiple adders (e.g., CSAs). A first CSA 2841-Y combines the three inputs from fine-stage rotation multiplexers with outputs controlled by bits $b_1$, $b_4$ and $b_7$, on the right side of FIG. 28. Simultaneously, a second CSA 2843-Y combines three other inputs, say the three magnitude-scaling subsystems (with output multiplexers controlled by $b_1$, $\delta_4\delta_3$ and $\delta_2\delta_1$). The outputs of these two simultaneous CSA operations are then combined with each other using a cascade of two CSAs or a 4-to-2 converter 2845-Y. Finally, the output of this processing, which is represented in carry-save form, is added to $Y_{datapath}=Y1$, using a fifth CSA 2847-Y.

Thus, the fine-stage output is completed by using five CSA on the X datapath and, simultaneously, five CSA on the Y datapath. Both X and Y datapath legs experience simultaneous delays of just four CSA. In this manner, the overall fine-stage processing happens to take approximately the same amount of time as the coarse-stage processing. Of course, for other examples, or for other choices of implementation methods for either the coarse or fine stages, the speeds could differ from each other.

3.5 Pipelining

It will be understood by those of ordinary skill in the art that, in order to meet circuit data-rate requirements, it may be necessary to subdivide the coarse and/or fine rotation stages into substages that can operate simultaneously, in a "pipeline" manner. This can be done by, for example, inserting registers into the datapath at appropriate locations, such that the amount of computation required by the circuitry between registers is small enough. Clearly, an inspection of FIGS. 5, 6A, and 28 shows that convenient locations for substage boundaries in the fine stage would include points at the output of the various CSA adders. It will also be understood by those of ordinary skill in the art that, for the purpose of optimizing pipelining delays, it may be appropriate to rearrange the orders in which the CSA are performed. For example, it may be desirable to employ a cascade of stages such as those of FIGS. 21-A, B in the fine stage, for example, in cascade with those of FIG. 26. Similar rearrangements in the coarse stage may also be desirable

4. Direct Digital Frequency Synthesizer

FIG. 29 depicts a conventional quadrature modulator 2900. Quadrature modulator 2900 includes an adder 2912, a phase accumulator 2914, a direct digital frequency synthesizer (DDFS) 2950, two multipliers 2962, 2964 and an adder 2970. In embodiments, adder 2912 is an unsigned overflowing adder that is repeatedly incremented by the M-bit frequency control word (FCW) 2902. The output of the adder, $\hat{\phi}$, is stored in the phase accumulator 2914. The phase accumulator 2914 in embodiments is an M-bit register. The sequence of phase values that results from the repeated incrementing of the FCW is a sequence of unsigned numbers lying within the interval [0, 1), specifying a sequence of points on the unit circle, each point corresponding to a radian-valued angle that lies within the interval [0, 2π) where "[" is used to indicate inclusion of the end point in the interval and ")" is used to indicated exclusion of the end point from the interval.

Quadrature modulator 2900 may also include a module (not shown) to truncate the M-bit output of the phase accumulator to W bits (e.g., 16 bits). The truncation module may be a stand-alone module or may be included in the phase accumulator 2914. The output of the truncation module is the sequence of bits $\hat{\phi}_1\hat{\phi}_2 \ldots \hat{\phi}_{16}$.

Direct digital frequency synthesizer (DDFS) 2950 can be considered a special case of a digital mixer. While the mixer rotates an arbitrary point in the plane by an angle specified by the normalized rotation angle $\bar{\theta}$, the DDFS always rotates a fixed point, which we can consider to be the point (1, 0). In the event that a ROM is being employed to handle the initial DDFS angle rotations, and assuming the remaining rotations are all rotations by a sufficiently small angle that Madisetti's "lookahead" implementation can be employed, the system can be built as shown in FIG. 29.

DDFS 2950 provides two outputs—sin $2\pi\hat{\phi}$ and cos $2\pi\hat{\phi}$. Multiplier 2962 receives as input $X_0$ and cos $2\pi\hat{\phi}$. Multiplier 2964 receives as input $Y_0$ and sin $2\pi\hat{\phi}$. The outputs of multiplier 2962 and multiplier 2964 are combined by adder 2970 to produce $X_{out}$.

FIG. 30 is a block diagram of a quadrature modulator 3000, according to embodiments of the present invention. Quadrature modulator 3000 utilizes an enhanced two-stage mixer architecture. Quadrature modulator 3000 includes coarse stage 3004, fine stage 3006, and a coarse-stage scaling circuit 3008.

Conventional two-stage mixer architectures, such as described in Fu I, have previously been used for two-output mixers, in which the point in the plane $(X_0, Y_0)$ is rotated counterclockwise about the origin, through a specified angle $\theta$, first rotating by a coarse-stage approximation of the rotation angle and then rotating again using a fine-stage angle. Normally, this produces a point in the plane whose coordinates $(X_{out}, Y_{out})$ are both required, as they represent the result of multiplying the complex number $(X_0+jY_0)$ by the complex number $e^{j\theta}$. In modulator 3000, the computation of the two coarse-stage outputs is retained, but a factor, cos $\theta_M$, is factored out of the coarse-rotation matrix, which simplifies coarse-stage computations. One row of the fine-rotation matrix is retained and the cosine factor is used as a scaling multiplier for the (single) fine-stage output. This simplification, of course, saves hardware and lowers power consumption.

The removal of the cosine factor from the coarse stage causes the sine multiplication coefficients to become tangents, along with causing the cosine multiplication coefficients to become unity. Thus:

$$\begin{bmatrix} X_2 \\ Y_2 \end{bmatrix} = \begin{bmatrix} \cos\theta & -\sin\theta \\ \sin\theta & \cos\theta \end{bmatrix}\begin{bmatrix} X_0 \\ Y_0 \end{bmatrix} \quad (58)$$
$$= \begin{bmatrix} \cos\theta_L & -\sin\theta_L \\ \sin\theta_L & \cos\theta_L \end{bmatrix}\begin{bmatrix} \cos\theta_M & -\sin\theta_M \\ \sin\theta_M & \cos\theta_M \end{bmatrix}\begin{bmatrix} X_0 \\ Y_0 \end{bmatrix}$$
$$= \cos\theta_M \begin{bmatrix} \cos\theta_L & -\sin\theta_L \\ \sin\theta_L & \cos\theta_L \end{bmatrix}\begin{bmatrix} 1 & -\tan\theta_M \\ \tan\theta_M & 1 \end{bmatrix}\begin{bmatrix} X_0 \\ Y_0 \end{bmatrix}$$

In (58) the coarse-rotation angle is $\theta_M$ and the fine rotation angle is $\theta_L$.

The phase accumulator (not shown in FIG. 30) produces a normalized phase angle $\hat{\phi}$ (e.g., 32-bits) that is truncated (e.g., to 16-bits). As described above, the three most significant bits (MSBs) $O_1O_2O_3$ of the normalized angle (eight possible combinations '000', '001', '010', '011', '100', '101', '110', and '111') indicate the placement of the normalized angle in an octant. The next four bits $C_4C_5C_6C_7$ specify which of the 16 sectors, into which the octant is partitioned, contains the normalized angle. The nine least significant bits of the normalized angle ($\phi_L = F_8 \ldots F_{16}$) become the radian-valued fine angle $\theta_L$, when multiplied by $\pi/4$ (as described below).

The phase accumulator provides a set of bits from the truncated angle to conditional angle negation module 3030. As is known to persons skilled in DDFS technology, it suffices to deal in detail with angles lying within the first octant (Octant 0) only. For example, rather than storing data for all needed values of $\hat{\phi}$ within $[0, 1)$, it suffices to have a ROM that contains only data for $0 \leq \hat{\phi} \leq \frac{1}{4}$ (first quadrant represented by Octants 0 and 1). Values of the sine function for angles in the other three quadrants can easily be determined from values of the sine within the first quadrant—just a conditional two's complement negation of $\hat{\phi}$ (applied only in the second and fourth quadrants) and a conditional negation of the sin $2\pi\hat{\phi}$ output value (applied only in the third and fourth quadrants) can extend the definition of sin $2\pi\hat{\phi}$ to the complete interval $0 \leq \hat{\phi} \leq 1$.

Conditional angle negation module 3030 receives bit $\hat{\phi}_3$ of the truncated angle as a first input and bits $\hat{\phi}_4\hat{\phi}_5\hat{\phi}_6 \ldots \hat{\phi}_{16}$ as a second input. The conditional angle negation module 3030 outputs 13 bits, $\hat{\phi}_4\hat{\phi}_5\hat{\phi}_6\hat{\phi}_7\hat{\phi}_8\hat{\phi}_9 \ldots \hat{\phi}_{16}$. After being processed by the conditional negation block, angles $\hat{\phi}$ are represented as $\phi$ (i.e., without the "hat"). Conditional angle negation module provides bits $\phi_4\phi_5\phi_6\phi_7\phi_8$ to coarse stage ROM 3040 and bits $\phi_1\phi_2\phi_3$ and $\phi_8\phi_9\phi_{10}\phi_{11} \ldots \phi_{16}$ to fine stage ROM 3060.

As mentioned above, Octant 0 is partitioned into 16 sectors. The standard method of partitioning wherein the bit pattern of the four sector-bits $C_4C_5C_6C_7$ of the normalized angle $\phi$ specify the lower angular boundary on each sector is not optimal in transferring state-of-the-art DDFS architectures to the combined DDFS/modulator embodiment of FIG. 30. Having split $\theta$ into the conventional coarse and fine subangles $\theta = \theta_M + \theta_L$, as are used in (58), it becomes desirable to change $\theta_M$ into an angle for which the binary representations of cos $\theta_M$ and tan $\theta_M$ are exact and "simple." For this purpose, angles $\theta_m$ and $\theta_l$ are employed, such that $\theta_m + \theta_l = \theta_M + \theta_L$ and such that cos $\theta_m$ and tan $\theta_m$ have simple (while exact) representations.

Multiple $\theta_m$ angles are created, one within each of the 16 sectors into which Octant 0 (i.e., $0 \leq \theta < \pi/4$) has been partitioned. FIG. 11 (discussed in detail above) illustrates 16 slightly curved thin boxes, one for each sector, that all lie just within the unit circle while traversing the interval $0 \leq \theta < \pi/4$. FIG. 11 also shows rows of X's for which each X represents a "simple" (8-bit) binary fraction. As described above, the vertical coordinate for the position of each X-row can be represented by a 5-bit binary fraction. Each box therefore must contain at least one X. If the coordinates of such a point are cos $\theta_m$ and sin $\theta_m$, a point is found near any point within the corresponding sector for which $\theta_m + \theta_l = \theta_M + \theta_L$ (where $\theta_l = \theta_M + \theta_L - \theta_m$) and where cos $\theta_m$ and sin $\theta_m$ can be implemented cheaply. Such simple cos $\theta_m$ and sin $\theta_m$ would be used directly in a two-output mixer. For the one-output mixer embodiment of FIG. 30, a similar procedure is followed to obtain simple cos $\theta_m$ and tan $\theta_m$ values for each sector, since tan $\theta_m$ appears in (58), not sin $\theta_m$.

In doing the above manipulations, two such sets of boxes are required, one for $\theta$ in which large normalized fine-stage angles $\phi_L$ are present and one for small $\phi_L$ angles. In embodiments, the computations that employ cos $\theta_m$ are implemented by use of signed-powers-of-two (SPT) representations of cos $\theta_m$. This results in a minimal number of add/subtract operations when multiplying a data word by cos $\theta_m$. As described herein, such multiplications are performed using hard-wired shifts of the data words into multiplexers that are followed by carry-save adders. This "cheap implementation" yields low power dissipation. Unlike previous implementations, rather than storing coarse-angle cosine and sine values in ROM tables, suitable bits for controlling multiplexers and for indicating add/subtract choices for each of the various, e.g., cos $\theta_m$, multiplications are stored in the ROM tables.

ROM 3040 is configured to store the control bits and the add/subtract indications (referred to herein generally as "control bits" for ease of discussion) for the coarse stage 3004 and coarse stage scaling module 3008. In an embodiment, ROM 3040 includes two ROMs 3042 and 3044. ROM 3042 stores the control bits for large angles and ROM 3044 stores the control bits for small angles. In an alternate embodiment, the control bits for large angles and small angles are stored in a single ROM. Because the total number of bits stored in ROM 3040 is very small, in embodiments, ROM 3040 (or ROMs 3042 and 3044) could be implemented in combinatorial logic.

FIG. 31A illustrates exemplary data for large angles that may be stored in ROM 3042 and FIG. 31B illustrates exemplary data for small angles that may be stored in ROM 3044. As shown in FIGS. 31A and 31B, the data includes control bits 3104 for the coarse stage and control bits 3108 for the coarse stage scaling module. A set of control bits is provided for each of the 16 sectors of Octant 0.

The various contents of ROM 3042 and 3044 have been determined in such a way as to maximize the bit pattern similarities when using SPT representations. FIGS. 32A-2 and 32A-3 and FIG. 32B depict spreadsheets used to determine the necessary control bits to store in ROMs 3042 and 3044 for coarse stage 3004 and coarse stage scaling module 3008. The content of spreadsheets 3204 and 3208 will be described in further detail below.

The coarse stage ROM 3040 selects from either the large angle control bits (e.g., from ROM 3042) or the small angle control bits (e.g., from ROM 3044) depending on bit $\phi_8$ (i.e., the appropriate ROM for small or large fine-stage angles). After determining whether to access the large angle data (ROM 3042) or the small angle data (ROM 3044), ROM 3040 selects one of the 16 coarse-sector ROM values using four address bits $\phi_4\phi_5\phi_6\phi_7$ (i.e., $C_4C_5C_6C_7$). The coarse stage ROM outputs the set of coarse stage control bits associated with the sector to coarse stage 3004 and the set of coarse stage scaling control bits associated with the sector to coarse stage scaling module 3008.

Coarse stage 3004 receives $X_0$, $Y_0$ coordinates of a complex number as input. Coarse stage 3004 also receives the set of coarse stage control bits from ROM 3040. Coarse stage 3004 is described in further detail in Section 5.1 below.

Modulator 3000 also includes a multiplier 3050. Multiplier 3050 receives as inputs a set of bits (e.g., $\phi_8\phi_9 \ldots \phi_{16}$) from conditional negation block 3030. Multiplier 3050 converts the angle into a radian-valued angle by multiplying it by an approximation of $\pi/4$. The output of multiplier 3050 is nine bits (e.g., $\theta_8 \ldots \theta_{16}$) of the radian-valued angle, $\theta$. The $\pi/4$ value reflects the $2\pi/8$ value that would be applied to a normalized "Octant-0 angle" where normalized values within the interval [0,1) correspond to radian-valued angles within the Octant-0 interval [0, $\pi/4$).

While a routine specialization of a mixer architecture discussed herein would employ a $\pi/4$ multiplier (as appears in the fine-angle signal fed to the mixer's fine stage in FIG. 1), it is possible to avoid the necessity of computing a radian-valued fine-rotation angle. Instead, the fine rotation can make direct use of the normalized rotation angle, thereby avoiding the "cost" of a $\pi/4$ multiplication.

The difference between the normalized rotation angle and the unnormalized rotation angle is simply the factor $\pi/4$. Consider the normalized angle $\bar{\theta}$ to be $4/\pi$ times the radian-valued angle $\theta$. Then, it is evident that the normalized fine-stage angle $\bar{\theta}$ can be used in the same way the radian-valued angle $\theta$ would have been used in an "excess threes," "excess fours," or minority select fine stage, with a compensating $\pi/4$ factor absorbed into the ROM values that are added to the $X_1$ or $Y_1$ values (which are also retrieved from a ROM) in order to perform the fine stage rotation. That is, since such $Y_1$, $3Y_1$, etc., values are computed in advance and stored in, and subsequently retrieved from, a ROM, when implementing a DDFS, it is not a major change in the system to store whatever values would have ordinarily been employed, scaled by $\pi/4$ before storing them in the ROM. Clearly, each product $\bar{\theta} \times (\pi/4) \times$ ROM_value will yield equivalent rotation results no matter whether the $\pi/4$ factor is associated with the normalized angle $\bar{\theta}$ or with the ROM_value.

The minority-select DDFS fine stage already has its ROM storage doubled in order to provide two ROM-rotation options. The present "$\pi/4$-elimination" technique will, effectively, re-double this amount of ROM storage. That is, assuming the use of a minority select architecture (as described in U.S. Patent Publication No. 2006/0167962), two ROMs of the type shown in FIG. 29 would be sufficient for the minority-select processing. The total storage requirements, therefore, would be 2×(16×4 words)=128 words total, assuming 16 "coarse rotation" sectors and no special processing for angles that are integer multiples of $\pi/4$. If such special processing were employed then, depending on how these special angles were handled, as few as one additional ROM word representing $\sin(\pi/4)=\cos(\pi/4)$ could suffice, or as many as 2×(1×4 words)=8 additional words might be necessary.

For the use of the "excess threes" or "excess fours" fine-stage architecture, just one ROM is needed, but it requires the storage of $3\pi/4X_1$ and $3\pi/4Y_1$ values, in addition to the fine stage ROM values shown in FIG. 35. Assuming 16 choices for each value, this amounts to a total requirement of 16×6 words=96 words, with a possible need for 1 to 6 additional words, depending on how the special integer multiple of $\pi/4$ angle rotations were handled, as would be understood by one of ordinary skill in the art.

Fine stage ROM 3060 includes a ROM configured to store a set of control bits for fine stage processing. ROM 3060 may further include a ROM configured to store a first term (X1) and a negate output. This ROM is addressed by the first three bits of the normalized angle $O_1O_2O_3$.

Fine stage 3006 receives the outputs of coarse stage 3004 and a bit sequence $b_1b_2b_3b_4b_5b_6b_7b_8b_9$ representing a fine rotation angle in the same manner as in the case of the 4-multiplexer angle rotator. Fine stage 3006 also receives a set of control bits from fine stage ROM 3060. Fine stage 3006 may use the minority select system or the "excess threes" or "excess fours" system discussed herein. Fine stage 3006 is described in further detail in Section 5.2 below.

Coarse-stage scaling circuit 3008 receives the output ($X_2$) and optionally a scaled output (e.g., $7X_2$) from fine stage 3006. Coarse-stage scaling circuit 3008 also receives a set of control bits from ROM 3040. Coarse-stage scaling circuit 3008 is described in further detail in Section 5.3 below.

The reduction in the overall power dissipation in the circuit for this special two-multiplier mixer case can be expected to approximate half that of the general improved four-multiplier-type angle-rotator circuit that constitutes the major topic of the previous discussion. The coarse-stage circuit can have a complexity less than that of a single Booth multiplier. Moreover, the fine-stage circuit—consisting of just half of the more general fine-stage circuit, along with the $\cos\theta_M$ scaling—will have a lower complexity than that of the more general (two output) fine-stage circuit, hence a lower complexity than that of a normal two-output direct digital frequency synthesizer (DDFS) circuit, which would traditionally be employed to generate the $\sin\theta$ and $\cos\theta$ values appearing in the conventional implementation of the FIG. 30 circuit.

5.1 Coarse Stage

FIG. 33 depicts a block diagram of an exemplary coarse stage 3304, according to embodiments of the present invention. The selected $\tan\theta_m$ values from the ROM 3040 are employed in the coarse-stage rotation circuit that exploits its specific details by the use of sub-expression sharing along with hardwired shift and add/subtract circuits to efficiently compute ($X_{coarse}$, $Y_{coarse}$) with a minimal amount of hardware, as shown in FIG. 33. A cascade of two CSAs followed by a CRA suffices to evaluate $X_{coarse}$, and another two CSAs and a CRA yield $Y_{coarse}$. Coarse stage control bits from ROM produce the product of $\tan\theta_m$ times the $X_0$ or $Y_0$ input value. These bits operate multiplexers and select among the various partially shifted terms of $X_0(p_1, p_2, p_3, \text{ and } p_4)$ and $Y_0(q_1, q_2, q_3, \text{ and } q_4)$ to add/subtract them together.

Coarse stage 3304 includes a $Y_{datapath}$ processing section 3310 and an $X_{datapath}$ processing section 3350. $Y_{datapath}$ processing section 3310 includes a shifting module 3312. Shifting module 3312 shifts the $X_0$ coordinate of the input complex number and provides the shifted data signals to a series of multiplexers $3314_a$, $3314_b$, and 3314. Multiplexer $3314_a$ is controlled by the $\delta_2\delta_1$ control bits received from ROM 3040. Multiplexer $3314_a$ outputs term $p_3$. Multiplexer $3314_b$ is controlled by the $\delta_4\delta_3$ control bits received from ROM 3040. The output of multiplexer $3314_b$ is provided to AND gate 3316. AND gate 3316 also receives control bit $z_1$ from ROM 3040. The output of AND gate 3316 is term $p_1$. Multiplexer 3314, is controlled by the $\delta_6\delta_5$ control bits received from ROM 3040. Multiplexer 3314, outputs term $p_2$.

Adder 3318 receives term $p_3$ from multiplexer $3314_a$, term $p_2$ from multiplexer 3314, and term $p_1$ from AND gate 3316. Term $p_3$ is always added. However, adder 3318 performs a conditional negation or inversion of term $p_2$ based on the value of control bit $s_2$ and a conditional negation or inversion of term $p_1$ based on the value of control bit $s_1$.

Multiplexer 3320 receives the $Y_0$ coordinate of the input complex number and a shifted $Y_0$ coordinate. Multiplexer 3320 is controlled by the $\delta_7$ control bit received from ROM 3040. Adder 3322 receives term $p_4$ from multiplexer 3320 and the output from adder 3318. Term $p_4$ is always added.

$X_{datapath}$ processing section 3350 includes a shifting module 3352. Shifting module 3352 shifts the $Y_0$ coordinate of the input complex number and provides the shifted data signals to a series of multiplexers $3354_a$, $3354_b$, and $3354_c$. Multiplexer $3354_a$ is controlled by the $\delta_2\delta_1$ control bits received from ROM 3040. Multiplexer $3354_a$ outputs term $q_3$. Multiplexer $3354_b$ is controlled by the $\delta_4\delta_3$ control bits received from ROM 3040. The output of multiplexer $3354_b$ is provided to AND gate 3356. AND gate 3356 also receives control bit $z_1$ from ROM 3040. The output of AND gate 3356 is term $q_1$. Multiplexer 3354, is controlled by the $\delta_6\delta_5$ control bits received from ROM 3040. Multiplexer 3354, outputs term $q_2$.

Adder 3358 receives term $q_3$ from multiplexer $3354_a$, term $q_2$ from multiplexer 3354, and term $q_1$ from AND gate 3356. Term $q_3$ is always subtracted. However, adder 3358 performs a conditional negation or inversion of term $q_2$ based on the value of control bit $s_2$ and a conditional negation or inversion of term $q_1$ based on the value of control bit $s_1$.

Multiplexer 3360 receives the $X_0$ coordinate of the input complex number and a shifted $X_0$ coordinate. Multiplexer 3360 is controlled by the $\delta_7$ control bit received from ROM 3040. Adder 3362 receives term $q_4$ from multiplexer 3360 and the output from adder 3358. Term $q_4$ is always added. The outputs of coarse stage, $X_1$ and $Y_1$, are provided to CRA 3364 and CRA 3324, respectively. The outputs of CRA 3364 and CRA 3324 are in turn provided to fine-stage 3006.

As illustrated in FIG. 33, $X_{datapath}$ processing section includes a shifting module that shifts $Y_0$ generating $Y_0$, rtsh $(Y_0, 1), \ldots$ rtsh$(Y_0, 7)$. Multiplexer $3354_a$ receives, as inputs, $0, Y_0,$ rtsh$(Y_0, 1)$, and rtsh$(Y_0, 2)$. Multiplexer $3354_b$ receives, as inputs, rtsh$(Y_0, 2)$, rtsh$(Y_0, 5)$, rtsh$(Y_0, 6)$, and rtsh$(Y_0, 7)$. Multiplexer 3354, receives, as inputs, 0, rtsh$(Y_0, 3)$, rtsh$(Y_0, 4)$, and rtsh$(Y_0, 2)$. For example, using the spreadsheet of FIG. 32, for large angles, the output for Octant 5 should be represented as $X_0$–rtsh$(Y_0, 2)$–rtsh$(Y_0, 5)$. The large angle coarse stage control bits for Octant 5 (as shown in FIG. 31A) are therefore set to effectuate this result.

5.2 Fine Stage

The fine-rotation stage 3006 is driven by the nine least significant bits of the 16-bit rotation angle θ. The bits have been relabeled $b_1$ through $b_9$ for notational simplicity. These bits are grouped into 3-bit groups and each group drives a sub-rotation operation. Fine stage 3006 also incorporates various operations that are driven by the octant bits $O_1O_2O_3$. Such operations are typically performed by a DDFS in a separate output stage. The price paid to eliminate the output stage is that several more complicated multiplexer control bit values must be computed. In embodiments, these values are used because several multiplexers are consolidated into a single 4-to-1 multiplexer (and an AND gate) in each of four sub-circuits (see, e.g., FIG. 35).

The fine-rotation stage can be implemented as described above in Section 3. There will still be comparable coarse and fine magnitude-scaling compensation circuits required. The fine-stage complexity will be halved, however, since only half of it need be built (as discussed above). This is illustrated by the following equation:

$$Y_2 = \cos\theta_M [\sin\theta_L \quad \cos\theta_L] \begin{bmatrix} 1 & -\tan\theta_M \\ \tan\theta_M & 1 \end{bmatrix} \begin{bmatrix} X_0 \\ Y_0 \end{bmatrix}. \quad (59)$$

In this equation just the second component of the $[X_2 \, Y_2]^T$ output vector is retained. Alternatively, just the first component instead could have been retained, which would be computed by the following similar equation:

$$X_2 = \cos\theta_M [\cos\theta_L \quad -\sin\theta_L] \begin{bmatrix} 1 & -\tan\theta_M \\ \tan\theta_M & 1 \end{bmatrix} \begin{bmatrix} X_0 \\ Y_0 \end{bmatrix}. \quad (60)$$

FIG. 34 depicts a block diagram of an exemplary two-multiplier fine-stage circuit 3400, according to embodiments of the present invention. Fine-stage circuit 3400 includes three subrotation modules 3422, a rotation circuit 3426, a fine stage magnitude scaling module 3428, and an input selection circuit 3425. Subrotation modules 3422 and fine stage magnitude scaling module 3428 were described above in reference to FIG. 21.

In an embodiment, only one of the two outputs must be implemented. However, the system does not simply pick one of the two parts shown, for example, in the "remaining angle-rotation block" of FIG. 16. The implementation of a four-multiplier mixer requires the conditional interchange of X and Y outputs and the conditional negation of X and/or Y outputs. Therefore, while a single output for the two-multiplier mixer is implemented, the circuitry for that single output must be capable of realizing either one of the two outputs of a four-multiplier mixer. This entails the need to accommodate either the coarse stage X or Y output as the output into which we add or subtract shifted versions of the other coarse stage output (or, perhaps, add or subtract three-times that other coarse-stage output).

Input selection circuit 3425 is configured to allow selection of either the X1 or Y1 input. During the circuit's operation, a determination as to whether it is the X or Y output that is being produced is given by data in a ROM table 3402. Table 3402 is addressed by the value of the octant associated with the octant part of the normalized rotation angle θ (i.e., the highest-order three bits of $\overline{\theta}$). Table 3402 includes a first term bit indicating whether $X_1$ or $Y_1$ should be used as the first term, a negate first term bit, and a negate second term bit. As would be appreciated by persons of skill in the art, other ways of organizing table 3402 may be used with the present invention.

Input selection circuit 3425 includes a pair of 2-to-1 multiplexers controlled by a data bit from ROM table 3402. For example, if the ROM table data is a "0" for the first term value, then input coordinate $X_1$ is provided to the subrotation modules 3422 and input coordinate $Y_1$ is provided to the rotation circuit 3426. Note that one of these signals is multiplied by three in a block labeled "×3" prior to input at the subrotation modules.

Rotation circuit 3426 includes three adders $3442_A$, $3442_B$, and $3442_C$. In an embodiment, the adders are CSAs. Adder $3442_A$ receives the output from input selection circuit and the output for subrotation module $3422_1$. The first adder also receives a negate first term bit from ROM table 3402. The negate first term bit determines whether the first term should be negated during operation. Each of adders $3442_A$, $3442_B$, and $3442_C$ receives the negate second term bit from ROM table 3402. The negate second term bit determines whether the second term should be negated during operation. The output of adder $3442_C$ is provided to a carry ripple adder 3490.

As would be appreciated by persons of skill in the art, fine-stage circuit 3400 may be used, with modifications, as the fine-stage circuit of FIG. 15 discussed above.

It is possible to simplify the fine-stage circuit somewhat by consolidating several multiplexers into a single 4-to-1 multiplexer (and an AND gate) in each of four sub-circuits—as will be understood by one having ordinary skill in the art. FIG. 35 depicts a block diagram of a consolidated fine-stage 3500, according to embodiments of the present invention. Note that such consolidation can also be performed in the case of a four-multiplier mixer circuit. A similar consolidation can also be performed in the DDFS case.

Fine-stage circuit 3500 includes three subrotation modules 3522, a rotation circuit 3526, a fine stage magnitude scaling module 3528, and an input selection circuit 3525. Each subrotation module 3522 includes a 4-to-1 multiplexer 3534 and an AND gate 3536. The 4-to-1 multiplexer 3534 of subrotation module $3522_1$ is controlled by bit $b_3$ of the three-bit input group for the subrotation module and $\beta_2$ which is calculated as:

$$\beta_2 = (b_1 \cap b_2) \cup (\overline{b_1} \cap \overline{b_2} \cap \overline{b_3}) \quad (61)$$

AND gate 3536 of subrotation module $3522_1$ receives the output of 4-to-1 multiplexer 3534 and $\beta_1$ which is calculated as:

$$\beta_1 = \overline{b_2} \cup \overline{b_3} \cup \overline{b_1} \quad (62)$$

Similarly, the 4-to-1 multiplexer 3534 of subrotation module $3522_2$ is controlled by bit $b_6$ of the three-bit input group for the subrotation module and $\beta_5$ and AND gate 3536 of subrotation module $3522_2$ receives the output of 4-to-1 multiplexer 3534 and $\beta_4$. The 4-to-1 multiplexer 3534 of subrotation module $3522_3$ is controlled by bit $b_9$ of the three-bit input group for the subrotation module and $\beta_8$ and AND gate 3536 of subrotation module $3522_3$ receives the output of 4-to-1 multiplexer 3534 and $\beta_7$.

Fine stage magnitude scaling module 3528 includes a 4-to-1 multiplexer 3554 and AND gate 3556. The 4-to-1 multiplexer 3554 is controlled by bit $b_3$ of the three-bit input group for the subrotation module and $\beta_2$. AND gate 3556 receives the output of 4-to-1 multiplexer 3554 and $\beta_1$.

Input selection circuit 3525 is configured to allow selection of either the X1 or Y1 input as the "first term" (the other input becomes the "second term"). During the circuit's operation, a determination as to whether it is the X or Y input that is being used as the first term depends on the Octant data $O_1$, $O_2$, $O_3$ and it is given by data in a ROM table 3502. Table 3502 is addressed by the value of the octant associated with the octant part of the normalized rotation angle $\bar{\theta}$ (i.e., the highest-order three bits of $\bar{\theta}$). Table 3502 includes a first term bit indicating whether $X_1$ or $Y_1$ should be used as the first term and a "negate output" bit specifying whether to negate the output being produced. As would be appreciated by persons of skill in the art, other ways of organizing Table 3502 may be used with the present invention.

Input selection circuit 3525 includes a pair of 2-to-1 multiplexers controlled by a data bit from ROM table 3502. For example, if the ROM table data is a "0" for the first term value, then input coordinate $X_1$ is provided to the subrotation modules 3522 and input coordinate $Y_1$ is provided to the rotation circuit 3526. Note that one of these signals is effectively multiplied by three in a block labeled "×1.5" prior to input at the subrotation modules.

When this type of fine stage is used, where inputs can come from ROMs (such as in FIG. 34), a required "×3" multiplication is obtained by storing a pre-computed 3t value in ROM along with each t value stored there. The embodiment of FIG. 35 does not operate on data that comes from a ROM and hence the "×3" block is replaced by a "×1.5" block. In embodiments, the "×1.5" block is implemented by using a single adder and a hardwired right-shift of the input data. This block's output then becomes the desired "×3 value" because the output is right-shifted by just six bits, where a right shift of seven bits would actually be called for.

As would be appreciated by persons of skill in the art, fine-stage circuit 3500 may be used, with modifications, as the fine-stage circuit of FIG. 15 discussed above.

5.3 Coarse-Stage Scaling Circuit

The coarse-stage scaling circuit is configured to multiply the fine-stage output by $\cos \theta_m$. Because $\theta_m$ has been carefully chosen such that $\cos \theta_m$ is "simple," it is possible to perform the scaling operation with three CSAs and one CRA. It is not obvious that one would be able to do this implementation so efficiently. For example, it is not obvious that, no matter which $\cos \theta_m$ value is being handled, it will always be the case that the signed-powers-of-two representation of $\cos \theta_m$ will never have more than one non-zero bit in bit-positions 7, 8, 9, and 10—as the multiplexer in the lower right corner of FIG. 36 requires. This can be arranged by careful use of the various "non-unique" choices of the signed-powers-of-two representation of $\cos \theta_m$ as illustrated by the spreadsheet shown in FIG. 32B. The non-uniqueness of signed-power-of-two representations is exploited in the ROM and multiplexer type construction of FIG. 36.

FIG. 36 depicts a block diagram of coarse-stage scaling circuit 3608, according to embodiments of the present invention. The coarse-stage magnitude-scaling circuit (i.e., scaling by $\cos \theta_m$) receives control parameters from ROM 3202 including an n-bit correction word $(\delta_1 \delta_2 \ldots \delta_n)$. (Here, as indicated in FIG. 31, n=19.) Coarse-stage scaling circuit 3608 includes two shifting modules $3610_A$ and $3610_B$, a plurality of term generation blocks $3630_{A-E}$ and three adders $3636_{A-C}$. In an embodiment, adders $3636_{A-C}$ are CSAs. As shown in FIG. 36, scaling circuit 3608 requires an input scaling (e.g., by the factor 7), which can be implemented by a single subtraction, at the output of a fine-stage circuit. In embodiments, the input scaling by the factor 7, produced by one subtraction and a hard-wired shift, is quite useful in accommodating several 1001 bit sequences in the various $\cos \theta_m$ sub-expressions.

Term generation block $3630A$ generates term r1. Term generation block $3630A$ includes two 4-to-1 multiplexers which are controlled by a pair of bits (e.g., $\delta_3\delta_2$) from the correction value. The outputs of the two 4-to-1 multiplexers are fed as inputs to a single 2-to-1 multiplexer controlled by a bit (e.g., $\delta_4$) in the correction value. The output of the 2-to-1 multiplexer is term $r_1$.

Term generation block $3630_B$ generates term $r_2$. Term generation block $3630_B$ includes two 4-to-1 multiplexers which are controlled by a pair of bits (e.g., $\delta_6\delta_5$) from the correction value. The outputs of the two 4-to-1 multiplexers are fed as inputs to a single 2-to-1 multiplexer controlled by a bit (e.g., $\delta_7$) in the correction value. The output of the 2-to-1 multiplexer is term $r_2$.

Term generation block $3630_C$ generates term $r_3$. Term generation block $3630_C$ includes a 4-to-1 multiplexer which is controlled by a pair of bits (e.g., $\delta_9\delta_8$) from the correction value and a 2-to-1 multiplexer which is controlled by a bit (e.g., $\delta_8$) in the correction value. The outputs of the 4-to-1 multiplexer and the 2-to-1 multiplexer are fed as inputs to a single 2-to-1 multiplexer controlled by a bit (e.g., $\delta_{10}$) in the correction value. The output of the 2-to-1 multiplexer is fed into an AND gate along with a control bit $z_2$. The output of the AND gate is the term $r_3$.

Term generation block $3630_D$ generates term $r_4$. Term generation block $3630_D$ includes two 4-to-1 multiplexers which are controlled by a pair of bits (e.g., $\delta_{12}\delta_{11}$) from the correction value. The outputs of the 4-to-1 multiplexers are fed as inputs to a single 2-to-1 multiplexer controlled by a bit (e.g., $\delta_{13}$) in the correction value. The output of the 2-to-1 multiplexer is fed into an AND gate along with a control bit $z_3$. The output of the AND gate is the term $r_4$.

Term generation block $3630_E$ generates term $r_5$. Term generation block $3630_E$ includes a 2-to-1 multiplexer which is controlled by a bit (e.g., $\delta_1$) in the correction value. The output of the 2-to-1 multiplexer is the term $r_5$. Adder $3636_A$ combines terms $r_2$, $r_3$, and $r_5$. Term $r_5$ is always added.

However, adder $3636_A$ performs a conditional negation or inversion of term $r_2$ based on the value of control bit $u_2$ and a conditional negation or inversion of term $r_3$ based on the value of control bit $u_3$. Adder $3636_B$ combines the output of adder $3636_A$ and term $r_1$. Adder $3636_A$ performs a conditional negation or inversion of term $r_1$ based on the value of control bit $u_1$. Adder $3636_C$ combines the output of adder $3636_B$ and term $r_4$. Adder $3636_C$ performs a conditional negation or inversion of term $r_4$ based on the value of control bit $u_4$. The output of adder $3636$ is the scaled output coordinate (e.g., scaled $X_2$).

6. Alternative Two-Multiplier Mixer

Figure 9:
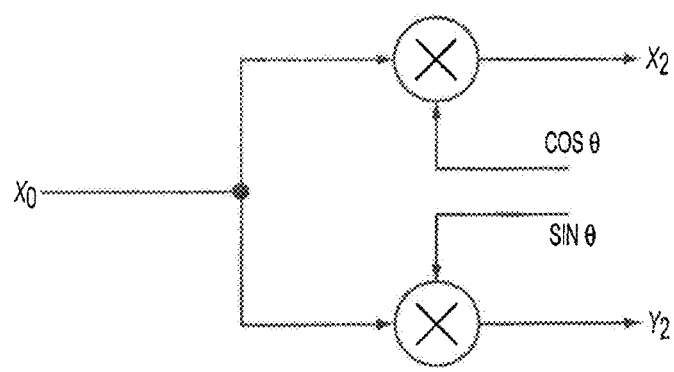
FIG. 9 depicts an alternative two-multiplier mixer circuit that implements only a single pair of sine/cosine multiplications, according to embodiments of the present invention.

FIG. 9 depicts an alternative two-multiplier mixer circuit 3700 that implements only a single pair of sine/cosine multiplications, according to embodiments of the present invention. Here, in a manner quite analogous to the two-multiplier mixer discussed above in reference to FIG. 30, the circuit complexity can be reduced by half. Before outlining this manner of complexity reduction, observe that this circuit performs the multiplication of a single input value $X_0$ by both $\sin\theta$ and $\cos\theta$, making it ideally situated to employ the subexpression-sharing techniques discussed in the "CSD and SPT multipliers" section, above. The coarse-stage and fine-stage structures for an implementation that mimics the structures of the two-multiplier mixer discussed above are outlined below.

As before, the 2×2 angle-rotation matrix is represented as the product of a coarse rotation matrix and a fine rotation matrix. Again, half of one matrix can be eliminated resulting in the following:

$$\begin{bmatrix} X_2 \\ Y_2 \end{bmatrix} = \begin{bmatrix} \cos\theta \\ \sin\theta \end{bmatrix} X_0 \qquad (63)$$

$$= \begin{bmatrix} \cos\theta_M \cos\theta_L - \sin\theta_M \sin\theta_L \\ \sin\theta_M \cos\theta_L + \cos\theta_M \sin\theta_L \end{bmatrix} X_0$$

and, hence, either $$\begin{bmatrix} X_2 \\ Y_2 \end{bmatrix} = \begin{bmatrix} \cos\theta_M & -\sin\theta_M \\ \sin\theta_M & \cos\theta_M \end{bmatrix} \begin{bmatrix} \cos\theta_L \\ \sin\theta_L \end{bmatrix} X_0 \qquad (64)$$

$$= \begin{bmatrix} 1 & -\tan\theta_M \\ \tan\theta_M & 1 \end{bmatrix} \begin{bmatrix} \cos\theta_L \\ \sin\theta_L \end{bmatrix} \cos\theta_M X_0$$

or $$\begin{bmatrix} X_2 \\ Y_2 \end{bmatrix} = \begin{bmatrix} \cos\theta_L & -\sin\theta_L \\ \sin\theta_L & \cos\theta_L \end{bmatrix} \begin{bmatrix} \cos\theta_M \\ \sin\theta_M \end{bmatrix} X_0 \qquad (65)$$

$$= \begin{bmatrix} 1 & -\tan\theta_L \\ \tan\theta_L & 1 \end{bmatrix} \begin{bmatrix} \cos\theta_M \\ \sin\theta_M \end{bmatrix} \cos\theta_L X_0.$$

In the latter expression, for example, the approximations $\cos\theta_L \approx 1$ and $\tan\delta_L \approx \theta_L$, lead to $$\begin{bmatrix} X_2 \\ Y_2 \end{bmatrix} = \begin{bmatrix} 1 & -\theta_L \\ \theta_L & 1 \end{bmatrix} \begin{bmatrix} \cos\theta_M \\ \sin\theta_M \end{bmatrix} X_0. \qquad (66)$$

It is evident that "half of the coarse stage" can be implemented by a circuit of the type shown in FIG. 6A, producing both $X_{out}$ and $Y_{out}$ values, but greatly simplified—thereby having a lower computational complexity than a single Booth multiplier. Also, the fine-stage implementation certainly has lower computational complexity than a traditional two-output DDFS.

7. Spectral Inversion

Other minor variations on the embodiments described above will be evident to one of ordinary skill in the art. One quite simple example of this is the minor change that is often encountered in the circuits of FIG. 30 and FIG. 36 wherein one or both of the sin θ and cos θ multiplication coefficients is negated. Such so-called "spectral inversion" can be incorporated in a manner wherein it is conditionally applied within the circuits discussed above at the time of their use. When applied, the computations can be performed in the disclosed embodiments in a manner that entails no additional computational cost.

Figure 10:
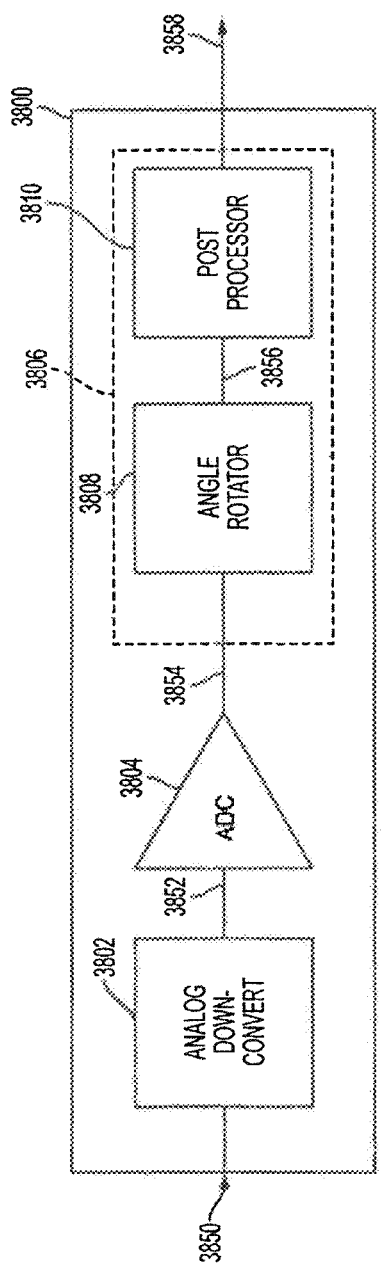
FIG. 10 illustrates a block diagram of a communications receiver according to an exemplary embodiment of the present invention.

FIG. 10 illustrates a block diagram of a communications receiver according to an exemplary embodiment of the present invention. A communication system 3800 receives a communication signal 3850 from a communication channel such as a microwave radio link, a satellite channel, a fiber optic cable, a hybrid fiber optic cable system, or a copper cable to provide some examples.

An analog downconverter 3802 downconverts the communication signal 3850 to baseband or any suitable intermediate frequency (IF) to produce a downconverted communication signal 3852. The analog downconverter 3802 may be implemented using a direct-conversion receiver (DCR) or homodyne receiver, a superheterodyne receiver, or any other suitable receiver capable receiving the communication signal 3850 without departing from the spirit and scope of the present invention.

An analog to digital converter (ADC) 3804 digitizes the downconverted communication signal 3852 to produce a digital communication signal 3854. More specifically, the ADC 3804 samples the downconverted communication signal 3852 according to one or more sampling clocks to produce the digital communication signal 3854. However, this example is not limiting, the communication system 3800 may use any suitable means to assign the downconverted communication signal 3852 to one or more digital representations without departing from the sprit and scope of the present invention.

A digital receiver 3806 receives the digital communication signal 3854 from the ADC 3804. The digital receiver 3806 processes the digital communication signal 3854 to produce a recovered communication signal 3858. The recovered communication 3858 may represent an approximation to a transmitted communication signal before transmission through the communication channel. In an exemplary embodiment, the digital receiver 3806 includes an angle rotator 3808 and a post processor 3810. However, this embodiment is not limiting, the digital receiver 3806 may include any suitable means to produce the recovered communication signal 3858 from the digital communication signal 3854 without departing from the spirit and scope of the present invention.

The angle rotator 3808 produces a derotated communication signal 3856 based upon the digital communication signal 3854. More specifically, the angle rotator 3808 rotates the digital communication signal 3854 by the angle θ to remove angular offsets in the digital communication signal 3854 as a result of the communication channel or any other suitable means that will be apparent to those skilled in the relevant art(s). In an exemplary embodiment, angle rotator 3808 may include one or more angle rotators 200 as discussed in FIG. 2.

The post processor 3810 produces the recovered communication signal 3858 based upon the derotated communication signal 3856. The post processor 3810 may include forward error correction (FEC) decoders, deinterleaver, timing loops, carrier recover loops, equalizers, digital filters, or any other suitable means that may be used to produce the recovered communication signal 3858. In an exemplary embodiment, angle rotator 3808 may include one or more angle rotators 200 as discussed in FIG. 2.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A digital device for rotating an input complex number having a plurality of coordinates and for producing at least one coordinate of a rotated complex number, comprising:
    a coarse rotation module having a plurality of multiplexers;
    a memory including:
        a first read only memory having a plurality of addressable locations, and configured to store a set of bits for controlling the plurality of multiplexers for a first set of fine-stage angles, and
        a second read only memory configured to store a set of bits for controlling the plurality of multiplexers for a second set of fine-stage angles, the angles of the second set being larger than the angles of the first set,
    wherein the coarse rotation module is configured to:
        receive at least one coordinate of an input complex number and either the set of bits from the first read only memory or the set of bits from the second read only memory for controlling the plurality of multiplexers,
        use the set of received bits to control the plurality of multiplexers, and
        produce at least one coarsely rotated coordinate; and
    a fine adjustment circuit configured to receive the at least one coarsely rotated coordinate and perform a fine rotation on the at least one coarsely rotated coordinate to produce the at least one coordinate of a rotated complex number.

2. The digital device of claim 1, further comprising:
    a phase accumulator coupled to the memory and configured to produce a normalized truncated phase angle having a coarse angle value and a fine angle value.

3. The digital device of claim 2, further comprising:
    a conditional angle negation module coupled to the phase accumulator, wherein the conditional angle negation module is configured to receive a first bit of the normalized truncated phase angle as a first input and a plurality of additional bits of the normalized truncated phase angle as a second input.

4. The digital device of claim 3, wherein the conditional angle negation module is configured to communicate a set of the plurality of additional bits of the normalized truncated phase angle to the memory.

5. The digital device of claim 4, wherein one bit in the set of the plurality of additional bits of the normalized truncated phase angle is a first fine-angle bit.

6. The digital device of claim 5, wherein the memory is configured to select the first read only memory or the second read only memory based on the value of the first fine-angle bit.

* * * * *